(12) United States Patent
Morioka et al.

(10) Patent No.: US 9,361,930 B2
(45) Date of Patent: Jun. 7, 2016

(54) DISC CONVEYING DEVICE AND DISC CONVEYING METHOD

(71) Applicant: Panasonic Intellectual Property Management Co., Ltd., Osaka (JP)

(72) Inventors: Yukio Morioka, Osaka (JP); Kenji Shiomi, Osaka (JP); Yuji Ariyoshi, Osaka (JP); Masakazu Ishizuka, Hyogo (JP); Yasuhisa Fukushima, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/664,016

(22) Filed: Mar. 20, 2015

(65) Prior Publication Data

US 2015/0194180 A1    Jul. 9, 2015

Related U.S. Application Data

(63) Continuation of application No. PCT/JP2014/002523, filed on May 13, 2014.

(30) Foreign Application Priority Data

May 15, 2013  (JP) ................................. 2013-103421
May 15, 2013  (JP) ................................. 2013-103424
May 15, 2013  (JP) ................................. 2013-103426
May 15, 2013  (JP) ................................. 2013-103428

(51) Int. Cl.
*G11B 17/04*    (2006.01)
*G11B 17/30*    (2006.01)
(Continued)

(52) U.S. Cl.
CPC ................ *G11B 17/04* (2013.01); *G11B 17/26* (2013.01); *G11B 17/30* (2013.01); *G11B 17/05* (2013.01); *G11B 17/10* (2013.01); *G11B 17/221* (2013.01); *G11B 17/225* (2013.01)

(58) Field of Classification Search
None
See application file for complete search history.

(56) References Cited

U.S. PATENT DOCUMENTS 5,703,866 A     12/1997   Hayashi et al.
5,808,976 A  *   9/1998   Hisatomi ............. G11B 17/223
                                                         369/30.77

(Continued)

FOREIGN PATENT DOCUMENTS

JP    57-183663    11/1982
JP    61-184764     8/1986
(Continued)

OTHER PUBLICATIONS

International Search Report issued Aug. 5, 2014 in International (PCT) Application No. PCT/JP2014/002523.
International Preliminary Report on Patentability mailed Nov. 26, 2015 in International (PCT) Application No. PCT/JP2014/002523.

*Primary Examiner* — Carlos E Garcia
(74) *Attorney, Agent, or Firm* — Wenderoth, Lind & Ponack, L.L.P.

(57) ABSTRACT

A disc conveying device includes a plurality of disc holding members stacked in a first direction which is a disc thickness direction, one of the plurality of disc holding members holding a disc such that the disc can slide to one side in a second direction orthogonal to the first direction, a disc holding member moving mechanism separating the one of the plurality of disc holding members from an adjacent one of the plurality of disc holding members in the first direction, moving the one of the plurality of disc holding members to the one side in the second direction, and partially protruding the disc from other discs held by the plurality of disc holding members to the one side in the second direction, and a disc conveying mechanism holding a protruded part of the disc and conveying the disc to the one side in the second direction.

8 Claims, 38 Drawing Sheets

(51) Int. Cl.
*G11B 17/26* (2006.01)
*G11B 17/05* (2006.01)
*G11B 17/10* (2006.01)
*G11B 17/22* (2006.01)

(56) References Cited

U.S. PATENT DOCUMENTS

| | | | |
|---|---|---|---|
| 6,031,811 A | 2/2000 | Umesaki et al. | |
| 6,141,314 A | 10/2000 | Umesaki et al. | |
| 7,283,431 B2 * | 10/2007 | Woo | G11B 17/221 369/30.78 |
| 2003/0161225 A1 | 8/2003 | Morioka et al. | |
| 2004/0017741 A1 * | 1/2004 | Tatehata | G11B 17/30 369/30.85 |
| 2007/0201320 A1 * | 8/2007 | Suzuki | G11B 17/021 369/30.78 |
| 2010/0138847 A1 | 6/2010 | Shimomae | |

FOREIGN PATENT DOCUMENTS

| | | |
|---|---|---|
| JP | 62-212964 | 9/1987 |
| JP | 6-180922 | 6/1994 |
| JP | 6-259869 | 9/1994 |
| JP | 7-121971 | 5/1995 |
| JP | 7-220363 | 8/1995 |
| JP | 7-272371 | 10/1995 |
| JP | 8-7446 | 1/1996 |
| JP | 8-279231 | 10/1996 |
| JP | 9-7281 | 1/1997 |
| JP | 2812669 | 10/1998 |
| JP | 3098176 | 10/2000 |
| JP | 2001-14768 | 1/2001 |
| JP | 2001-307407 | 11/2001 |
| JP | 2006-269039 | 10/2006 |
| JP | 3955267 | 8/2007 |
| JP | 2010-27093 | 2/2010 |

* cited by examiner

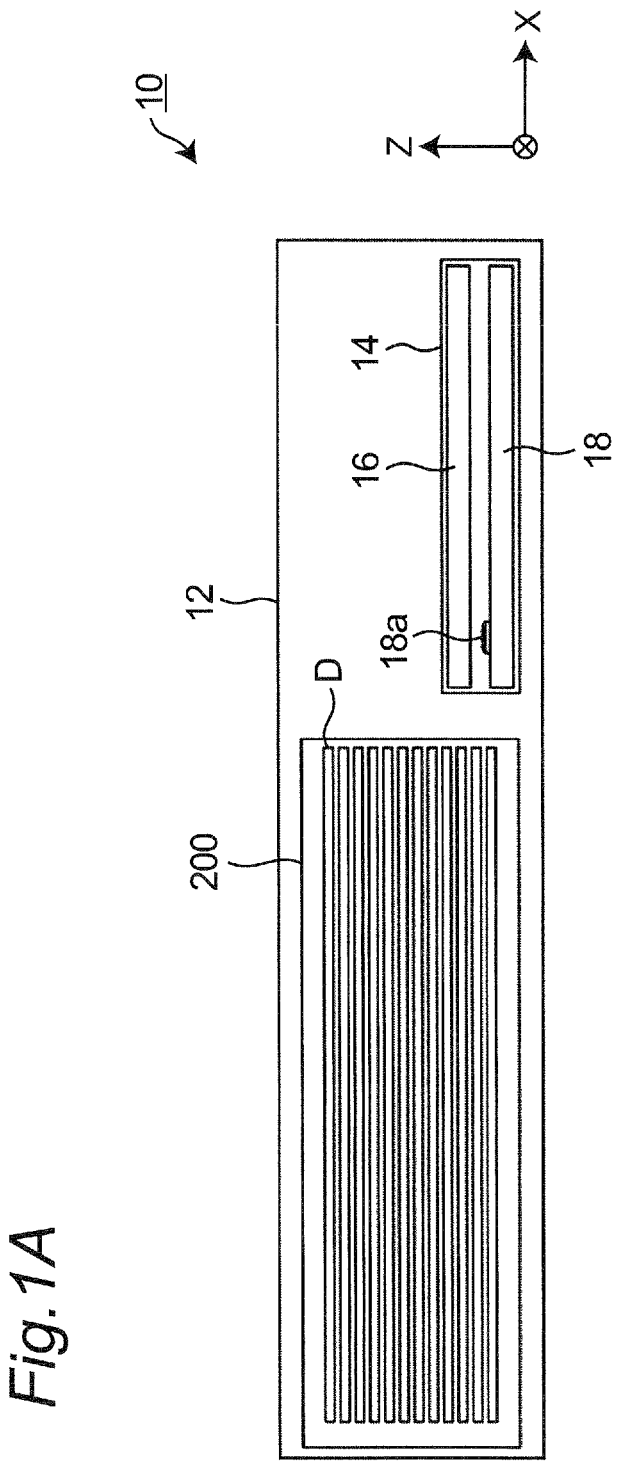

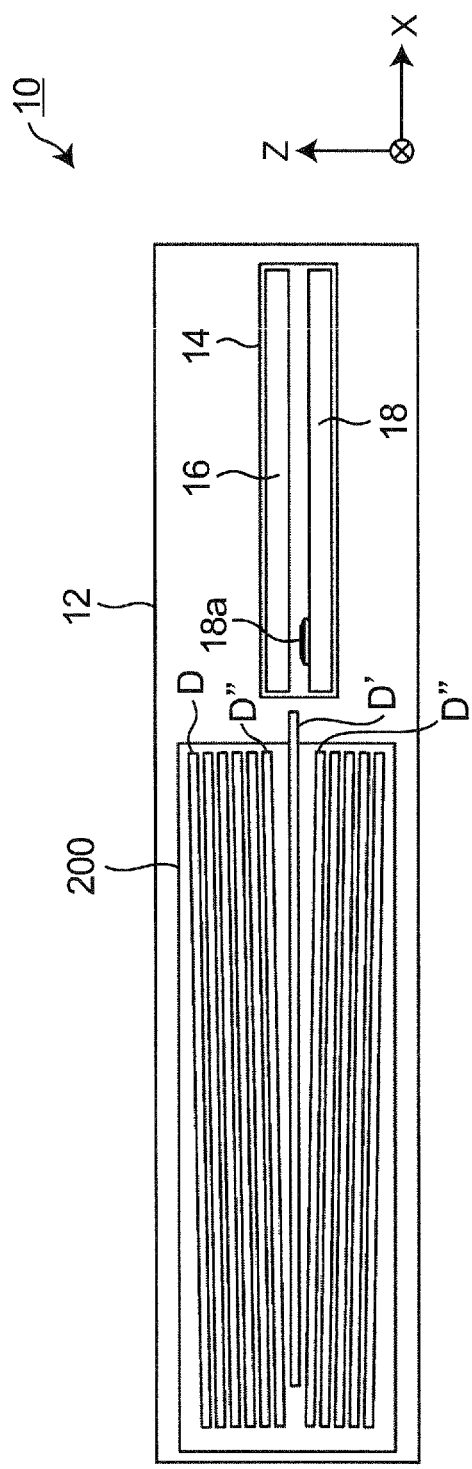

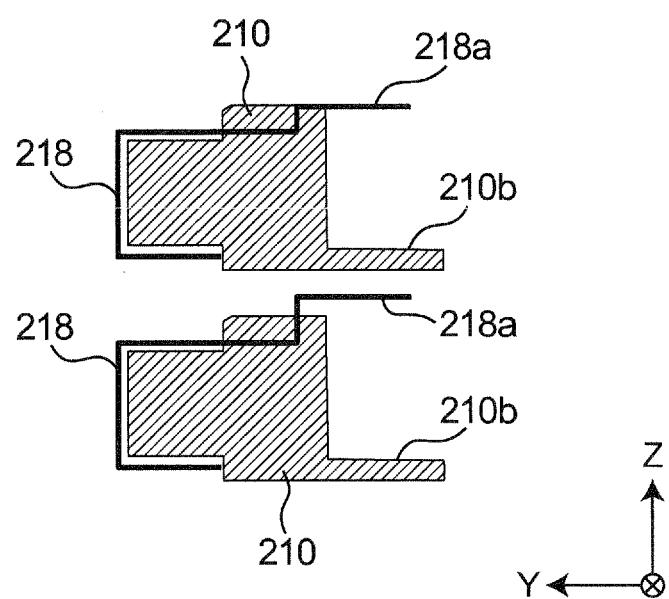

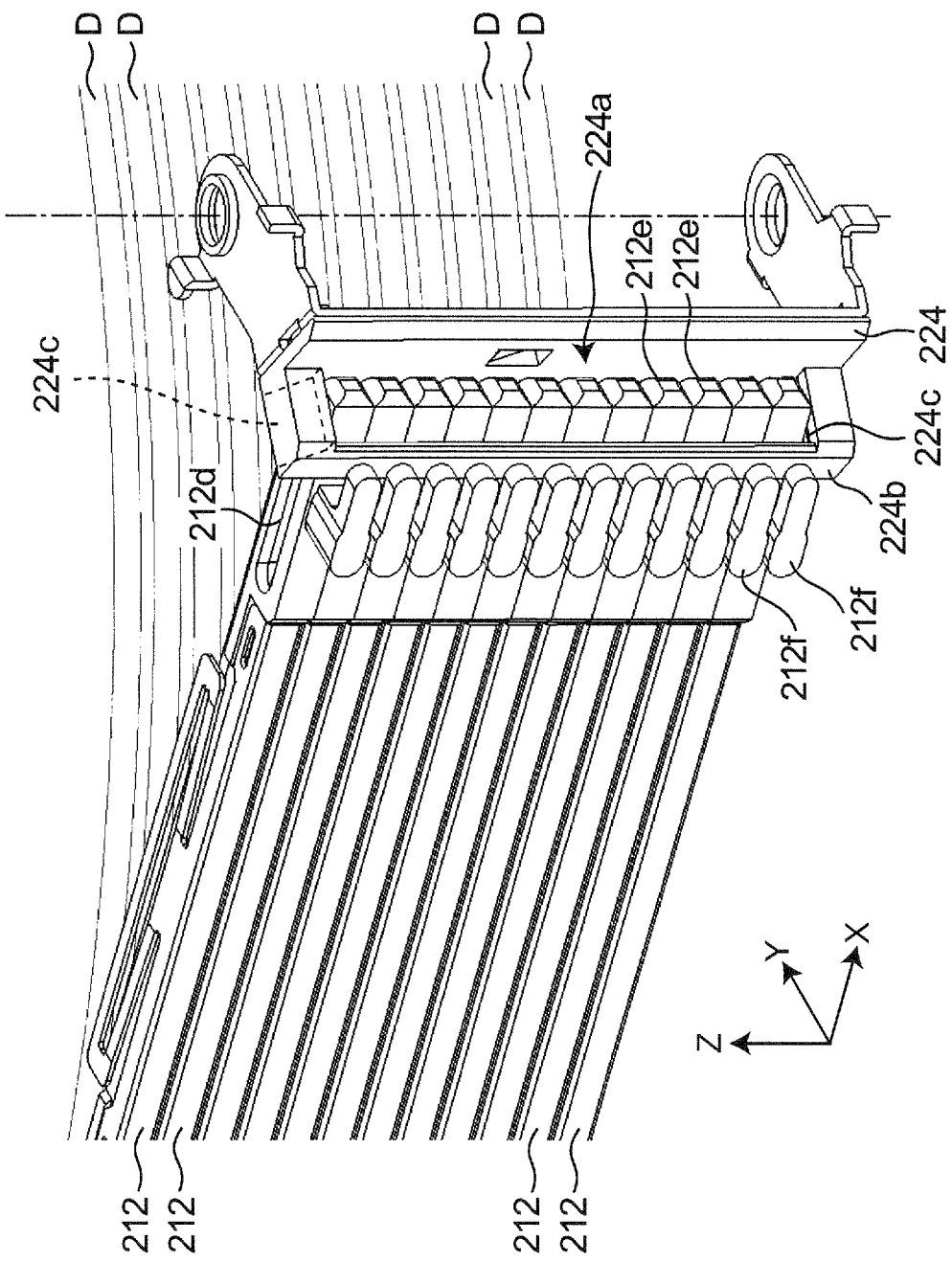

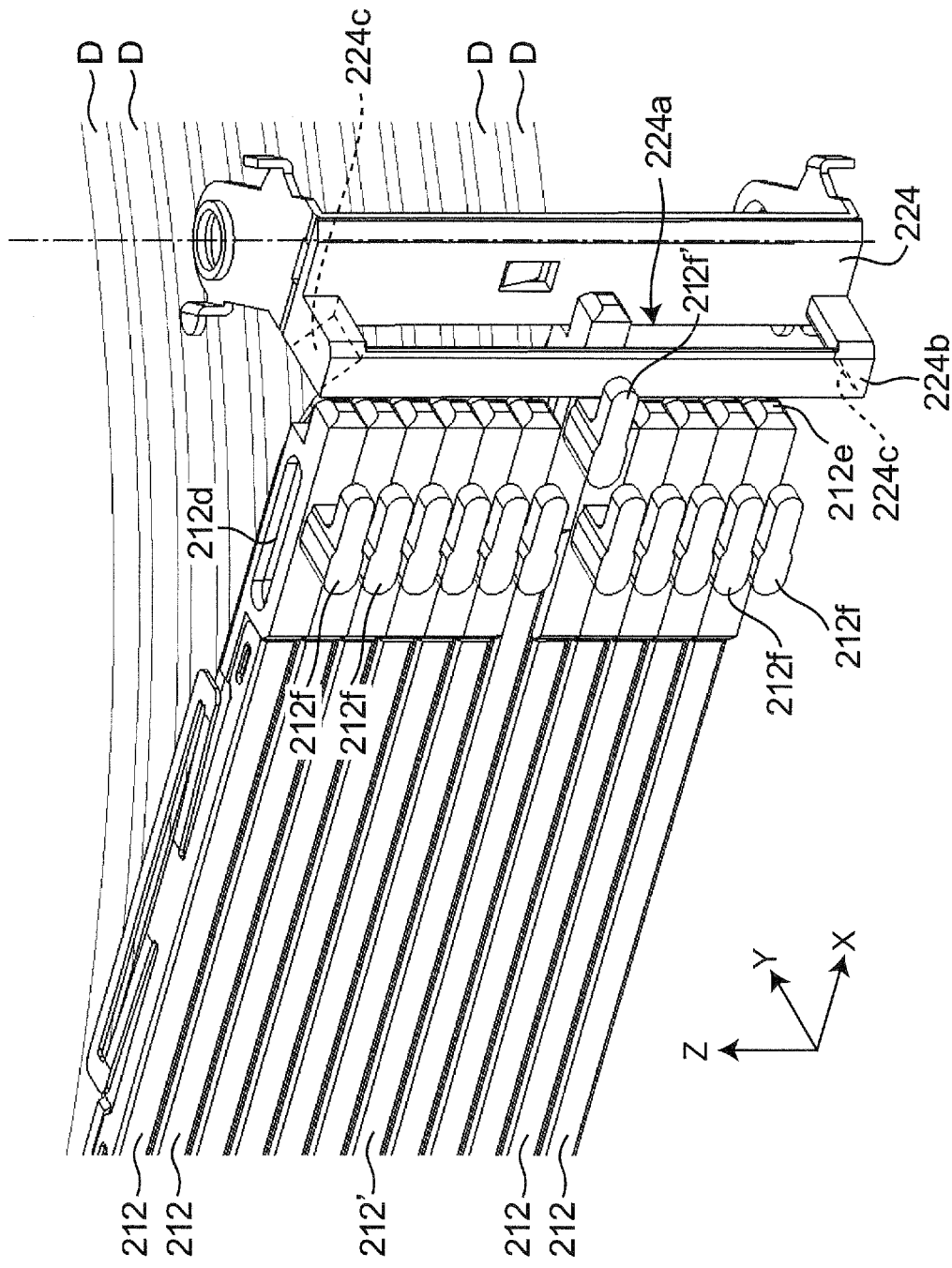

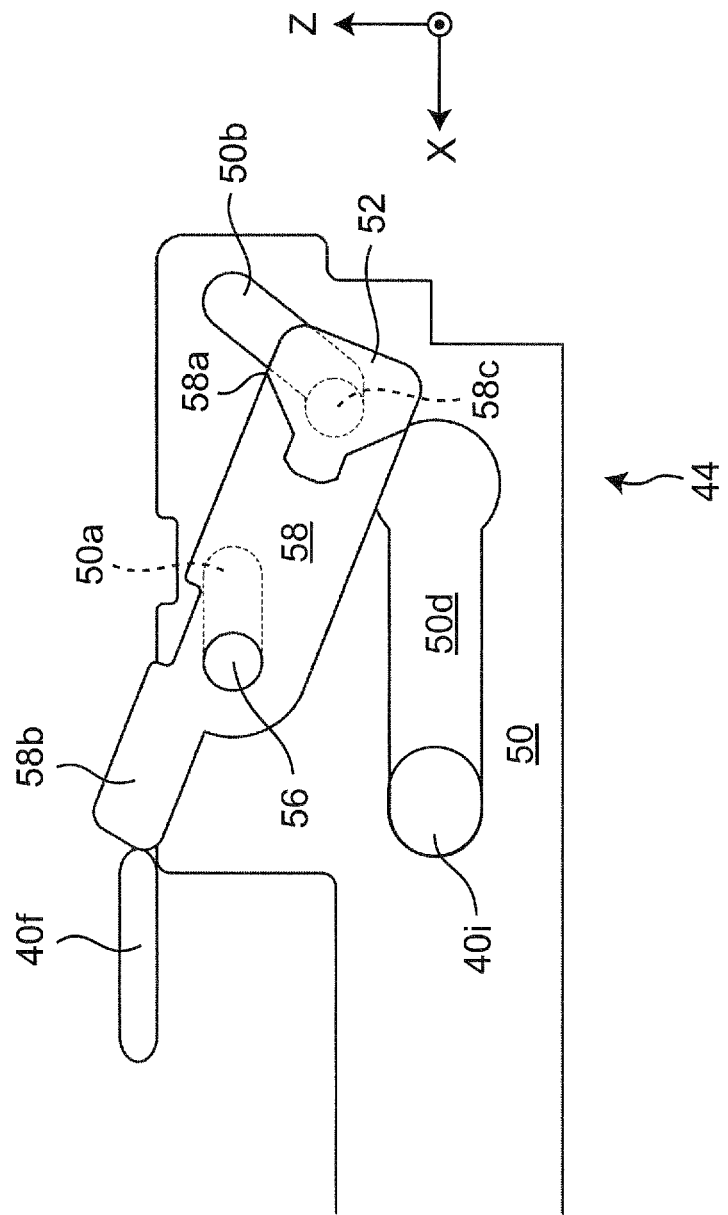

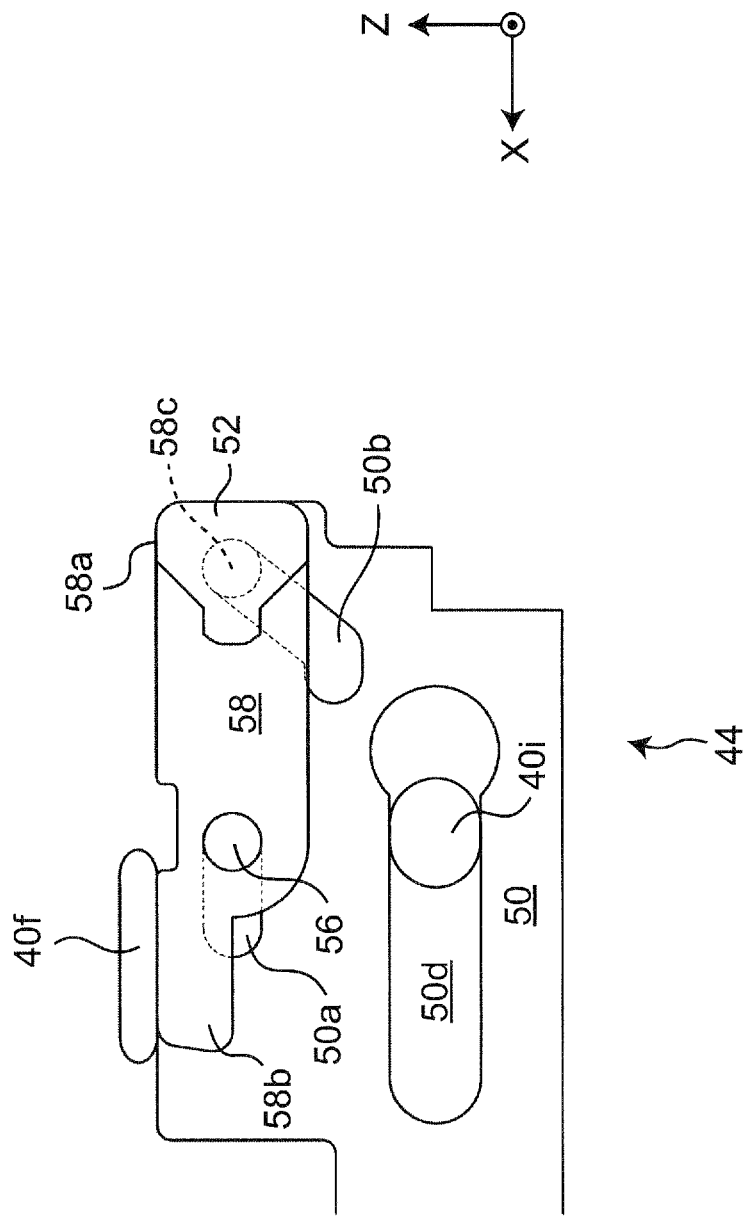

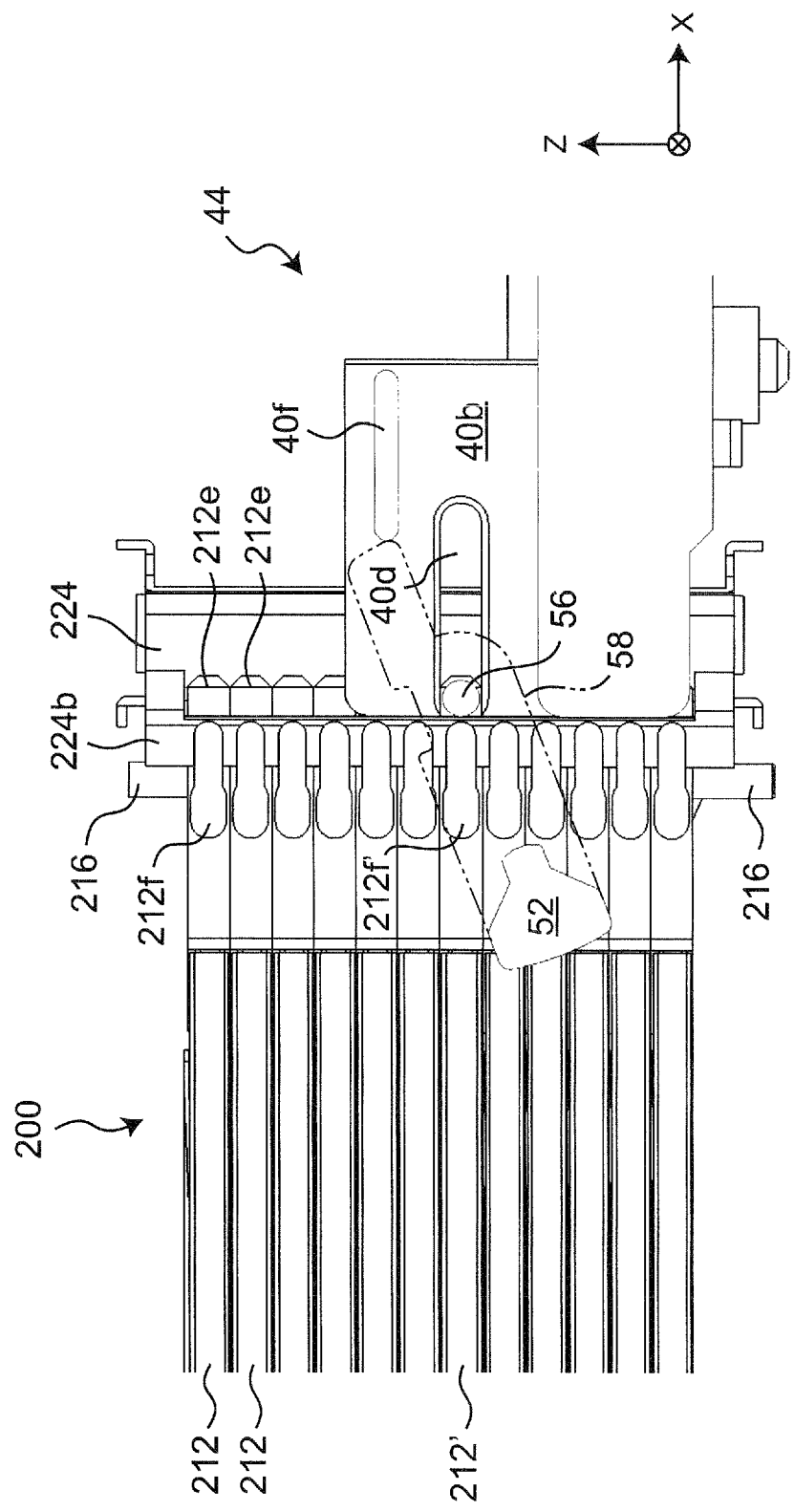

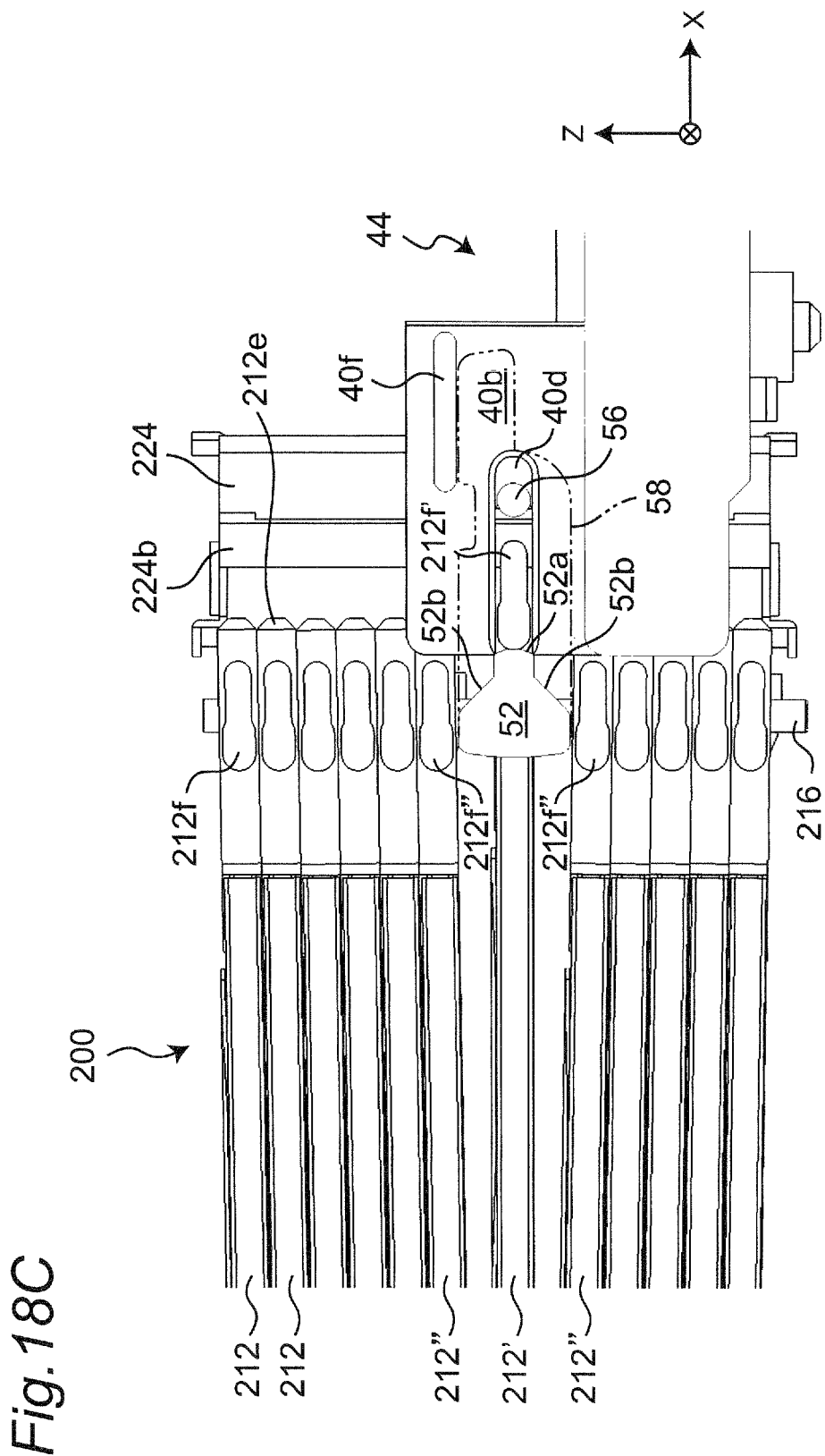

DISC CONVEYING DEVICE AND DISC CONVEYING METHOD

CROSS-REFERENCE TO RELATED APPLICATIONS

This is a continuation application of International Application No. PCT/JP2014/002523, with an international filing date of May 13, 2014, which claims priority of Japanese Patent Applications Nos. 2013-103421, 2013-103424, 2013-103426, and 2013-103428 filed on May 15, 2013, the content of which is incorporated herein by reference.

BACKGROUND OF THE INVENTION

1. Technical Field

This disclosure relates to a disc conveying device and a disc conveying method that conveys any one of a plurality of discs arranged in a thickness direction.

2. Description of the Related Art

In disc conveying devices described in U.S. Pat. Nos. 3,098,176 and 2,812,669, a plurality of trays that store discs such as CDs and DVDs are stacked in a disc thickness direction. One tray selected from the stacked trays is conveyed in a disc radial direction and then, is disposed at a disc record/reproduction position where recording on a disc in the selected tray or reproduction from the disc is performed. Such disc conveying device is also called a disc changer.

SUMMARY

A compact disc conveying device capable of storing more discs arranged in the thickness direction has been recently demanded.

An object of this disclosure is to provide a compact disc conveying device and a disc conveying method that can store more discs arranged in the thickness direction.

To attain the object, one aspect of the present disclosure provides a disc conveying device conveying any one disc among a plurality of discs arranged in a first direction which is a disc thickness direction in a second direction orthogonal to the first direction, the device comprising:

a plurality of disc holding members stacked in the first direction, the disc holding members each holding the disc such that the disc can slide to one side in the second direction, and being capable of moving in the first and second directions;

a disc holding member moving mechanism separating the disc holding member holding the disc to be conveyed from the adjacent disc holding member in the first direction, and moving the disc holding member holding the disc to be conveyed to the one side in the second direction, partially protruding the disc to be conveyed from the other discs to the one side in the second direction; and a disc conveying mechanism holding the protruded part of the disc to be conveyed which is protruded from the other discs to the one side in the second direction, and conveying the disc to be conveyed to the one side in the second direction.

Another aspect of the present disclosure provides a disc conveying method of conveying any one disc among a plurality of discs arranged in a first direction which is a disc thickness direction in a second direction orthogonal to the first direction, the method comprising:

holding the disc with each of a plurality of disc holding members stacked in the first direction such that the disc can slide to one side in the second direction;

separating the disc holding member holding the disc to be conveyed from the adjacent disc holding member in the first direction, and moving the disc holding member holding the disc to be conveyed to the one side in the second direction, partially protruding the disc to be conveyed from the other discs to the one side in the second direction; and holding the protruded part of the disc to be conveyed which is protruded from the other discs to the one side in the second direction, and conveying the disc to be conveyed to the one side in the second direction.

As compared to a disc conveying device in which a trays each storing a disc are arranged in the disc thickness direction and in which the disc is conveyed together with the tray, the disc conveying device according to this disclosure can store more discs while keeping compact in size.

BRIEF DESCRIPTION OF THE DRAWINGS

These aspects and features of the present disclosure will become apparent from following description of a preferred embodiment in conjunction with appended drawings. In these drawings, FIG. 1A is a schematic side view of a disc conveying device in accordance with an embodiment in the state where a plurality of discs each are disposed at a disc waiting position;

FIG. 1B is a schematic side view of the disc conveying device in accordance with the embodiment in the state where one disc is disposed at a disc pass position;

FIG. 9B is a sectional view of the guide portions of one disc holding plate released from the pressure of an adjacent disc holding plate;

FIG. 10A is a partial view of the disc holding plates in the state where a locking member restricts movement in the disc thickness direction;

FIG. 10B is a partial view of the disc holding plates in the state where the locking member releases the restriction of movement in the disc thickness direction;

FIG. 16A is an enlarged view of the disc holder moving mechanism in the state where the plurality of discs are disposed at the disc waiting position as shown in FIG. 1A;

FIG. 16B is an enlarged view of the disc holder moving mechanism in the state where one disc is disposed at the disc pass position as shown in FIG. 1B and FIG. 2A;

FIG. 18A is a view for describing an operation of the disc holder moving mechanism;

FIG. 18C is a view for describing an operation of the disc holder moving mechanism, which follows the operation shown in FIG. 18B;

DETAILED DESCRIPTION

Figure 1C:
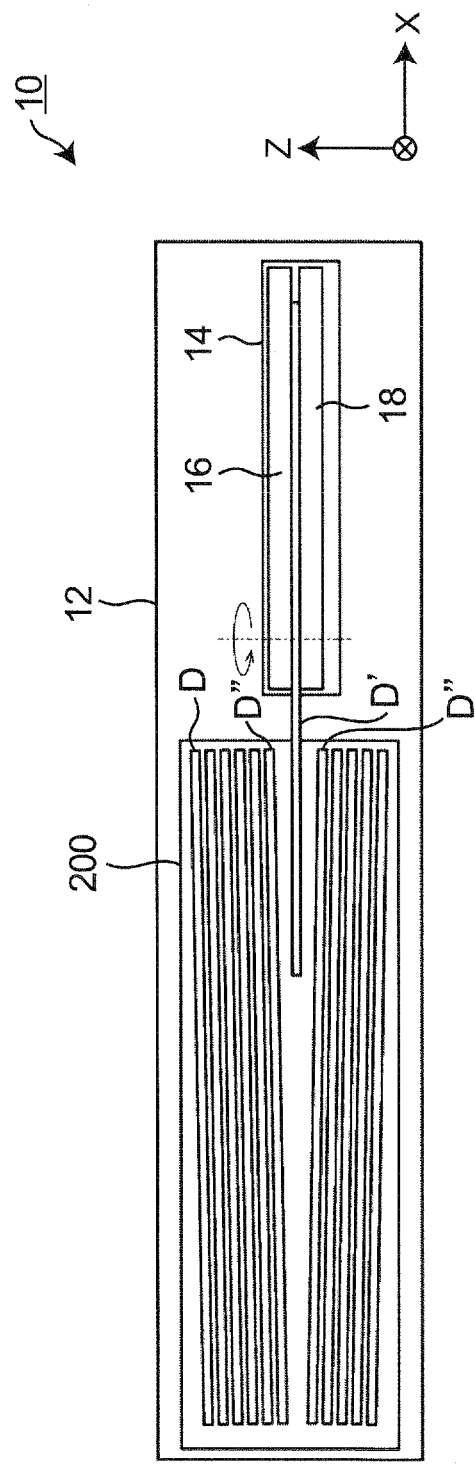
FIG. 1C is a schematic side view of the disc conveying device in accordance with the embodiment in the state where one disc is disposed at a disc record/reproduction position.

An embodiment will be described below in detail with reference to drawings. However, unnecessarily detailed description may be omitted. For example, detailed description of well-known matters and redundant description of substantially the same configuration may be omitted. This eliminates unnecessary redundant description to facilitate understanding of those skilled in the art.

Inventor(s) provide drawings and following description to make those skilled in the art fully understand the embodiment, and does not intend to limit subject matters in Claims.

For clear explanation of the disc conveying device, this specification uses an X-axis direction, a Y-axis direction, and a Z-axis direction, which are orthogonal to each other. The Z-axis direction corresponds to the disc thickness direction, and the X-axis direction and the Y-axis direction correspond to the disc radial direction.

In some usages of the disc conveying device, the X-axis direction, the Y-axis direction, and the Z-axis direction do not always match the vertical direction or the horizontal direction, and, for example, the Z-axis direction does not necessarily match the vertical direction.

First, for the sake of clarity, a disc conveying device in accordance with an embodiment will be summarized.

(Outline of Disc Conveying Device)

FIGS. 1A to 10 are schematic side views of a disc conveying device for briefly describing configuration and operation of the disc conveying device in accordance with the embodiment.

As shown in FIG. 1A to 10, a disc conveying device 10 includes a main unit 12, a disc record and reproduction unit 14 that records information on a disc D and reproduces information from a disc D, and a magazine 200 that stores a plurality of discs D.

The magazine 200 stores the discs D arranged in the Z-axis direction (first direction) that is the disc thickness direction. The magazine 200 can be attached to and detached from the main unit 12 of the disc conveying device 10 in the X-axis direction (second direction) orthogonal to the Z-axis direction, that is, the disc radial direction. When the magazine 200 is attached to the disc conveying device 10, the discs D each are located at a disc waiting position in the disc conveying device 10 as shown in FIG. 1A. The disc waiting position used herein means a position where each disc D waits until the disc record and reproduction unit 14 records or reproduces information on or from the disc. In the disc conveying device 10, the magazine 200 can be attached to and detached from the main unit 12 when the disc record and reproduction unit 14 is located at an initial position on the Z-axis negative direction side.

The disc record and reproduction unit 14 of the disc conveying device 10 is opposed to the magazine 200 attached to the main unit 12 in the X-axis direction, and is movable in the Z-axis direction. Thus, the disc record and reproduction unit 14 can be opposed to one disc D' to be recorded or reproduced among the discs D arranged in the disc thickness direction at the disc waiting position in the X-axis direction.

The disc record and reproduction unit 14 has a disc conveying mechanism 16 that conveys the disc D' to be recorded or reproduced in the X-axis direction and a pick-up unit 18 that record information in the disc D' or reproduces the disc D'.

Figure 2A:
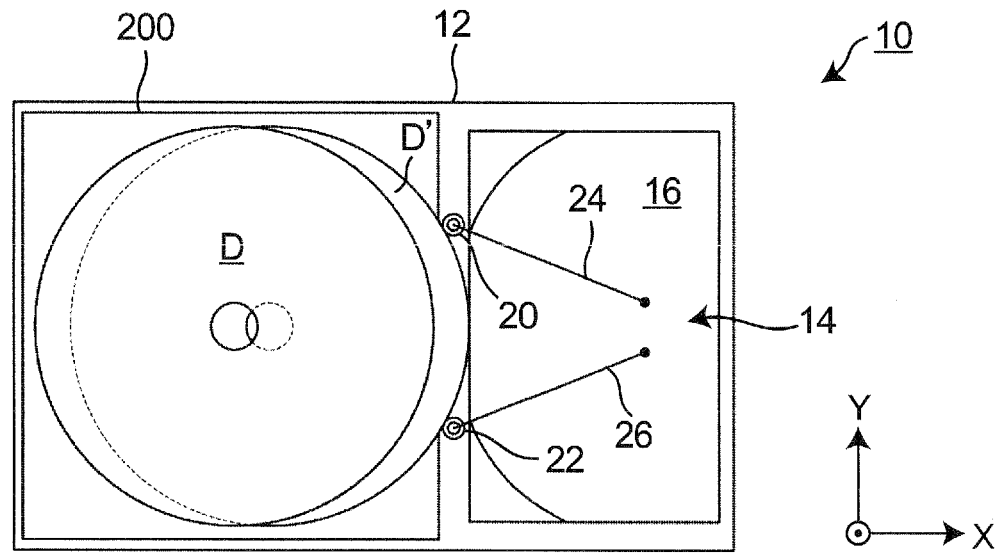
FIG. 2A is a schematic top view of the disc conveying device in accordance with the embodiment in the state where a disc conveying mechanism mounted in a disc record and reproduction unit receives a disc from a magazine or sends a disc to the magazine at the disc pass position.
Figure 2B:
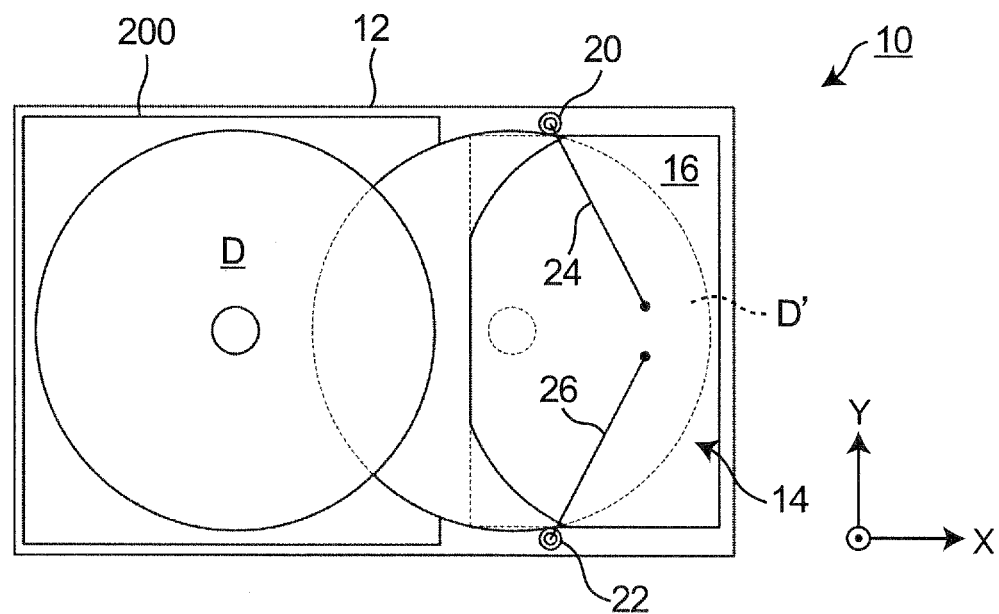
FIG. 2B is a schematic top view of the disc conveying device in the state where the disc conveying mechanism disposes a disc to the disc record/reproduction position in the disc record and reproduction unit.

FIGS. 2A to 2B are schematic top views of the disc conveying device 10, which are used to describe the disc conveying mechanism 16.

The disc conveying mechanism 16 mounted in the disc record and reproduction unit 14 includes a pair of rollers (a roller 20 and a roller 22) that sandwich the disc D' to be conveyed, that is, the disc D' to be recorded or reproduced and then rotate, conveying the disc D' in the X-axis direction.

For example, the rollers 20 and 22 positively rotate or negatively rotate about respective rotational center lines extending in the Z-axis direction in the state where the rollers are opposed to each other in the Y-axis direction (third direction) orthogonal to the Z-axis direction and the X-axis direction, and contact a radial end face of the disc D' to be recorded or reproduced.

Positively rotating the rollers 20 and 22 can move the disc D' to be recorded or reproduced in the X-axis positive direction, and negatively rotating the rollers 20 and 22 can move the disc D' in the X-axis negative direction. That is, the roller 20 and the roller 22 rotate in different directions.

The rollers 20 and 22 are supported at free ends of swing arms 24 and 26, respectively, which freely swing about respective swing center lines extending in the Z-axis direction. The swing arms 24 and 26 swing while keeping the rollers 20 and 22 opposed to each other in the Y-axis direction. The swing arms 24 and 26 also swing such that the rollers 20 and 22 move in the X-axis positive direction while being separated from each other in the Y-axis direction, or in its reverse direction.

Positively rotating the rollers 20 and 22 that contacts the radial end face of the disc D' to be recorded or reproduced causes the rollers 20 and 22 to rotate on the radial end face of the disc D' while being separated from each other in the Y-axis direction. The rollers 20 and 22 provided at the free ends of the freely-swinging swing arms 24 and 26, respectively, move in the X-axis positive direction. The disc D' moves in the X-axis positive direction relative to the rollers 20 and 22. Consequently, the disc D' is conveyed in the X-axis positive direction and as shown in FIG. 1C and FIG. 2B, is disposed at the disc record/reproduction position between the disc conveying mechanism 16 and the pick-up unit 18, where the pick-up unit 18 records information in the disc D' or reproduces the disc D'.

On the contrary, negatively rotating the rollers 20 and 22 that contacts the radial end face of the disc D' to be recorded or reproduced causes the rollers 20 and 22 to rotate on the radial end face of the disc D' while coming closer to each other in the Y-axis direction. The rollers 20 and 22 provided at the free ends of the freely-swinging swing arms 24 and 26, respectively, move in the X-axis negative direction. The disc D' moves in the X-axis negative direction relative to the rollers 20 and 22. Consequently, the disc D' is conveyed in the X-axis negative direction, and is conveyed from the disc record/reproduction position toward the magazine 200.

As shown in FIG. 1B and FIG. 2A, the rollers 20 and 22 of the disc conveying mechanism 16 receive one disc D' to be recorded or reproduced partially protruding in the X-axis positive direction (toward the disc record and reproduction unit 14) among the discs D arranged in the Z-axis direction.

To maximize the number of discs D arranged in the Z-axis direction (disc thickness direction) to make the disc conveying device 10 (magazine 200) more compact, the distance between the stored discs is reduced wherever possible. Thus, when contacting the radial end face of one disc D among the discs D densely arranged in the Z-axis direction, the rollers 20 and 22 may contact the radial end faces of the plurality of discs D.

As shown in FIG. 1B and FIG. 2A and as described in detail later, the disc conveying device 10 moves the disc D' to be recorded or reproduced such that the disc D' to be recorded or reproduced protrudes from the other discs D in the X-axis positive direction (toward the disc record and reproduction unit 14). Thus, the disc D' to be recorded or reproduced is disposed at a disc pass position between the disc waiting position and the disc record/reproduction position. Locating the disc D' to be recorded or reproduced at the disc pass position enables the rollers 20 and 22 of the disc conveying mechanism 16 to contact the radial end face of the disc D' to be recorded or reproduced without contacting the other discs D.

As shown in FIG. 2A, the position of the rollers 20 and 22 that can contact the radial end face of the disc D' to be recorded or reproduced disposed at the disc pass position is set to the initial position of the rollers 20 and 22 (roller initial position) relative to the disc record and reproduction unit 14. When the disc record and reproduction unit 14 moves in the Z-axis direction (disc thickness direction), the rollers 20 and 22 of the disc conveying mechanism 16 at the roller initial position do not hit against the magazine 200. In other words, when the rollers 20 and 22 are disposed at the roller initial position, the disc record and reproduction unit 14 moves in the Z-axis direction.

As described later and as shown in FIG. 1B and FIG. 1C, when the disc conveying device 10 conveys the disc D' to be recorded or reproduced to the disc record and reproduction unit 14, discs D" adjacent to the disc D' to be reproduced or recorded is separated from the disc D' in the Z-axis direction (disc thickness direction).

The disc conveying device 10 in accordance with the embodiment has been summarized. Each components of the disc conveying device 10 in accordance with the embodiment summarized above will be specifically described.

Figure 3:
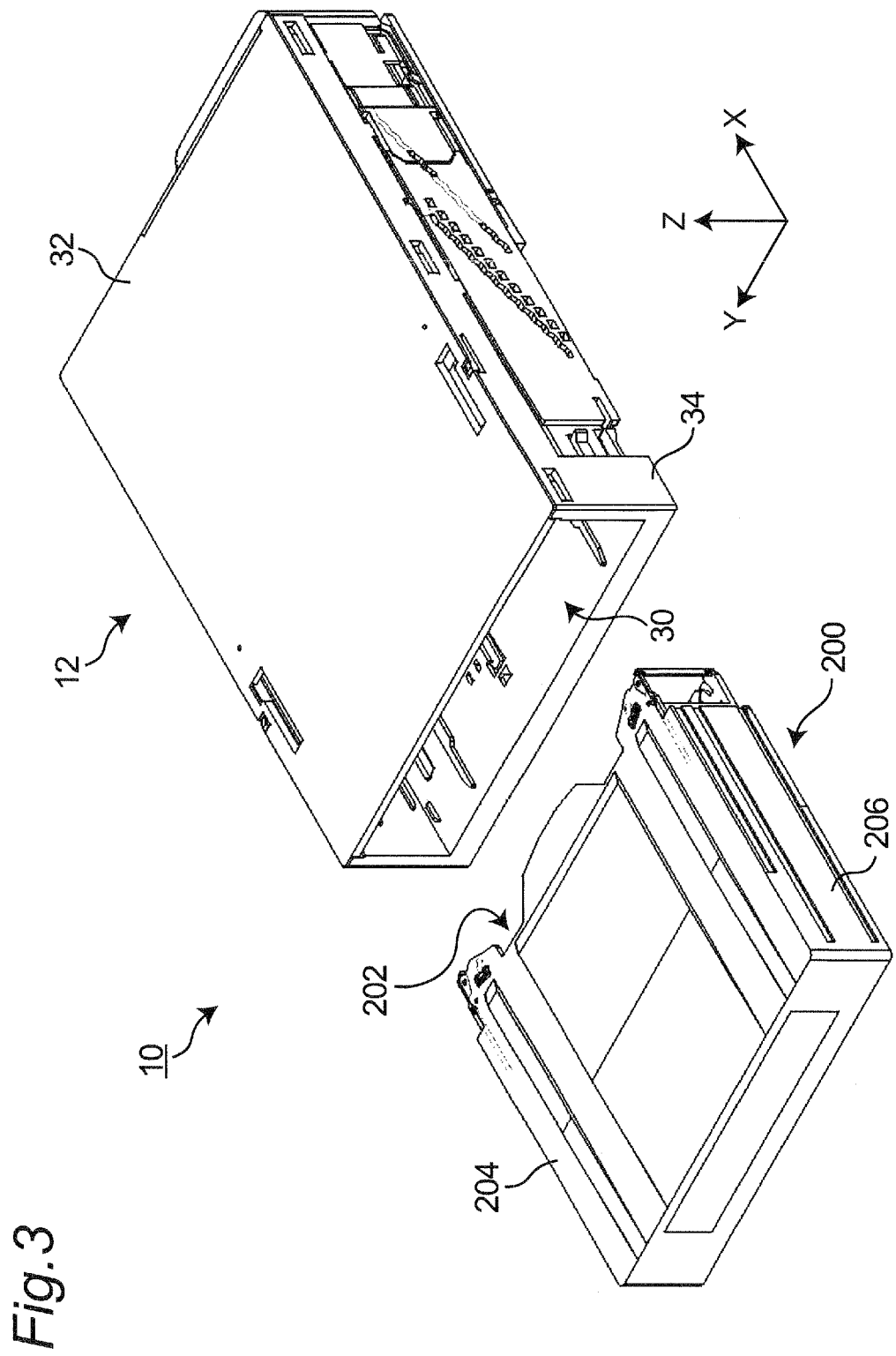
FIG. 3 is a perspective view of the disc conveying device with the magazine being detached.

FIG. 3 shows the disc conveying device 10 with the magazine 200 being detached from the main unit 12.

The main unit 12 of the disc conveying device 10 has an opening 30 for loading and unloading of the magazine 200 in the X-axis direction. The main unit 12 also has a plate-like top cover 32, and a base casing 34 engaged with the top cover 32 to form a space that stores the magazine 200 and the disc record and reproduction unit 14.

The magazine 200 has an opening 202 for loading and unloading of each of the discs D arranged in the Z-axis direction (disc thickness direction) in the X-axis direction. The magazine 200 also has an L-shaped top casing 204, and a bottom casing 206 engaged with the top casing 204 to form a space that stores the plurality of disc D.

Figure 4:
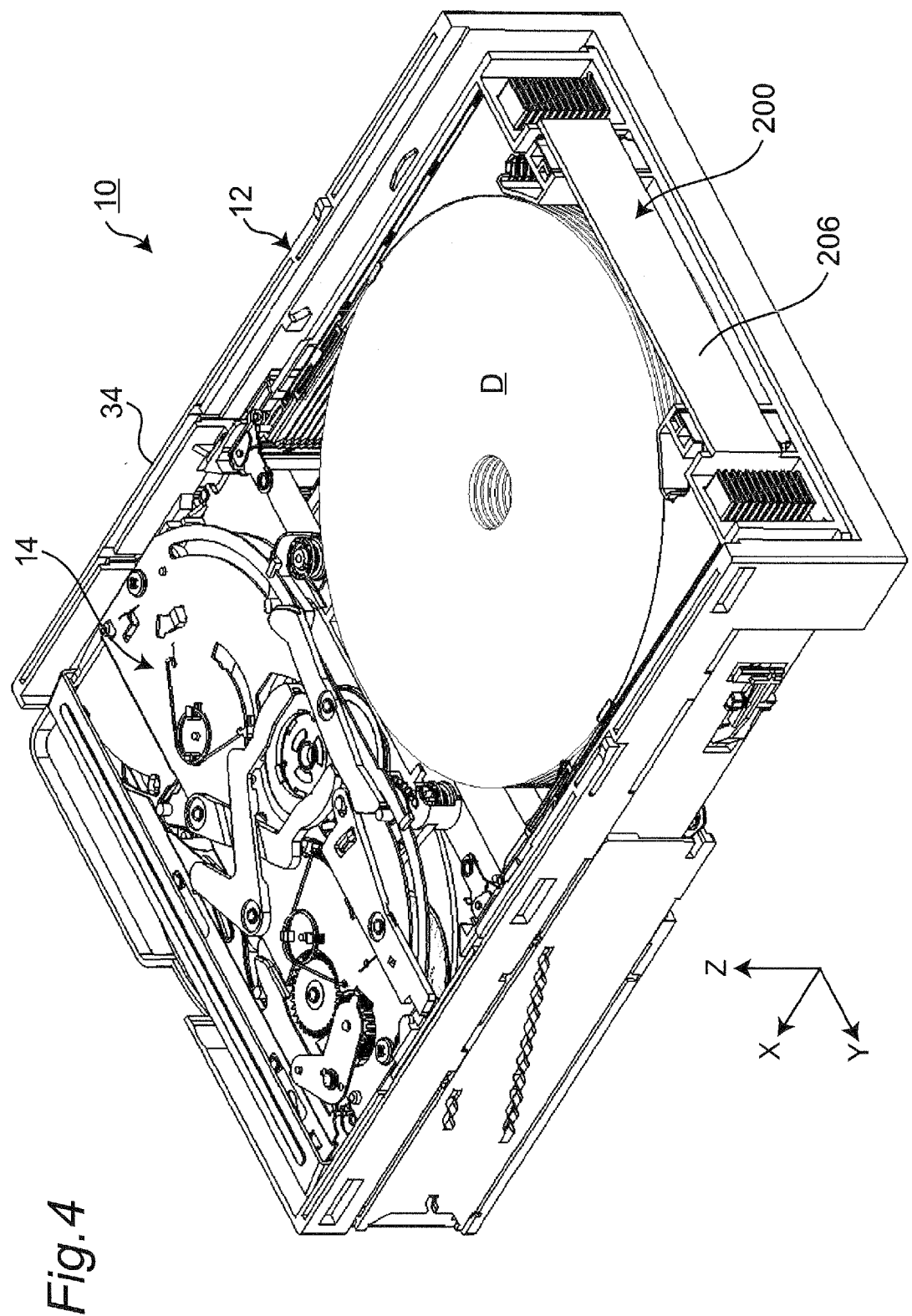
FIG. 4 is a partial exploded view of the disc conveying device with the magazine being attached.

FIG. 4 is a partial exploded view of the disc conveying device 10 with the magazine 200 being attached. In particular, FIG. 4 shows the state where the top cover 32 of the disc conveying device 10 and the top casing 204 of the magazine 200 are detached.

As shown in FIG. 4, attaching the magazine 200 to the main unit 12 of the disc conveying device 10 locates the discs D arranged in the Z-axis direction at the disc waiting position (See FIG. 1A).

(Magazine)

The magazine 200 will be described below in detail.

Figure 5:
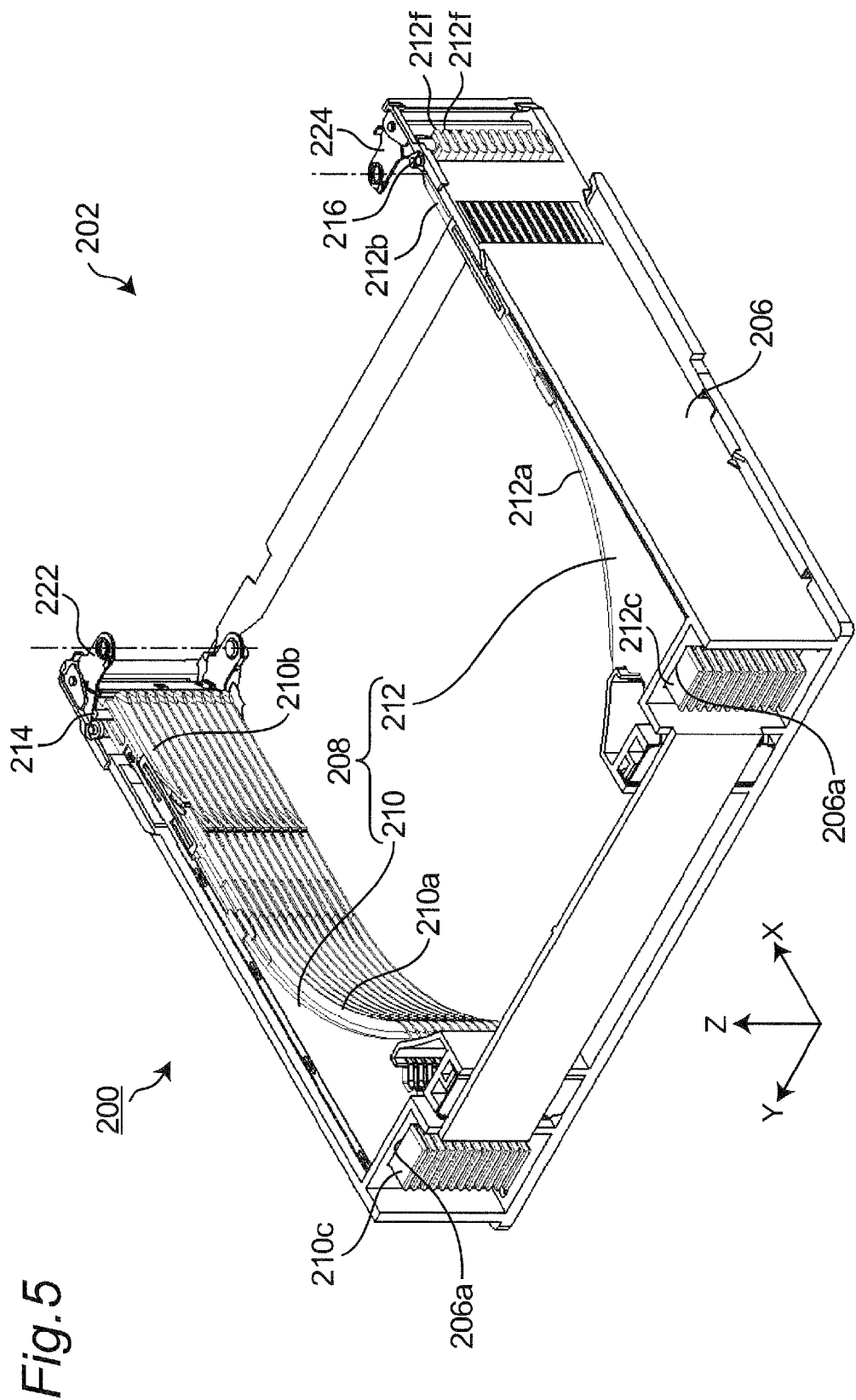
FIG. 5 is a partial exploded view of the magazine.

FIG. 5 is a partial exploded view of the magazine 200 in the state where the plurality of disc D is not stored and the top casing 204 is detached.

To make the device more compact, the discs densely arranged in the thickness direction (Z-axis direction) are stored in the magazine 200. The discs D are stored in the Z-axis direction without contacting each other.

In particular, as shown in FIG. 5, the magazine 200 includes a plurality of disc holders 208 that are disc holding member each holding the disc D.

Figure 6:
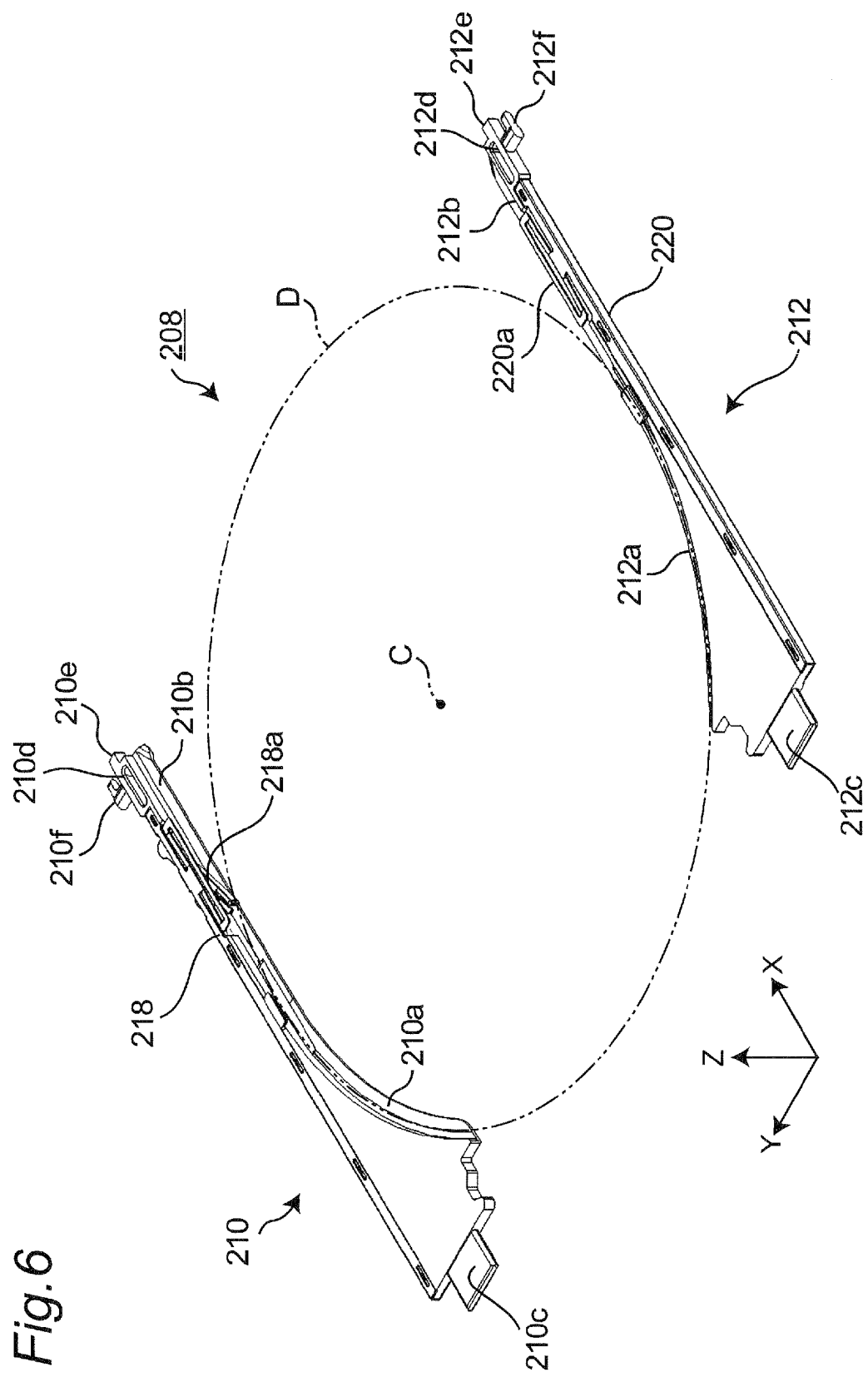
FIG. 6 is a perspective view of a disc holder of the magazine.

FIG. 6 is a perspective view of the disc holder 208 that holds one disc D.

Figure 7:
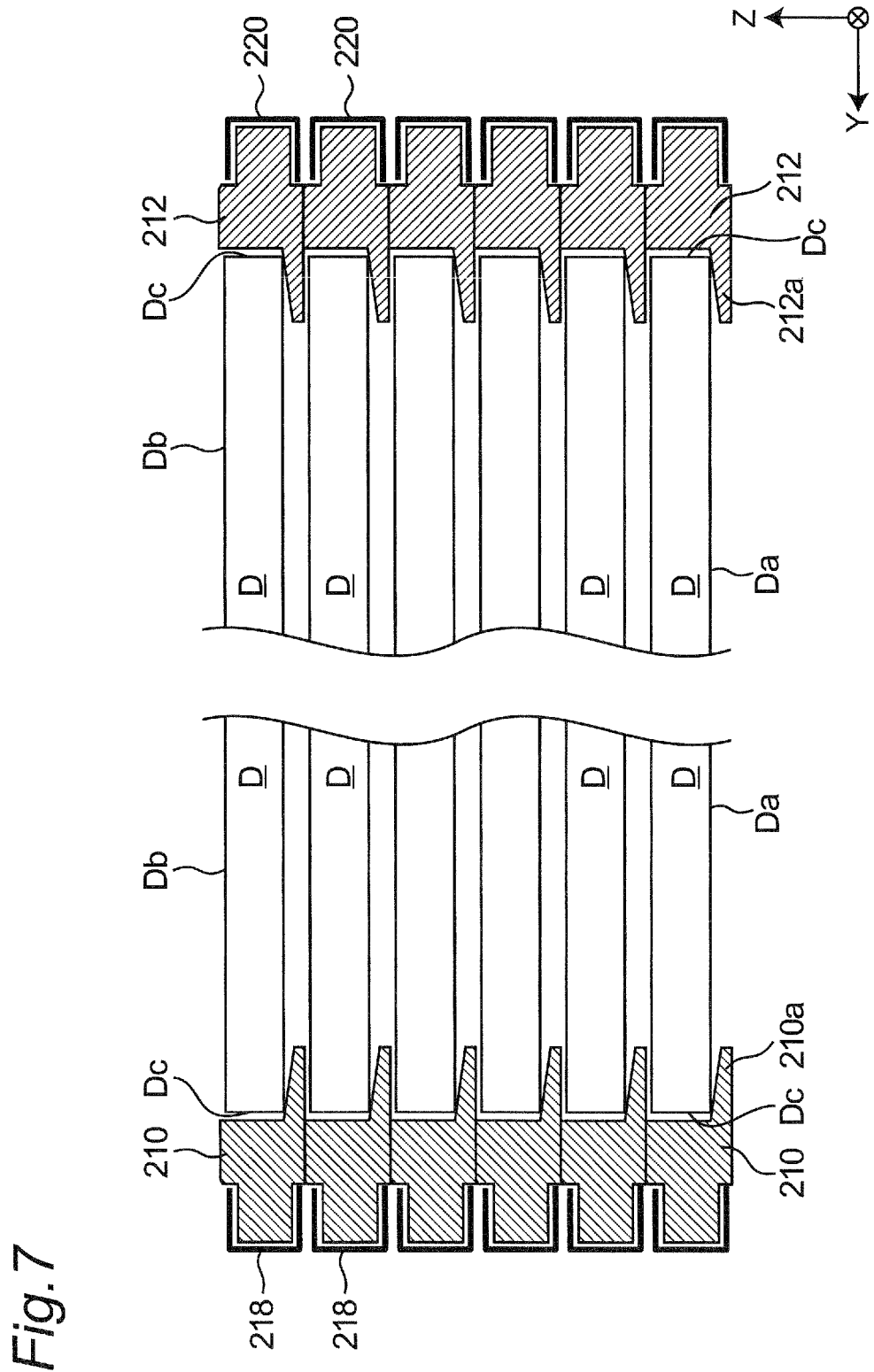
FIG. 7 is a sectional view of the disc holders of the magazine.

FIG. 7 is a sectional view of the disc holders 208.

As shown in FIG. 6 and FIG. 7, the disc holders 208 for holding one disc D, for example, includes a thin plate-like disc holding plates 210 and 212 divided into two in the Y-axis direction.

The disc holding plates 210 and 212 of the disc holders 208 are made of a resin material, for example. The disc holding plates 210 and 212 hold the discs D to be slidable in the X-axis positive direction (toward the disc record and reproduction unit 14).

In particular, the disc holding plates 210 and 212 of each disc holder 208 has holding portions 210a and 212a that hold the disc D, respectively, and guide portions 210b and 212b that guide the disc D during conveyance in the X-axis direction using the disc conveying mechanism 16 (and the rollers 20 and 22) mounted in the disc record and reproduction unit 14.

The holding portion 210a of the one disc holding plate 210 holds an outer edge of a first face Da (on the Z-axis negative direction side, a face on which information is recorded) on the X-axis negative direction side from a center C of the disc D (opposite side to the disc record and reproduction unit 14) and on the Y-axis positive direction side, and a radial end face Dc.

The holding portion 212a of the other disc holding plate 212 holds an outer edge of the first face Da on the X-axis negative direction side from the center C of the disc D (opposite side to the disc record and reproduction unit 14) and on the Y-axis negative direction, and the radial end face Dc.

As shown in FIG. 7, the holding portions 210a of the disc holding plates 210 and the holding portions 212a of the disc holding plates 212 each have an inclined face that contacts a corner between the first face Da and the radial end face Dc of the disc D.

The holding portion 210a of the disc holding plate 210 and the holding portion 212a of the disc holding plate 212 hold the disc D with the radial end face Dc of the disc D, which is sandwiched between the rollers 20 and 22 of the disc conveying mechanism 16 as shown in FIG. 2A, being exposed. The disc D is held to the disc holding plates 210 and 212 (disc holders 208) while being restricted in movement in the X-axis negative direction (opposite side to the disc record and reproduction unit 14) and being slidable in the X-axis positive direction (toward the disc record and reproduction unit 14 side).

As shown in FIG. 6, the guide portion 210b of the disc holding plate 210 and the guide portion 212b of the disc holding plate 212 extend from the holding portions 210a and 212a, respectively, in the X-axis positive direction (toward the disc record and reproduction unit 14). When the disc conveying mechanism 16 (the rollers 20 and 22) mounted in the disc record and reproduction unit 14 conveys the disc D in the X-axis direction, the guide portions 210b and 212b opposed to the outer edge of the first face Da of the disc D guide the disc D.

To store more discs arranged in the Z-axis direction (disc thickness direction) with a small size, as shown in FIG. 7, the plurality of disc holders 208 (disc holding plates 210 and 212) are stacked in contact with each other in the disc thickness direction (Z-axis direction) without contacting a second face Db (a face opposite to the first face Da) of the disc D.

Referring to FIG. 5 again, the disc holding plates 210 and 212 stacked in the Z-axis direction (disc thickness direction) each are stored in the bottom casing 206 of the magazine 200 to be movable in the X-axis direction and the Z-axis direction.

With this configuration, by moving the disc holding plates 210' and 212' that hold the disc D' to be recorded or reproduced, which is to be conveyed with the disc conveying mechanism 16 in the X-axis positive direction (toward the disc record and reproduction unit 14), as shown in FIG. 1B and FIG. 2A, the disc D' to be recorded or reproduced is protruded from the other discs D in the X-axis positive direction. That is, the disc D' is disposed at the disc pass position. Additionally, as described later, the adjacent disc holding plates 210 and 212 are separated from the disc holding plates 210' and 212' that hold the disc D' to be recorded or reproduced in the Z-axis direction.

In particular, as shown in FIG. 6, the disc holding plates 210 and 212 have tongues 210c and 212c protruding from the X-axis negative direction side (opposite side to the disc record and reproduction unit 14) in the X-axis direction, respectively. The disc holding plates 210 and 212 also has guide holes 210d and 212d extending in the X-axis direction on the X-axis positive direction side (toward the disc record and reproduction unit 14 side), respectively. The guide holes 210d and 212d penetrate the respective plate in the Z-axis direction (disc thickness direction).

As shown in FIG. 5, the bottom casing 206 of the magazine 200 has a plurality of support holes 206a that are arranged in the Z-axis direction (disc thickness direction) and penetrates in the X-axis direction. The tongues 210c and 212c of the disc holding plates 210 and 212 are inserted into the support holes 206a on the X-axis negative direction side (opposite side to the disc record and reproduction unit 14) of the bottom casing 206 to be slidable in the X-axis direction and swingable in the Z-axis direction. The bottom casing 206 also has guide pins 214 and 216 that extend in the Z-axis direction, and pass through the guide holes 210d and 212d of the disc holding plates 210 and 212.

The tongues 210c and 212c and the guide holes 210d and 212d of the disc holding plates 210 and 212, the support holes 206a of the bottom casing 206, and the guide pins 214 and 216 enable the disc holding plates 210 and 212 to be stored in the magazine 200 so as to be movable in the X-axis direction and the Z-axis direction.

As described above, by moving the disc holding plates 210' and 212' that hold the disc D' to be recorded or reproduced in the X-axis positive direction (toward the disc record and reproduction unit 14 side), as shown in FIG. 1B and FIG. 2A, one disc D' to be recorded or reproduced can be protruded from the other discs D in the X-axis positive direction. That is, as shown in FIG. 2A, the disc D' to be recorded or reproduced can be disposed at the disc pass position.

Additionally, as described later, the adjacent disc holding plates 210 and 212 can be separated from the disc holding plates 210' and 212' that hold the disc D' to be recorded or reproduced in the Z-axis direction.

The resin disc holding plates 210 and 212 of the disc holders 208 are made thin as much as possible (its dimension in the Z-axis direction is made small as much as possible) such that the disc conveying device 10 can store many discs D arranged in the Z-axis direction (disc thickness direction) while keeping compact in size, that is, the distance between the discs is minimized. However, this makes the disc holding plates 210 and 212 easily deformable.

Thus, as shown in FIG. 6, reinforcing members 218 and 220 extending in the X-axis direction are attached to both ends of the disc holder 208 in the Y-axis direction, that is, on the outer sides (opposite side to the disc D) of the disc holding plates 210 and 212 in the Y-axis direction.

The reinforcing members 218 and 220 each are formed of a thin metal plate. As shown in FIG. 7, the reinforcing members 218 and 220 can cover the outer ends (opposite side to the disc D) of the disc holding plates 210 and 212 in the Y-axis direction. For example, the reinforcing members 218 and 220 each have a U-like cross section orthogonal to the X-axis direction, and a thickness smaller than that of each of the disc holding plates 210 and 212 (dimension in the Z-axis direction). The resin disc holding plates 210 and 212 reinforced with the metal reinforcing members 218 and 220, respectively, can be made thin as much as possible. Therefore, the disc conveying device 10 can store many discs D while keeping compact in size.

Further, the disc holders 208, that is, the disc holding plates 210 and 212 are manufactured taking it into consideration that the disc conveying device 10 may take various positions during use.

For example, in the state where the disc holding plates 210 is located on the upper side and the disc holding plate 212 is located on the lower side, that is, the Y-axis positive direction matches the upside direction, the disc conveying device 10 may be used. In this case, during conveyance, the disc D that is not guided with the guide portions 210b and 212b of the disc holding plates 208 and 210 can fall toward the second face Db.

As a countermeasure, in addition to the guide portions 210b and 212b opposed to the first face Da of the disc D to guide the disc D, other guide portions opposed to the opposite second face Db of the disc D to guide the disc D may be provided as opposed to the guide portions 210b and 212b in the Z-axis direction (disc thickness direction).

However, providing the other guide portions on the disc holding plates 210 and 212 as opposed to the guide portions 210b and 212b, respectively, in the Z-axis direction (disc thickness direction) increases the thicknesses of the disc holding plates 210 and 212. Consequently, when the plurality of disc holding plates 210 and 212 are stacked, a total thickness increases.

Thus, one disc holding plates 210 has a guide portion 218a movable in the Z-axis direction so as to move close to the guide portion 210b when the disc holding plates 210 are stacked in the Z-axis direction (disc thickness direction) and to move away from the guide portion 210b when the disc holding plates 210 are separated from each other. Similarly, the other disc holding plate 212 has a guide portion 220a movable in the Z-axis direction so as to move close to or away from the guide portion 212b.

Figure 8A:
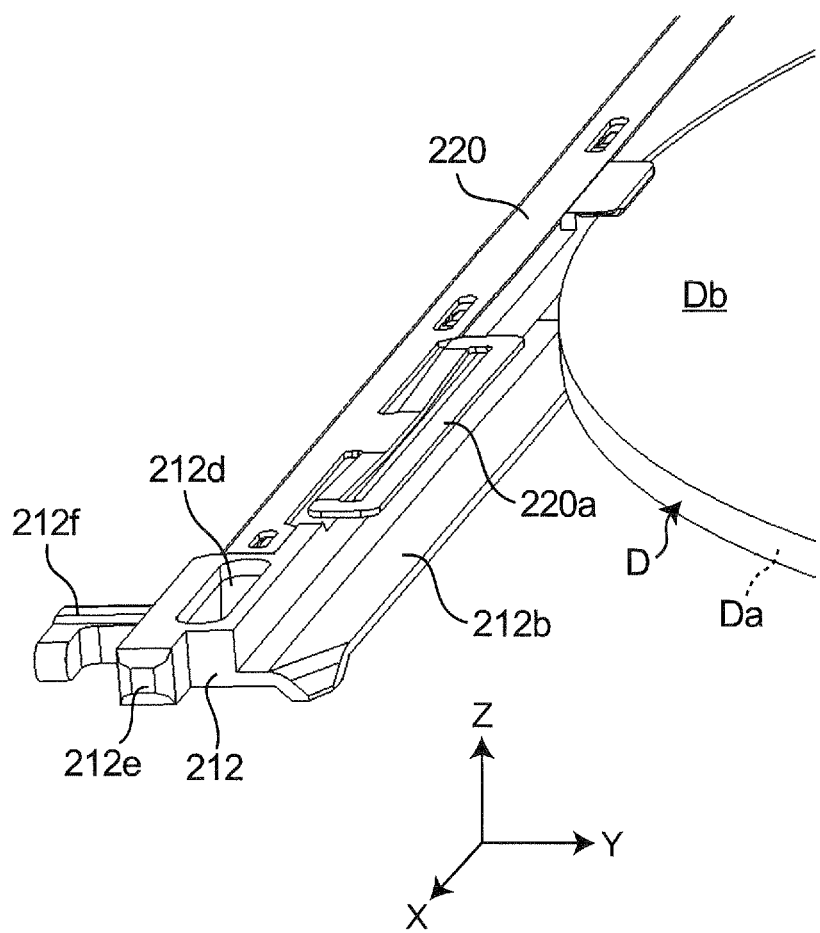
FIG. 8A is a perspective view of two guide portions of one disc holding plate of the disc holder.
Figure 8B:
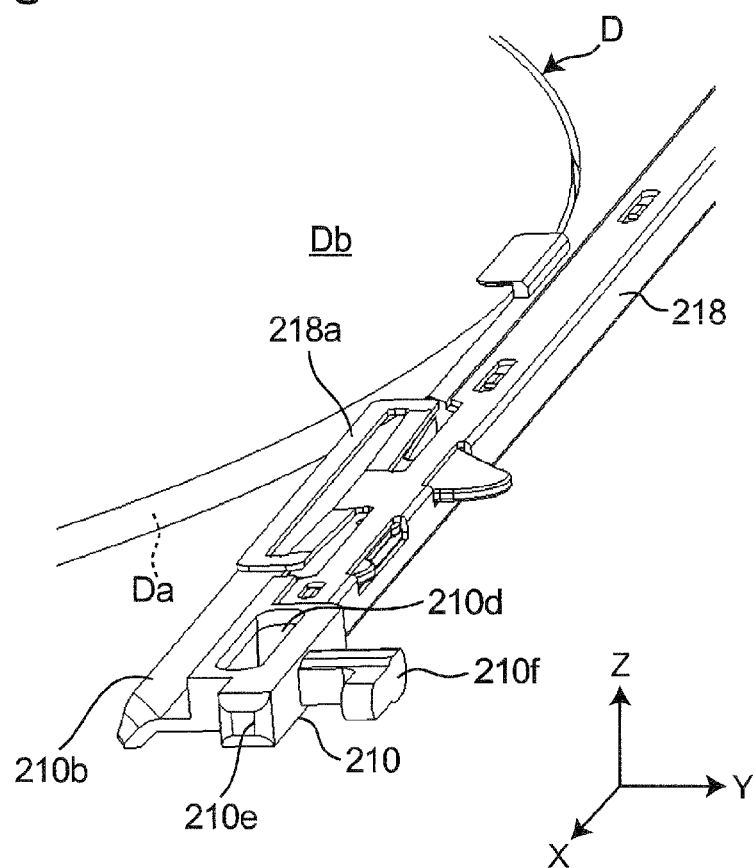
FIG. 8B is a perspective view of two guide portions of the other disc holding plate of the disc holder.

FIG. 8A shows the two guide portions 212b and 220a of the disc holding plate 212. FIG. 8B shows the two guide portions 210b and 218a of the disc holding plate 210.

As shown in FIG. 8A and FIG. 8B, the guide portions 210b and 212b opposed to the first face Da of the disc D when the disc conveying mechanism 16 (the rollers 20 and 22) mounted in the disc record and reproduction unit 14 conveys the disc D in the X-axis direction are formed on the disc holding plates 210 and 212, respectively. The guide portions 218a and 220a that are opposed to the second face Db of the disc D and can move in the Z-axis direction are parts of the reinforcing members 218 and 220 made of thin metal plates, respectively.

As shown in FIG. 8A and FIG. 8B, the guide portions 218a and 220a as the parts of the reinforcing members 218 and 220 are leaf springs that can warp in the disc thickness direction (Z-axis direction), that is, can move close to or away from the opposed guide portions 210b and 212b. FIG. 8A shows the state where the guide portion 212b and the guide portion 220a are separated from each other so as to pass the disc D therebetween. FIG. 8B shows the state where the guide portion 210b and the guide portion 218a are separated from each other so as to pass the disc D therebetween. The guide portions 218a and 220a do not overlap the disc D located at the disc waiting position when viewed from the Z-axis direction.

Even when moving close to the guide portions 210b and 212b, the guide portions 218a and 220a never contact the guide portions 210b and 212b.

Through the operation of other adjacent disc holding plates 210 and 212, the guide portion 210b and the guide portion 218a of the disc holding plate 210 move close to and away from each other, and the guide portion 212b and the guide portion 220a of the disc holding plate 212 move close to and away from each other. This will be described using the disc holding plates 210 as an example.

Figure 9A:
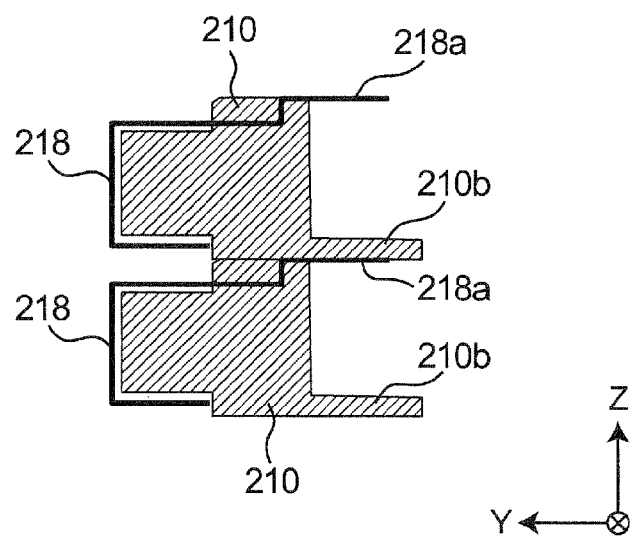
FIG. 9A is a sectional view of the guide portions of one disc holding plate pressed by an adjacent disc holding plate.

When the disc holding plates 210 are stacked in the Z-axis direction (disc thickness direction) as shown in FIG. 9A as a sectional view of the disc holding plates 210, the guide portion 218a of the reinforcing member 218 is pressed by the disc holding plate 210 adjacent in the Z-axis direction, moving close to the opposed guide portion 210b. At this time, the disc holding plates 210 contact each other in the Z-axis direction, and the guide portion 218a moves close to the guide portion 210b so as not to exceed the thickness of the disc holding plates 210 (the dimension in the Z-axis direction).

When the disc holding plates 210 are separated from each other as shown in FIG. 9B, the guide portion 218a of the reinforcing member 218 is released from the pressure of the disc holding plate 210 adjacent in the Z-axis direction (disc thickness direction), moving away from the opposed guide portion 210b. This generates a gap between the two guide portions 210b and 218a, through which the disc D can pass.

By using the guide portions 218a and 220a movable in the Z-axis direction (disc thickness direction), the magazine 200 can store many discs D arranged in the thickness direction while keeping compact in size, and during use of the disc conveying device 10 in various positions, the disc D can be guided from the magazine 200 to the disc record and reproduction unit 14.

As shown in FIG. 5, the magazine 200 further includes locking members 222 and 224 that selectively restrict movement of the disc holders 208, that is, the disc holding plates 210 and 212, respectively.

As described above, the disc holding plates 210 and 212 are stored in the magazine 200 to be movable in the X-axis direction and the Z-axis direction (disc thickness direction). Consequently, for example, during conveyance of the magazine 200 detached from the disc conveying device 10, the disc holding plates 210 and 212 may pivot. Further, when being slid in the X-axis direction, the disc holding plates 210 and 212 should be fixed in the Z-axis direction.

Thus, as shown in FIG. 5, the magazine 200 has the locking members 222 and 224 that selectively restrict movement of the disc holding plates 210 and 212, respectively, in the Z-axis direction (disc thickness direction).

As shown in FIG. 5, the locking member 222 is disposed on the X-axis positive direction side (disc record and reproduction unit 14 side) of the disc holding plates 210 stacked in the Z-axis direction (disc thickness direction), and the locking member 224 is disposed on the X-axis positive direction side of the disc holding plates 212.

The locking members 222 and 224 are supported to the magazine 200 to be swingable about respective swing center lines extending in the Z-axis direction (disc thickness direction). In particular, the locking members 222 and 224 each swing between a locking position where movement of the disc holding plates 210 and 212 in the Z-axis direction is restricted and a locking release position where the restriction of movement of the disc holding plates 210 and 212 in the Z-axis direction is released.

A method of selectively limiting the movement of the disc holding plates 210 in the Z-axis direction (disc thickness direction) with the locking member 222 is the same as a method of selectively limiting the movement of the disc holding plates 210 in the Z-axis direction with the locking member 224. Thus, only the locking member 224 will be hereinafter described and the description of the locking member 222 will be omitted.

FIG. 10A is a perspective partial view of the disc holding plates 212 in the state where the locking member 224 is located at the locking position, that is, the locking member 224 restricts movement in the Z-axis direction (disc thickness direction). FIG. 10B is a perspective partial view of the disc holding plates 212 in the state where the locking member 224 is located at the locking release position, that is, the locking member 224 releases the restriction of movement in the Z-axis direction.

Figure 11A:
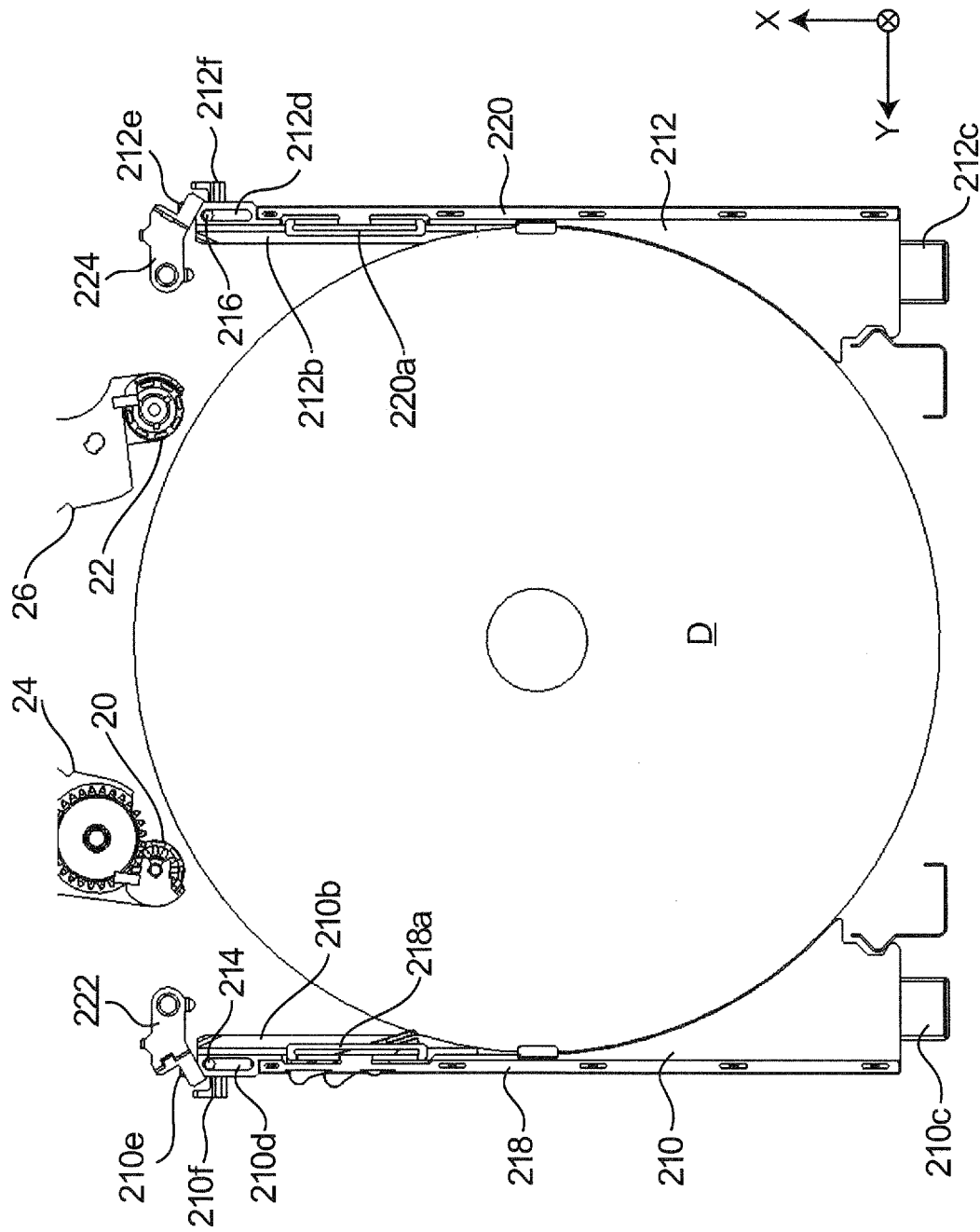
FIG. 11A is a top view of the disc holding plates in the state where a locking member restricts movement in the disc thickness direction.
Figure 11B:
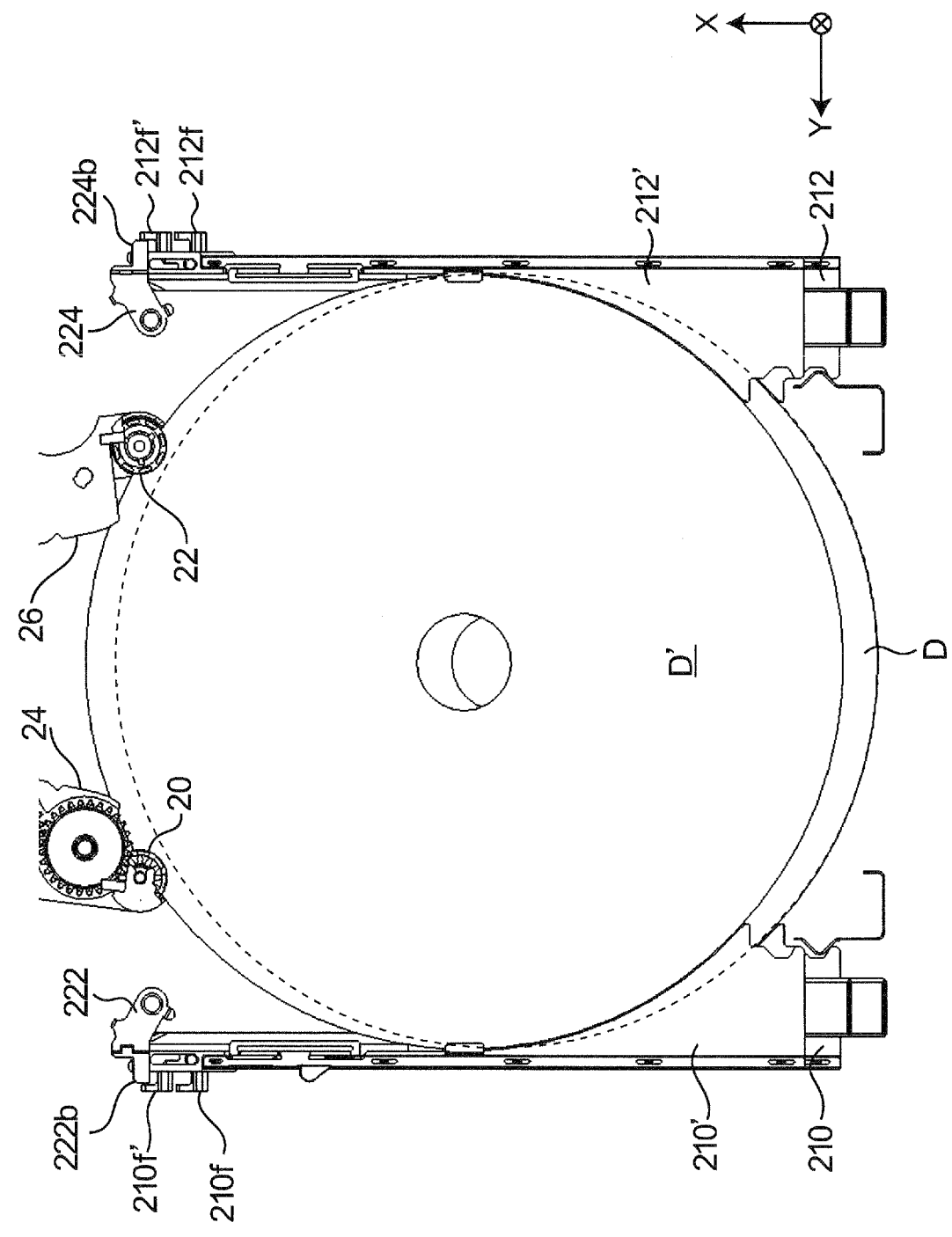
FIG. 11B is a top view of the disc holding plates in the state where the locking member releases the restriction of movement in the disc thickness direction.

FIG. 11A corresponds to FIG. 10A, and is a top view of the disc holding plates 210 and 212 in the state where the locking members 222 and 224 restrict movement of the disc holding plates 210 and 212 in the Z-axis direction (locking position). FIG. 11B corresponds to FIG. 10B, and is a top view of the disc holding plates 210 and 212 in the state where the locking members 222 and 224 release the restriction of movement of the disc holding plates 210 and 212 in the Z-axis direction (locking release position).

As shown in FIG. 10A and FIG. 10B, the locking member 224 has an engaging hole 224a detachably engaged with front ends 212e of the disc holding plates 210 on the X-axis positive direction side (disc record and reproduction unit 14 side). The engaging hole 224a of the locking member 224 is dimensioned so as to receive the front ends 212e when the front ends 212e of the disc holding plates 212 are stacked in the Z-axis direction (disc thickness direction), and to restrict movement of the received front ends 212e in the Z-axis direction. Inclined faces 224c that guide the front ends 212e of the disc holding plates 212 into the engaging hole 224a are provided at both ends of the engaging hole 224a in the Z-axis direction. Even when the disc holding plates 212 are separated from each other in the Z-axis direction, the inclined faces 224c can guide the front ends 212e stacked in the Z-axis direction into the engaging hole 224a.

In particular, at the locking position as shown in FIG. 10A and FIG. 11A, the engaging hole 224a of the locking member 224 receives the front ends 212e of the disc holding plates 212, which are stacked in the Z-axis direction (disc thickness direction). This restricts the front ends 212e of the disc holding plates 212 from moving in the Z-axis direction (disc thickness direction).

At the locking release position as shown in FIG. 10B and FIG. 11B, the front ends 212e of the disc holding plates 212 are retracted outside the engaging hole 224a of the locking member 224. This enables the front ends 212e of the disc holding plates 212 to move in the Z-axis direction (disc thickness direction).

The locking member 224 (222) can releasably restrict movement of the disc holding plates 212 (210) in the Z-axis direction (disc thickness direction).

The disc holding plates 210' and 212' that holds the disc D' to be recorded or reproduced moves in the X-axis positive direction (toward the disc record and reproduction unit 14 side), thereby releasing restriction of movement of the disc holding plates 210 and 212 with the locking members 222 and 224, that is, moving the locking members 222 and 224 from the locking position to the locking release position.

When the disc D' to be recorded or reproduced is displaced from the disc waiting position to the disc pass position as shown in FIG. 1B and FIG. 2A, the disc holding plates 210' and 212' of the disc holder 208' that holds the disc D' to be recorded or reproduced moves in the X-axis positive direction (toward the disc record and reproduction unit 14 side). Moving the disc holding plates 210' and 212' displaces the locking members 222 and 224 from the locking position to the locking release position.

To move the locking members 222 and 224 from the locking position to the locking release position, as shown in FIG. 6, protrusions 210f and 212f are provided at both ends of each disc holder 208 in the Y-axis direction, that is, on the outer side (opposite side to the disc D) of the disc holding plates 210 and 212 in the Y-axis direction.

Describing the protrusion 212f of the disc holding plate 212 as an example, as shown in FIG. 10A, the protrusion 212f is formed near the front end 212e of the disc holding plate 212 on the X-axis positive direction side (disc record and reproduction unit 14 side). The protrusion 212f is shaped like a hook that can engage with a handle bar 224b extending in the Z-axis direction (disc thickness direction) of the locking member 224 when the disc holding plate 212 moves in the X-axis positive direction (disc record and reproduction unit 14 side). The handle bar 224b is a part of the locking member 224 having the engaging hole 224a formed therein.

When the disc holding plates 210' and 212' that holds the disc D' to be recorded or reproduced is moved in the X-axis positive direction (toward the disc record and reproduction unit 14 side) to locate the disc D' to be recorded or reproduced at the disc pass position as shown in FIG. 1B and FIG. 2A, bottoms of the protrusions 210f' and 212f' engage with the handle bars 222b and 224b of the locking members 222 and 224 as shown in FIG. 10B. When the disc holding plates 210' and 212' are further moved in the X-axis positive direction, the locking members 222 and 224 moves from the locking position toward the locking release position. Then, when the disc D' to be recorded or reproduced is located at the disc pass position as shown in FIG. 11B, the locking members 222 and 224 are disposed at the locking release position.

The magazine 200 has been described in detail. Next, disc holder moving mechanisms for moving the disc holding plates 210 and 212 of the disc holders 208 of the magazine 200 will be described.

(Disc Holder Moving Mechanisms)

The disc record and reproduction unit 14 is provided with the disc holder moving mechanisms for moving the disc holder 208 (disc holding plates 210 and 212) that holds the disc D' to be recorded or reproduced in the X-axis positive direction (toward the disc record and reproduction unit 14 side) to locate the disc D' to be recorded or reproduced at the disc pass position as shown in FIG. 1B and FIG. 2A.

Figure 12:
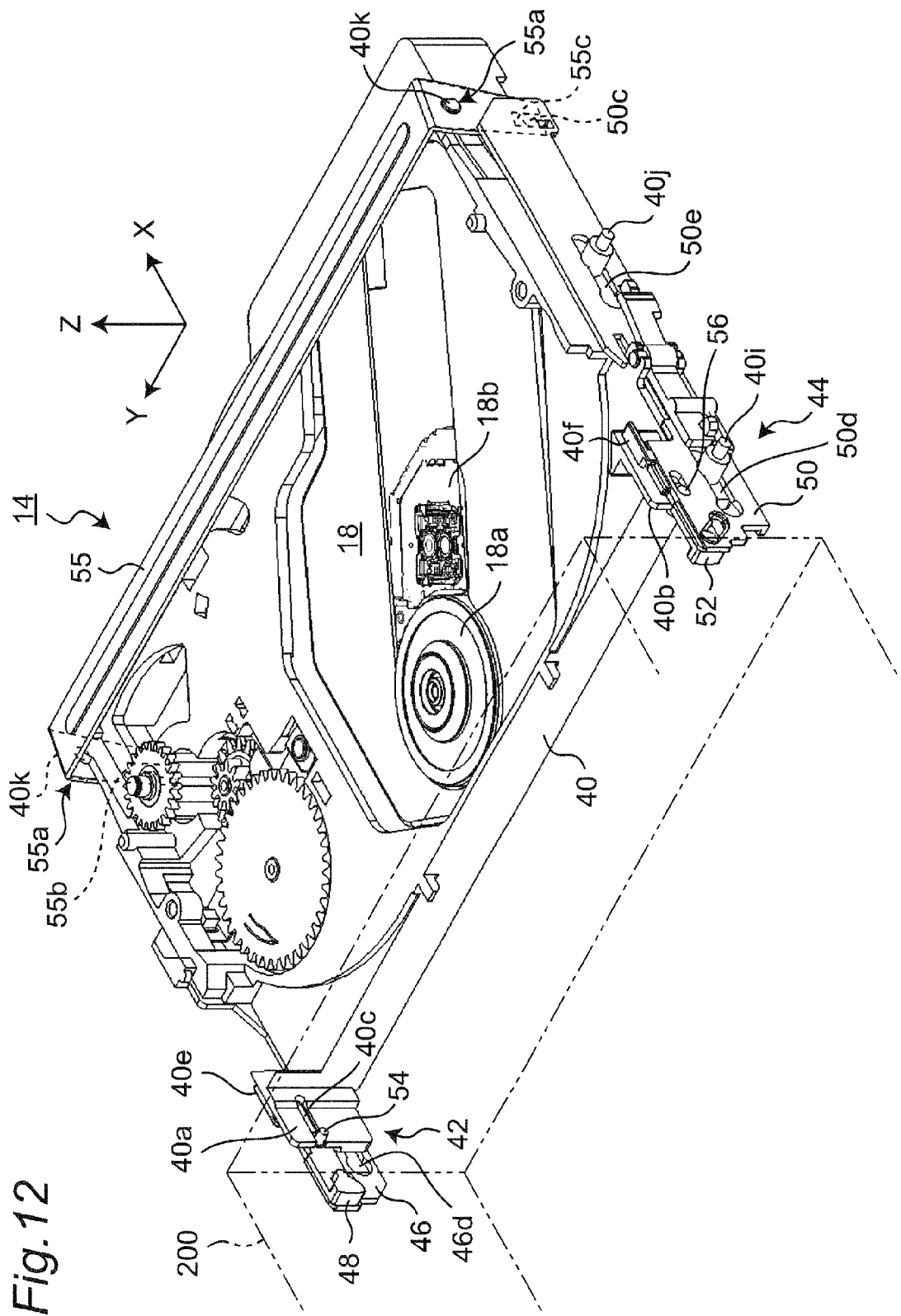
FIG. 12 is a perspective view of the disc record and reproduction unit with the disc conveying mechanism being detached.

FIG. 12 is a perspective view of the disc record and reproduction unit 14 with the disc conveying mechanism 16 being detached.

FIG. 12 shows a base unit 40 of the disc record and reproduction unit 14. Although not shown in FIG. 12, the disc conveying mechanism 16 is provided on the base unit 40. The base unit 40 includes the pick-up unit 18 that records information on the disc D or reproduces information from the disc D, disc holder holding portions 40a and 40b that hold the disc holding plates 210' and 212' of the disc holder 208' holding the disc D' to be recorded or reproduced, and disc holder moving mechanisms 42 and 44 that moves the disc holding plates 210' and 212' that hold the disc D' to be recorded to the disc holder holding portions 40a and 40b.

The pick-up unit 18 is mounted on the base unit 40 of the disc record and reproduction unit 14 to be movable in the Z-axis direction (disc thickness direction). The pick-up unit 18 has a spindle 18a that holds and rotates the disc D' to be recorded or reproduced and a pickup 18b that moves in the disc radial direction of the disc D' and records information on the disc D' or reproduces information from the disc D'.

After disposing the disc D' to be recorded or reproduced on the base unit 40 (that is, at the disc record/reproduction position between the base unit 40 and the disc conveying mechanism 16), the pick-up unit 18 moves close to the disc D' and then the spindle 18a holds the disc D'. Upon completion of recording or reproduction of the disc D', the pick-up unit 18 releases the disc D' and is separated from the disc D'.

As shown in FIG. 1B and FIG. 2A, the disc holder holding portions 40a and 40b of the base unit 40 hold the disc holding plates 210' and 212' of the disc holder 208' holding the disc D' to be recorded or reproduced disposed at the disc pass position.

One disc holder holding portion 40a is provided at the base unit 40 so as to be opposed to one disc holding plate 210 of the disc holder 208 in the X-axis direction when the magazine 200 is attached to the main unit 12 of the disc conveying device 10. The disc holder holding portion 40a has a slit 40c that stores the protrusion 210f of the one disc holding plates 210' holding the disc D' to be recorded or reproduced. Moving the disc holding plates 210' holding the disc D' to be recorded or reproduced in the X-axis positive direction (toward the disc record and reproduction unit 14 side) causes the protrusion 210f to enter into the slit 40c of the disc holder holding portion 40a. Consequently, the one disc holder holding portion 40a holds the one disc holding plates 210' holding the disc D' to be recorded or reproduced.

Similarly, the other disc holder holding portion 40b is provided at the base unit 40 so as to be opposed to the other disc holding plate 212 of the disc holder 208 in the X-axis direction. The disc holder holding portion 40b has a slit 40d that stores the protrusion 212f of the other disc holding plate 212' holding the disc D' to be recorded or reproduced (see FIG. 17). The slit 40d of the other disc holder holding portion 40b holds the other disc holding plate 212' holding the disc D' to be recorded or reproduced.

One disc holder moving mechanism 42 moves one disc holding plates 210' in the X-axis positive direction (toward the disc record and reproduction unit 14 side) such that the protrusion 210f of one disc holding plates 210' of the disc holder 208' that holds the disc D' to be recorded or reproduced enters into the slit 40c of one disc holder holding portion 40a. To this end, the disc holder moving mechanism 42 has a slider 46 that slides along the disc holder holding portion 40a in the X-axis direction and a cam 48 that is provided on the slider 46 and contacts the protrusion 210f of the disc holding plate 210'.

The other disc holder moving mechanism 44 moves the other disc holding plate 212' in the X-axis positive direction (toward the disc record and reproduction unit 14 side) such that the protrusion 212f of the other disc holding plate 212' that holds the disc D' to be recorded or reproduced enters into a slit 40d of the other disc holder holding portion 40b. To this end, the disc holder moving mechanism 44 has a slider 50 that slides along the disc holder holding portion 40b in the X-axis direction and a cam 52 that is provided on the slider 50 and contacts the protrusion 212f of the disc holding plate 212'.

As shown in FIG. 12, the slider 46 of the disc holder moving mechanism 42 for the disc holding plates 210 is a plate that extends in the X-axis direction and is located on the outer side of the disc holder holding portion 40a of the base unit 40 for the disc holding plates 210 in the Y-axis direction. The slider 46 has long holes 46d and 46e extending in the X-axis direction (see, for example, FIG. 14 for the long hole 46e). By engaging the long holes 46d and 46e with bottoms of driven pins 40g and 40h of the base unit 40, the slider 46 is supported to the base unit 40 to be movable along the disc holder holding portion 40a in the X-axis direction (see, for example, FIG. 19 for the driven pins 40g and 40h).

The slider 50 of the disc holder moving mechanism 44 for the disc holding plates 212 is a plate that extends in the X-axis direction, and is located on the outer side of the disc holder holding portion 40b of the base unit 40 for the disc holding plates 212 in the Y-axis direction. The slider 50 has long holes 50d and 50e extending in the X-axis direction. By engaging the long holes 46d and 46e with bottoms of the driven pins 40i and 40j of the base unit 40, the slider 50 is supported to the base unit 40 to be movable along the disc holder holding portion 40b in the X-axis direction.

Figure 13:
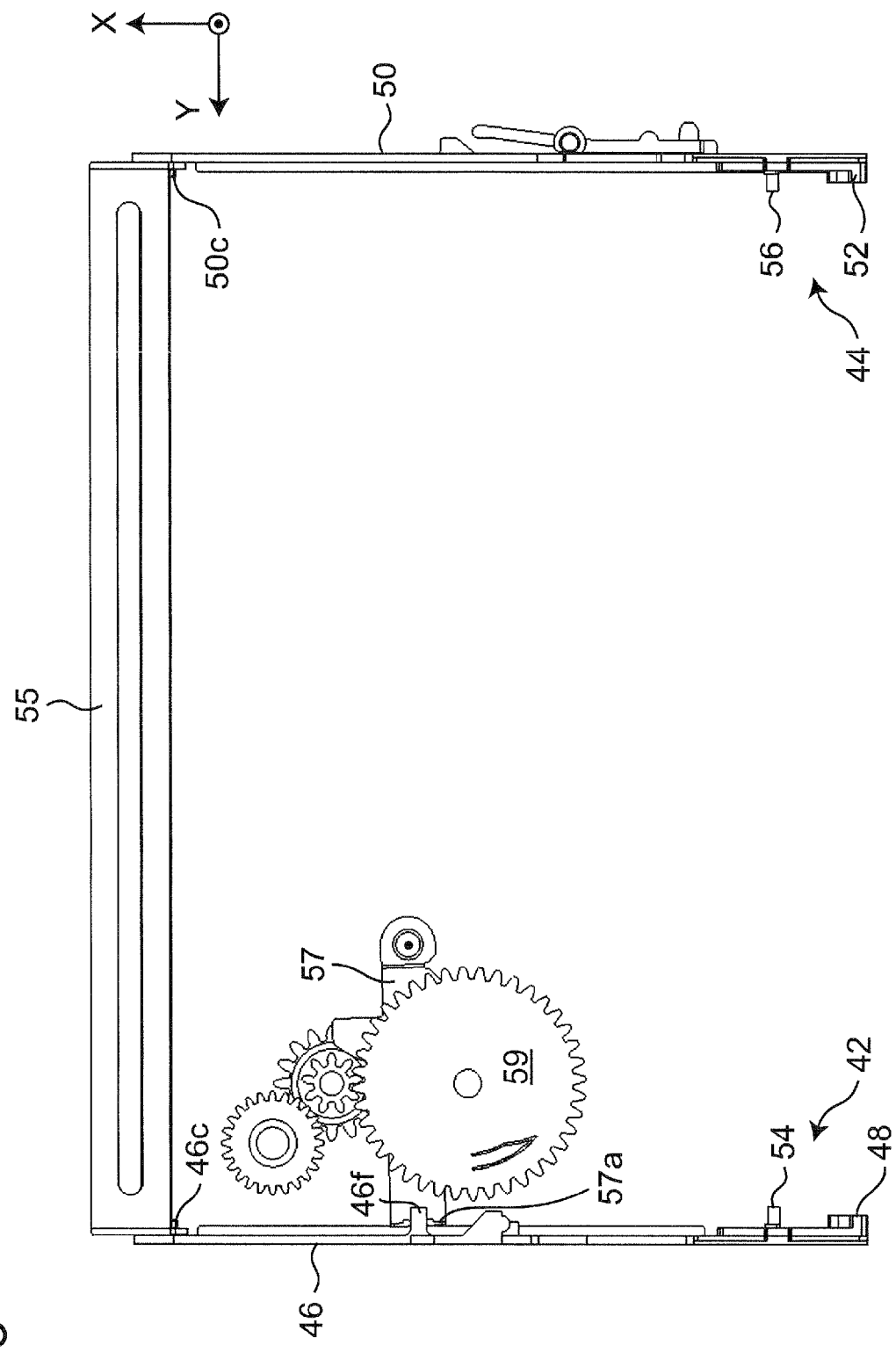
FIG. 13 is a view of the configuration for moving sliders of the disc holder moving mechanisms.
Figure 14:
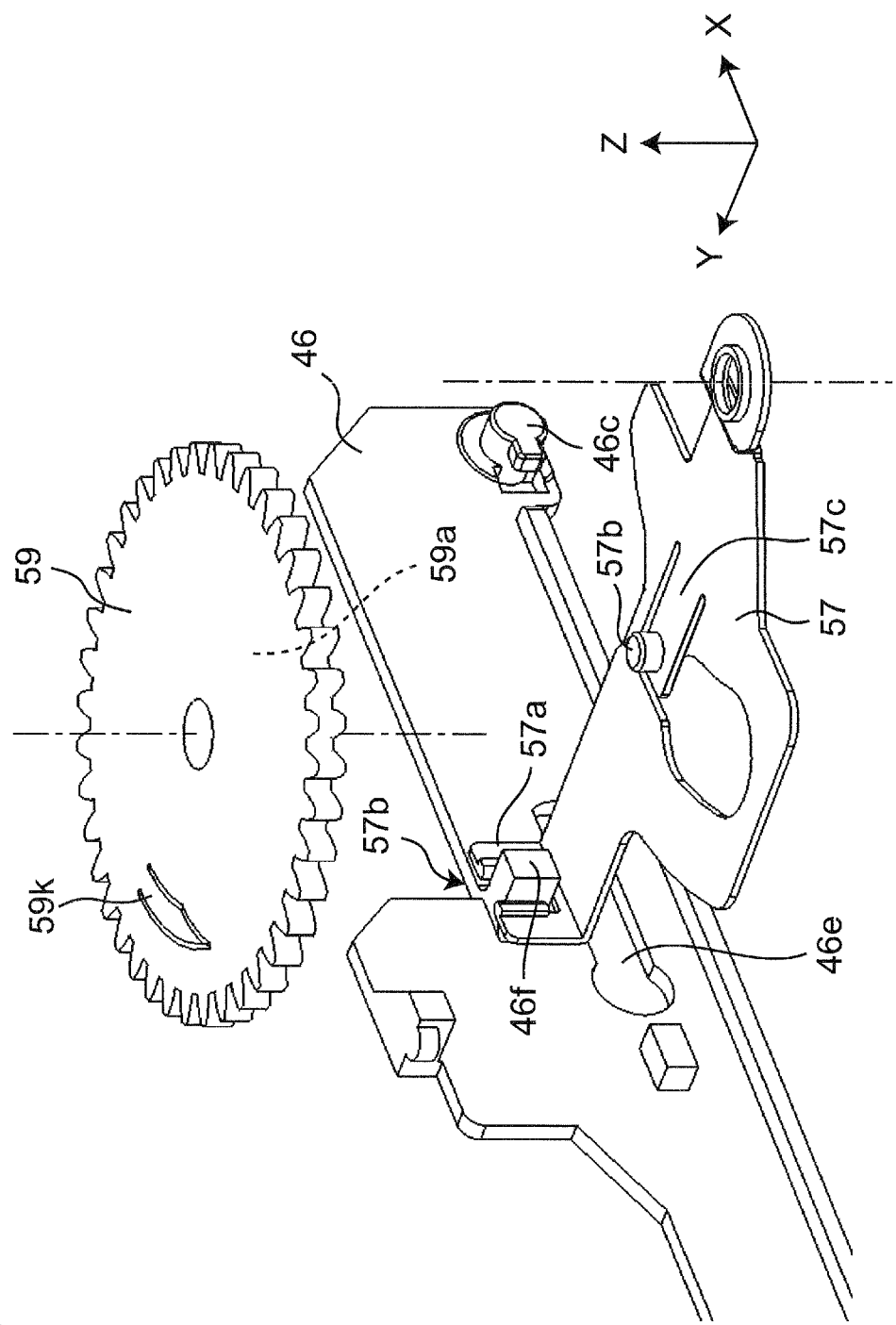
FIG. 14 is a perspective view of a part of the slider of one disc holder moving mechanism.

FIG. 13 shows the configuration for moving the slider 46 of the disc holder moving mechanism 42 and the slider 50 of the disc holder moving mechanism 44. FIG. 14 shows a part of the slider 46 of one disc holder moving mechanism 42, that is, the slider 46 on the X-axis positive direction side (opposite side to the cam 48).

As shown in FIG. 13, the operation of the slider 46 of the disc holder moving mechanism 42 synchronizes with that of the slider 50 of the disc holder moving mechanism 44 via a link lever 55. In particular, as shown in FIG. 12, the link lever 55 extends in the Y-axis direction, and both ends thereof are bent along end faces of the base unit 40 in the Y-axis direction. Each of the ends of the link lever 55 has a through hole 55i a. Support pins 40k provided at both ends of the base unit 40 in the Y-axis direction are inserted into the respective through holes 55a. Consequently, the link lever 55 is supported to the base unit 40 to be swingable about a swing center line extending in the Y-axis direction.

The both ends of the link lever 55 are connected to the sliders 46 and 50. In particular, notches 55b and 55c are formed at the both ends of the link lever 55. Engaging pins 46c and 50c engaged with the notches 55b and 55c of the link lever 55 are formed on the sliders 46 and 50, respectively (see FIG. 14 for the engaging pin 46c). When one slider 46 moves in the X-axis direction in the state where the notches 55b and 55c of the link lever 55 engage with the engaging pins 46c and 50c of the sliders 46 and 50, respectively, the link lever 55 swings about the support pins 40k of the base unit 40. Accordingly, the other slider 50 moves in the same direction as the one slider 46.

The synchronizing movement of the sliders 46 and 50 in the X-axis direction is driven by swinging of a slider driving lever 57 forming a part of the disc is holder moving mechanisms 42 and 44 shown in FIG. 13. In particular, as shown in FIG. 14, the slider driving lever 57 swings about a swing center line extending in the Z-axis direction, and its free end 57a is connected to the slider 46 of one disc holder moving mechanism 42. The free end 57a has a notch 57b, and a protrusion 46f engaged with the notch 57b is formed on the slider 46. The slider driving lever 57 swings about the swing center line extending in the Z-axis direction, moving the slider 46 in the X-axis direction.

As shown in FIG. 13 and FIG. 14, a cam disc 59 is provided as a means for swinging the slider driving lever 57, that is, a driving source for the sliders 46 and 50 of the disc holder moving mechanisms 42 and 44. The cam disc 59 rotates about a rotational center line extending in the Z-axis direction, and overlaps the slider driving lever 57 in the Z-axis direction.

Figure 15:
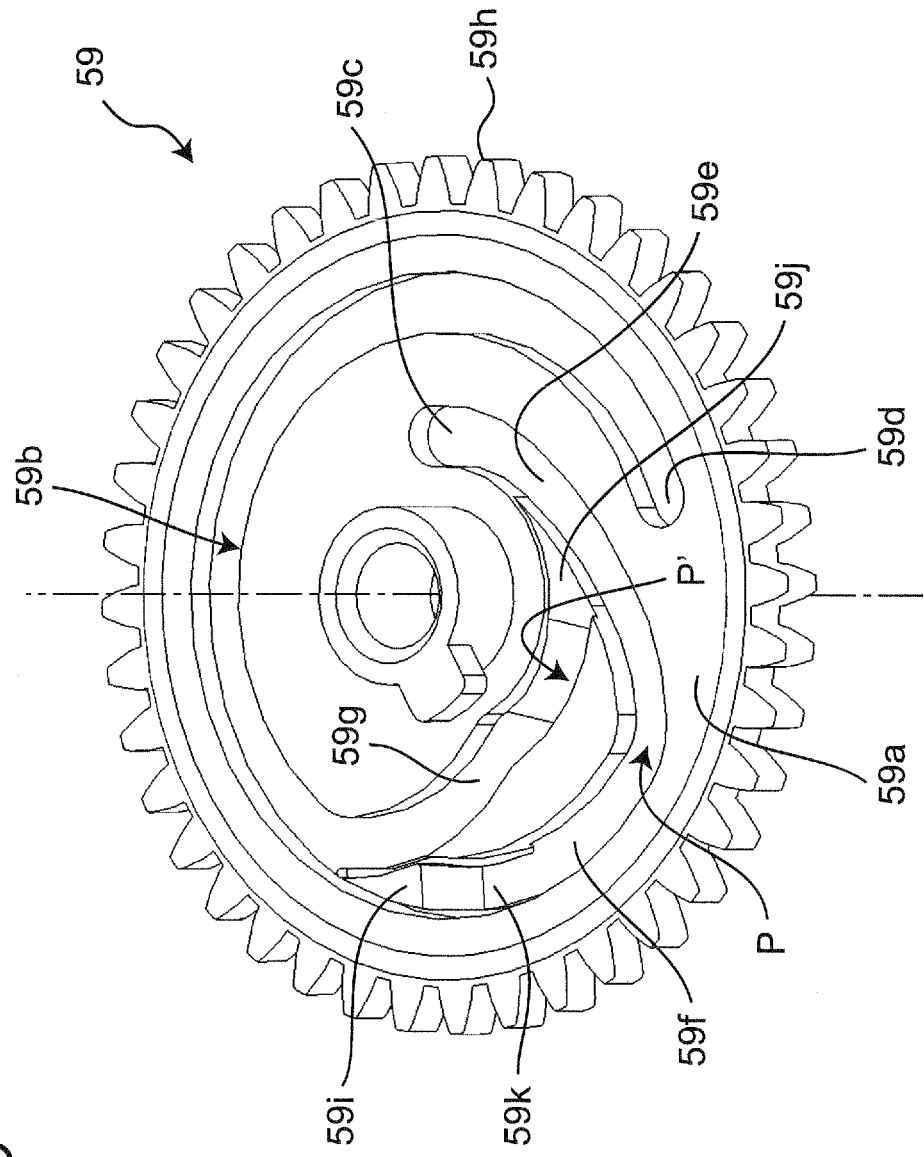
FIG. 15 is a perspective view of a cam disc that drives a slider of the disc holder moving mechanism.

FIG. 15 is a perspective view of the cam disc 59. As shown in FIG. 15, a helical groove 59b is formed in a face 59a opposed to the slider driving lever 57. The groove 59b includes an inner circumferential end 59c near the rotational center of the cam disc 59 and an outer circumferential end 59d disposed on the radial outer side, and spirally extends from the inner circumferential end 59c to the outer circumferential end 59d.

As shown in FIG. 14, a driven pin 57b engaged with the groove 59b of the cam disc 59 is formed on the slider driving lever 57.

When the cam disc 59 rotates in the state where the driven pin 57b of the slider driving lever 57 engages with the groove 59b of the cam disc 59, the driven pin 57b moves with the groove 59b, swinging the slider driving lever 57.

When the driven pin 57b of the slider driving lever 57 is located at the inner circumferential end 59c of the groove 59b of the disc 59, the sliders 46 and 50 are located closest to the X-axis negative direction side (the magazine 200 side). When the driven pin 57b is located at the outer circumferential end 59d, the sliders 46 and 50 are located closest to the X-axis positive direction side (disc record and reproduction unit 14 side).

In particular, the groove 59b of the cam disc 59 includes a first groove 59e that extends from the inner circumferential end 59c toward the radial outer side of the cam disc 59 and a second groove 59f that extends from the first groove 59e to the outer circumferential end 59d along the radial end face of the cam disc 59. A connecting point P of the first groove 59e and the second groove 59f, and the outer circumferential end 59d are located at the substantially same radial position. That is, when the driven pin 57b of the slider driving lever 57 is moving in the second groove 59f between the connecting point P and the outer circumferential end 59d, the sliders 46 and 50 are located closest to the X-axis positive direction side.

The cam disc 59 further includes a third groove 59g that allows the driven pin 57b of the slider driving lever 57 moving from the outer circumferential end 59d toward the inner circumferential end 59c to bypass the connecting point P of the first groove 59e and the second groove 59f. The third groove 59g is located closer to the rotational center of the cam disc 59 than the connecting point P.

That is, when moving the sliders 46 and 50 in the X-axis positive direction, the driven pin 57b of the slider driving lever 57 moves from the inner circumferential end 59c of the groove 59b to the outer circumferential end 59d through the connecting point P of the first groove 59e and the second groove 59f. When moving the sliders 46 and 50 in the X-axis negative direction, the driven pin 57b of the slider driving lever 57 moves from the outer circumferential end 59d of the groove 59b to the third groove 59g through the connecting point of the second groove 59f and the third groove 59g, and finally to the inner circumferential end 59c.

Stepped portions 59i and 59j and a cantilever spring 59k are provided on the groove 59b of the cam disc 59, and the driven pin 57b of the slider driving lever 57 is provided at a free end of a cantilever spring 57c, such that the driven pin 57b of the slider driving lever 57 that moves from the inner circumferential end 59c toward the outer circumferential end 59d do not enter from the first groove 59e into the third groove 59g, and the driven pin 57b that moves from the outer circumferential end 59d toward the inner circumferential end 59c enters into the third groove 59g. This enables operational branch of the driven pin 57b, and in moving from the inner circumferential end 59c toward the outer circumferential end 59d, and moving from the outer circumferential end 59d toward the inner circumferential end 59c, the driven pin 57b can follow different paths.

The reason why the path of the driven pin 57b of the slider driving lever 57 moving from the inner circumferential end 59c toward the outer circumferential end 59d is different from the path of the driven pin 57b moving from the outer circumferential end 59d toward the inner circumferential end 59c will be described later.

As shown in FIG. 15, the cam disc 59 further includes teeth 59h on its radial end face. The cam disc 59 is rotated using a gear that engages with the teeth 59h and is rotated with a motor (not shown) or the like.

Additionally, to interlock the disc holder moving mechanisms 42 and 44 with the disc conveying mechanism 16, the cam disc 59 rotates with rotation of one roller 20 of the disc conveying mechanism 16 and swinging of the swing arms 24 and 26. For example, rotating the roller 20 and the cam disc 59 with a common driving force operates the roller 20, the swing arms 24 and 26, and the cam disc 59 together.

Next, the cams 48 and 52 of the disc holder moving mechanisms 42 and 44 will be described. The configuration of the disc holder moving mechanisms 42 and 44 is identical except that the disc holder moving mechanisms 42 and 44 are symmetric about a Z-X plane and thus, only the disc holder moving mechanism 44 will be described, and the description of the disc holder moving mechanism 42 will be omitted. Referring to FIGS. 12, 16A, 16B, 17, and 18A to 18D, the disc holder moving mechanism 44 is described.

FIG. 16A is an enlarged view of the disc holder moving mechanism 44 for the disc holding plate 212 when viewed from the Y-axis negative direction. FIG. 16A shows the state where the slider 50 is located closest to the X-axis negative direction side (magazine 200 side). As described later in detail and as shown in FIG. 16A, in the state where the slider 50 is located closest to the X-axis negative direction side, the discs D arranged in the Z-axis direction (disc thickness direction) are disposed at the disc waiting position as shown in FIG. 1A. At this time, the driven pin 57b of the slider driving lever 57 shown in FIG. 14 is located at the inner circumferential end 59c of the groove 59b of the cam disc 59 shown in FIG. 15.

FIG. 16B shows the state where the slider 50 is closest to the X-axis positive direction side (disc record and reproduction unit 14 side). As described later in detail, in the state where the slider 50 is located closest to the X-axis positive direction side as shown in FIG. 16B, the disc D' to be recorded or reproduced is disposed at the disc pass position as shown in FIG. 1B and FIG. 2A. At this time, the driven pin 57b of the slider driving lever 57 shown in FIG. 14 is located at the outer circumferential end 59d of the groove 59b of the cam disc 59 shown in FIG. 15.

Figure 17:
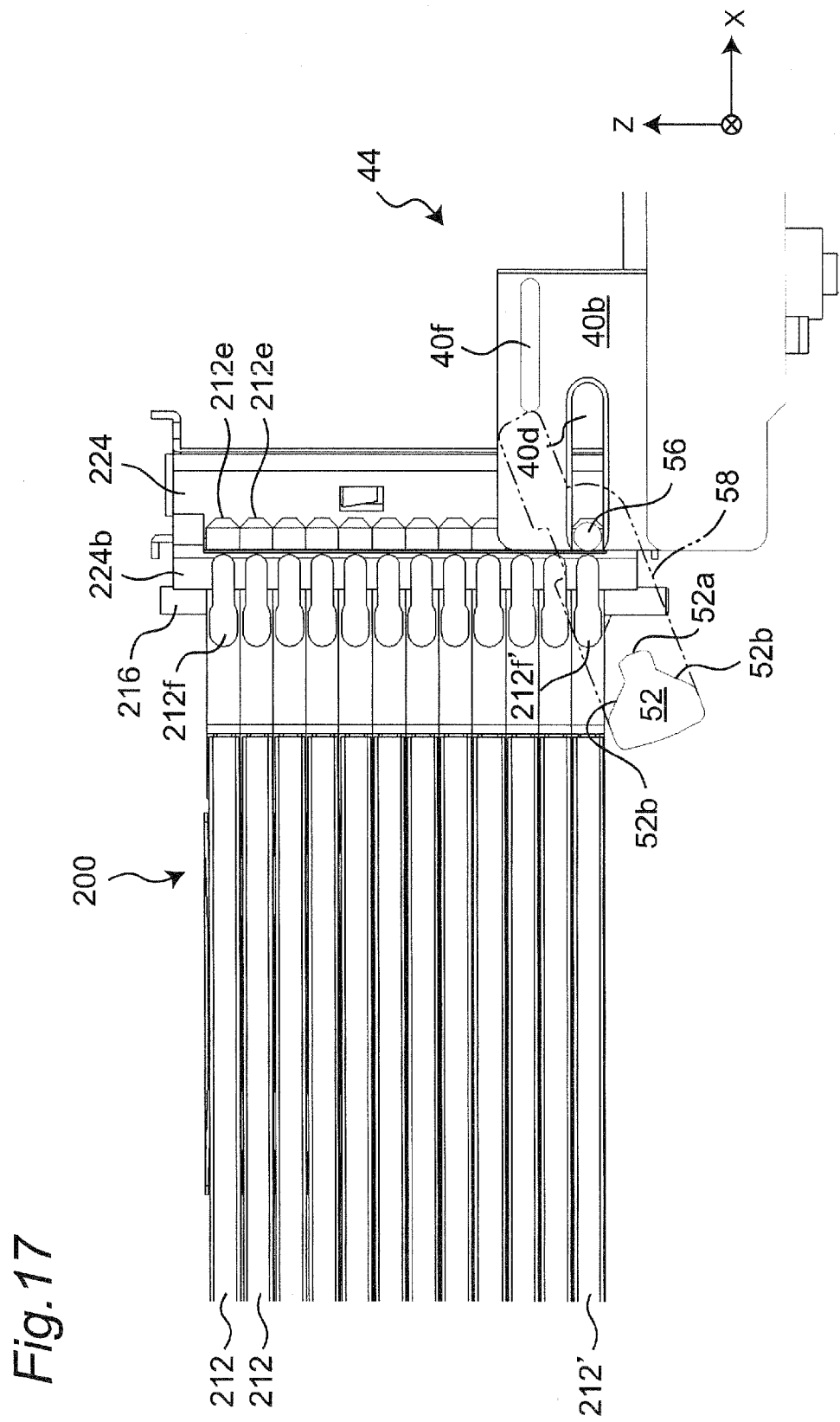
FIG. 17 is an enlarged view of the disc holder moving mechanism in the state where the disc record and reproduction unit is disposed at an initial position.

FIG. 17 shows a part of the disc holder moving mechanism 44 when viewed from a direction other than the direction in FIGS. 16A and 16B, that is, from the Y-axis positive direction (slider 50 is not shown). As described later in detail, FIG. 17 shows the disc holder moving mechanism 44 in the state where the disc record and reproduction unit 14 is located at the initial position.

Figure 18B:
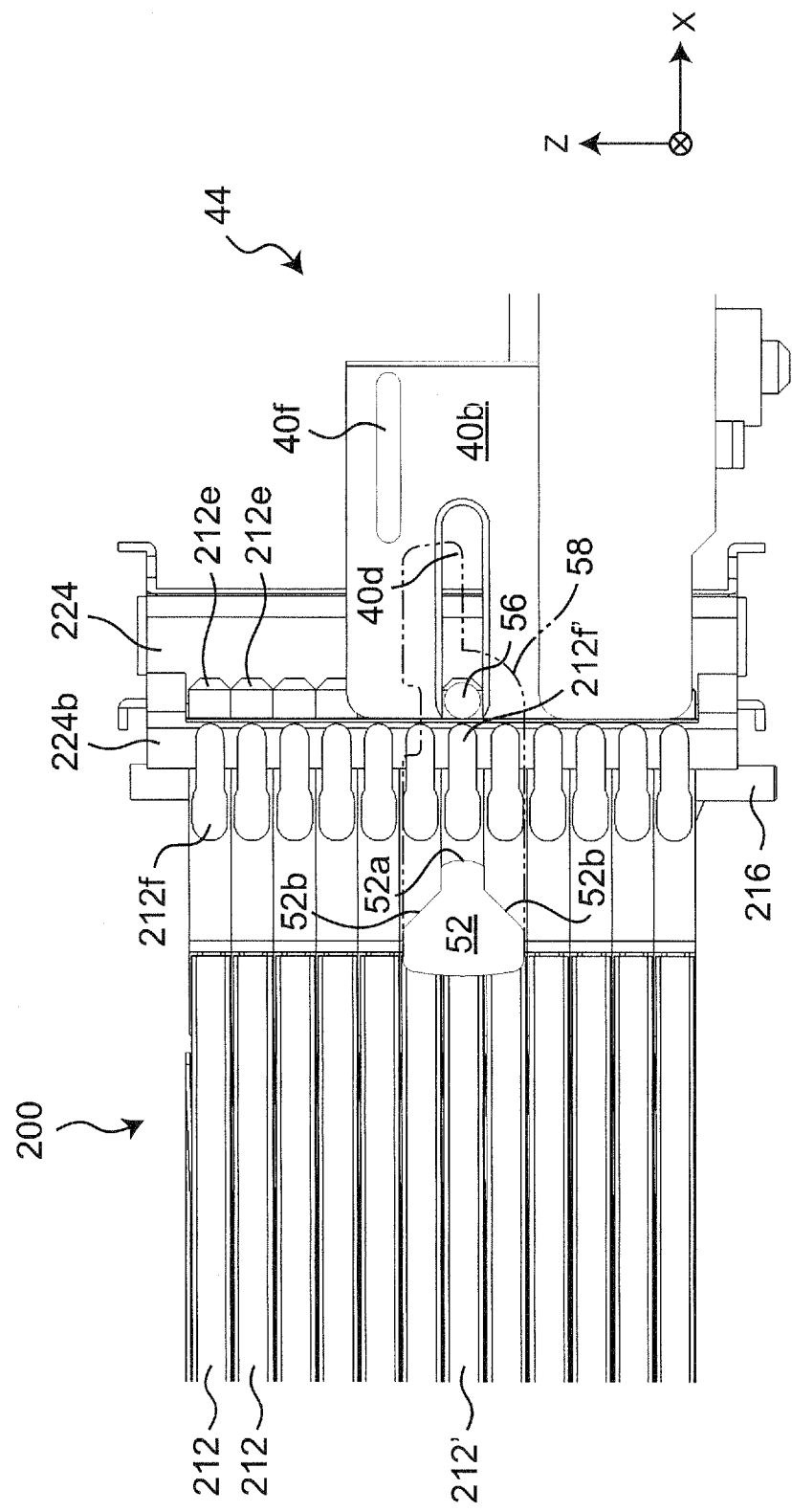
FIG. 18B is a view for describing an operation of the disc holder moving mechanism, which follows the operation shown in FIG. 18A.

FIG. 18A to 18C are views for describing operations of the disc holder moving mechanism 44 for moving the disc holding plate 212' of the disc holder 208' holding the disc D' to be recorded or reproduced in the X-axis positive direction (toward the disc record and reproduction unit 14 side).

As shown in FIG. 16A and FIG. 16B, the slider 50 pivotably supports a pivot lever 58 having the cam 52 via a support pin 56 extending in the Y-axis direction. The pivot lever 58 swings about the support pin 56 between the slider 50 and the disc holder holding portion 40b of the base unit 40, which are aligned in the Y-axis direction.

In particular, the support pin 56 penetrates the pivot lever 58, is supported at the slit 50a of the slider 50 at one end as shown in FIG. 16A, and is supported at the slit 40d of the disc holder holding portion 40b at the other end as shown in FIG. 17. Thus, the pivot lever 58 pivots about the support pin 56 between the slider 50 and the disc holder holding portion 40b.

The cam 52 that contacts the protrusion 212f' of the disc holding plate 212' of the disc holder 208' holding the disc D' to be recorded or reproduced is provided at a free end of the pivot lever 58 on the X-axis negative direction side (the magazine 200 side). When the slider 50 slides in the X-axis positive direction (toward the disc record and reproduction unit 14 side) in the state where the cam 52 contacts the protrusion 212f' of the disc holding plate 212', as shown in FIG. 18C, the protrusion 212f' of the disc holding plate 212' enters into the slit 40d of the disc holder holding portion 40b.

In order to prevent contact of the cam 52 with the protrusion 212f of the disc holding plate 212 in attachment/detachment of the magazine 200 to/from the main unit 12 of the disc conveying device 10, the cam 52 is provided on the pivot lever 58 pivotably supported at the slider 50, not directly on the slider 50 sliding in the X-axis direction.

As described above, in this embodiment, the disc holding plates 210 and 212 of the disc holders 208 are stored in the magazine 200. Thus, in providing the cam 52 directly on the slider 50, when the magazine 200 is attached to or detached from the main unit 12 of the disc conveying device 10 in the X-axis direction, the disc record and reproduction unit 14 may be further moved in the Z-axis negative direction to prevent contact of the cam 52 with the protrusion 212f of the disc holding plate 212. However, a space for storing the disc record and reproduction unit 14 is required to prevent contact of the cam 52 with the protrusion 212f of the disc holding plate 212, increasing the size of the main unit 12 of the disc conveying device 10, that is, the size of the main unit 12 in the Z-axis direction.

FIG. 17 shows the state where the disc record and reproduction unit 14 is disposed at the initial position, that is, the state immediately after attachment of the magazine 200 to the main unit 12 of the disc conveying device 10 or immediately before detachment of the magazine 200 from the main unit 12 of the disc conveying device 10. When the magazine 200 is attached to or detached from the main unit 12 of the disc conveying device 10 in the X-axis direction, the disc record and reproduction unit 14 is disposed at the initial position closest to the Z-axis negative direction side as shown in FIG. 17. At this time, the pivot lever 58 disposes the cam 52 of the disc record and reproduction unit 14 at the position where the cam cannot come into contact with the protrusion 212f of the disc holding plate 212 of the magazine 200 being attached or detached in the X-axis direction.

After attachment of the magazine 200 to the main unit 12 of the disc conveying device 10 as shown in FIG. 17, the disc record and reproduction unit 14 moves in the Z-axis direction so as to be opposed to the disc holder 208' (the disc holding plates 210' and 212') holding the disc D' to be recorded or reproduced in the X-axis direction. In particular, as shown in FIG. 18A, the protrusion 212f' of the disc holding unit 212' holding the disc D' to be recorded or reproduced is disposed opposed to the slit 40d of the disc holder holding portion 40b of the base unit 40 in the X-axis direction.

Then, when the cam disc 59 shown in FIG. 15 starts to rotate to move the driven pin 57b of the slider driving lever 57 from the inner circumferential end 59c along the groove 59b, the slider 50 starts to move in the X-axis positive direction (toward the disc record and reproduction unit 14 side). When the slider 50 moves, the pivot lever 58 pivots and as shown in FIG. 18B, the cam 52 is disposed on the X-axis negative direction side of the protrusion 212f of the disc holding plate 212' holding the disc D' to be recorded or reproduced. The support pin 56 of the pivot lever 58 moves along the slit 50a and a driven pin 58c moves along a cam shift groove 50b as shown in FIG. 12, FIG. 16A, and FIG. 16B, and consequently the pivot lever 58 pivots and thus disposes the cam 52 on the X-axis negative direction side of the protrusion 212f' of the disc holding plate 212'.

When the slider 50 located closest to the X-axis negative direction side (magazine 200 side) slides in the X-axis positive direction (toward the disc record and reproduction unit 14 side) as shown in FIG. 16A, the support pin 56 of the pivot lever moves to the X-axis negative direction side of the slit 50a of the slider 50. Simultaneously, the driven pin 58c formed on the pivot lever 58 on the back side of the cam 52 moves along the cam shift groove 50b of the slider 50. This causes the pivot lever 58 to pivot about the support pin 56 and the cam 52 to shift in the Z-axis positive direction.

Subsequently, when the slider 50 slides in the X-axis positive direction, bringing a free end 58b of the pivot lever 58 into contact with a protrusion 40f of the disc holder holding portion 40b, as shown in FIG. 16B, the pivot lever 58 stops pivoting and keeps its position.

When the cam 52 of the disc holder moving mechanism 44 is disposed on the X-axis negative direction side of the protrusion 212f' of the disc holding plate 212' holding the disc D' to be recorded or reproduced as shown in FIG. 18B and then, the slider 50 further slides in the X-axis positive direction, the front end 52a of the cam 52 presses the protrusion 212f' of the disc holding plate 212' in the X-axis positive direction. Thus, the protrusion 212f' of the disc holding plate 212' moves toward the slit 40d of the disc holder holding portion 40b. Then, the protrusion 212f' of the disc holding plate 212' partially enters into the slit 40d of the disc holder holding portion 40b, and the position of the disc holding plate 212' in the Z-axis direction is fixed. At this time, because the engaging hole 224a engages with the front end 212e of the disc holding plates 212, that is, the locking member 224 is located at the locking position, the front end 52a of the cam 52 can stably press the protrusion 212f' of the disc holding plate 212' in the X-axis positive direction.

Subsequently, when the cam 52 of the disc holder moving mechanism 44 moves the disc holding plate 212' holding the disc D' to be recorded or reproduced in the X-axis positive direction (toward the disc record and reproduction unit 14 side), as described above, the locking member 224 moves from the locking position to the locking release position. That is, the cam 52 moves the locking member 224 from the locking position to the locking release position via the protrusion 212f' of the disc holding plate 212'. This enables movement of the disc holding plates 212 in the Z-axis direction (disc thickness direction).

When the locking member 224 moves to the locking release position, allowing the disc holding plates 212 to move in the Z-axis direction and then, the cam 52 of the disc holder moving mechanism 44 further moves in the X-axis positive direction (toward the disc record and reproduction unit 14 side), the cam 52 contacts the protrusion 212f" of the disc holding plate 212" adjacent to the disc holding plate 212' holding the disc D' to be recorded or reproduced.

As shown in FIG. 18B, the cam 52 of the disc holder moving mechanism 44 have an inclined portion 52b that separates the disc holding plate 212' holding the disc D' to be recorded or reproduced from the adjacent disc holding plate 212" through movement of the cam 52 in the X-axis positive direction. The protrusion 212f" moves relative to the cam 52 along the inclined portion 52b, thereby separating the disc holding plate 212' holding the disc D' to be recorded or reproduced from the adjacent disc holding plate 212" in the Z-axis direction.

Using the cam 52 with the inclined portion 52b enables separating the disc holding plate 212' holding the disc D' to be recorded or reproduced from the adjacent disc holding plate 212" in the Z-axis direction (disc thickness direction) as well as moving the disc holding plate 212' holding the disc D' to be recorded or reproduced in the X-axis positive direction (toward the disc record and reproduction unit 14 side). That is, the disc holding plate 212' holding the disc D' to be recorded or reproduced moves while remaining away from the adjacent disc holding plate 212". This reduces friction caused between the disc holding plate 212' and the adjacent disc holding plate 212" during movement of the disc holding plate 212' holding the disc D' to be recorded or reproduced (as compared to the state where the disc holding plates are not separated from each other). Therefore, the disc holding plate 212' holding the disc D' to be recorded or reproduced can be moved in the X-axis direction with a small force, reducing the size of a driving source (e.g. motor, drive gear) for moving the disc holding plate 212' in the X-axis direction. This can ensure a space for storing many discs D in the main unit 12 of the disc conveying device 10.

As shown in FIG. 18C, the disc holding plate 212" (and the other disc holding plates 212) adjacent to the disc holding plate 212' holding the disc D' to be recorded or reproduced is inclined by the cam 52 such that a portion near the X-axis positive direction side (disc record and reproduction unit 14 side) is separated from the disc holding plate 212' in the Z-axis direction (disc thickness direction). Alternatively, to separate the disc holder 212' holding the disc D' to be recorded or reproduced from the adjacent disc holding plate 212", the adjacent disc holding plate 212" (and the other disc holding plates 212) may be translated in the Z-axis direction. However, more complicated configuration is required to translate the disc holders 208 other than the disc holder 208' holding the disc D' to be recorded or reproduced (as compared to the inclined case). This can decrease the number of discs D stored in the disc conveying device 10.

When the protrusion 212f' of the disc holding plate 212' holding the disc D' to be recorded or reproduced further enters into the slit 40d of the disc holder holding portion 40b of the disc record and reproduction unit 14 as shown in FIG. 18C, the disc D' to be recorded or reproduced is disposed at the disc pass position as shown in FIG. 1B and FIG. 2A. Simultaneously, as shown in FIG. 18C, the cam 52 is disposed between the two protrusions 212f" of the disc holding plate 212" adjacent to the disc holding plate 212' holding the disc D' to be recorded or reproduced. This reliably separates the disc holding plate 212' holding the disc D' to be recorded or reproduced from the adjacent disc holding plates 212". This also reliably separates the disc D' disposed at the disc pass position from the adjacent discs D" as shown in FIG. 1B.

When the disc D' to be recorded or reproduced is located at the disc pass position, the driven pin 57b of the slider driving lever 57 shown in FIG. 14 is located at the connecting point P of the first groove 59e and the second groove 59f in the groove 59b of the cam disc 59 shown in FIG. 15, such that the sliders 46 and 50 are located closest to the X-axis positive direction side (disc record and reproduction unit 14 side).

As described above, the cam 52 of the disc holder moving mechanism 44 moves the disc holding plate 212' holding the disc D' to be recorded or reproduced in the X-axis positive direction (toward the disc record and reproduction unit 14 side). On the other hand, as shown in FIG. 18C, the support pin 56 opposed to the cam 52 across the protrusion 212f of the disc holding plate 212' moves the disc holding plate 212' in the X-axis negative direction. That is, moving the slider 50 in the X-axis negative direction causes the support pin 56 to press the protrusion 212t of the disc holding plate 212' in the X-axis negative direction. Finally, as shown in FIG. 18A, the support pin 56 moving in the X-axis negative direction pushes the protrusion 212f of the disc holding plate 212' out of the slit 40d of the disc holder holding portion 40b, resulting in that the disc holding plate 212' overlap the other disc holding plates 212 in the Z-axis direction. Simultaneously, moving cam 52 in the X-axis negative direction releases engagement of the inclined portion 52b with the protrusion 212f" of the disc holding plate 212", releasing separation of the disc holding plates 212 in the Z-axis direction. Then, the support pin 56 drives the handle bar 224b of the locking member 224 to move the locking member 224 from the locking release position to the locking position. As a result, the disc holding plates 212 remain stacked.

The disc holder moving mechanism 44 (and the disc holder moving mechanism 42 having the same function) locates the disc D' to be recorded or reproduced at the disc pass position as shown in FIG. 1B and FIG. 2A.

(Disc Conveying Mechanism)

Next, the disc conveying mechanism 16 that conveys the disc D' to be recorded or reproduced disposed at the disc pass position to the disc record/reproduction position in the disc record and reproduction unit 14 will be described.

Figure 19:
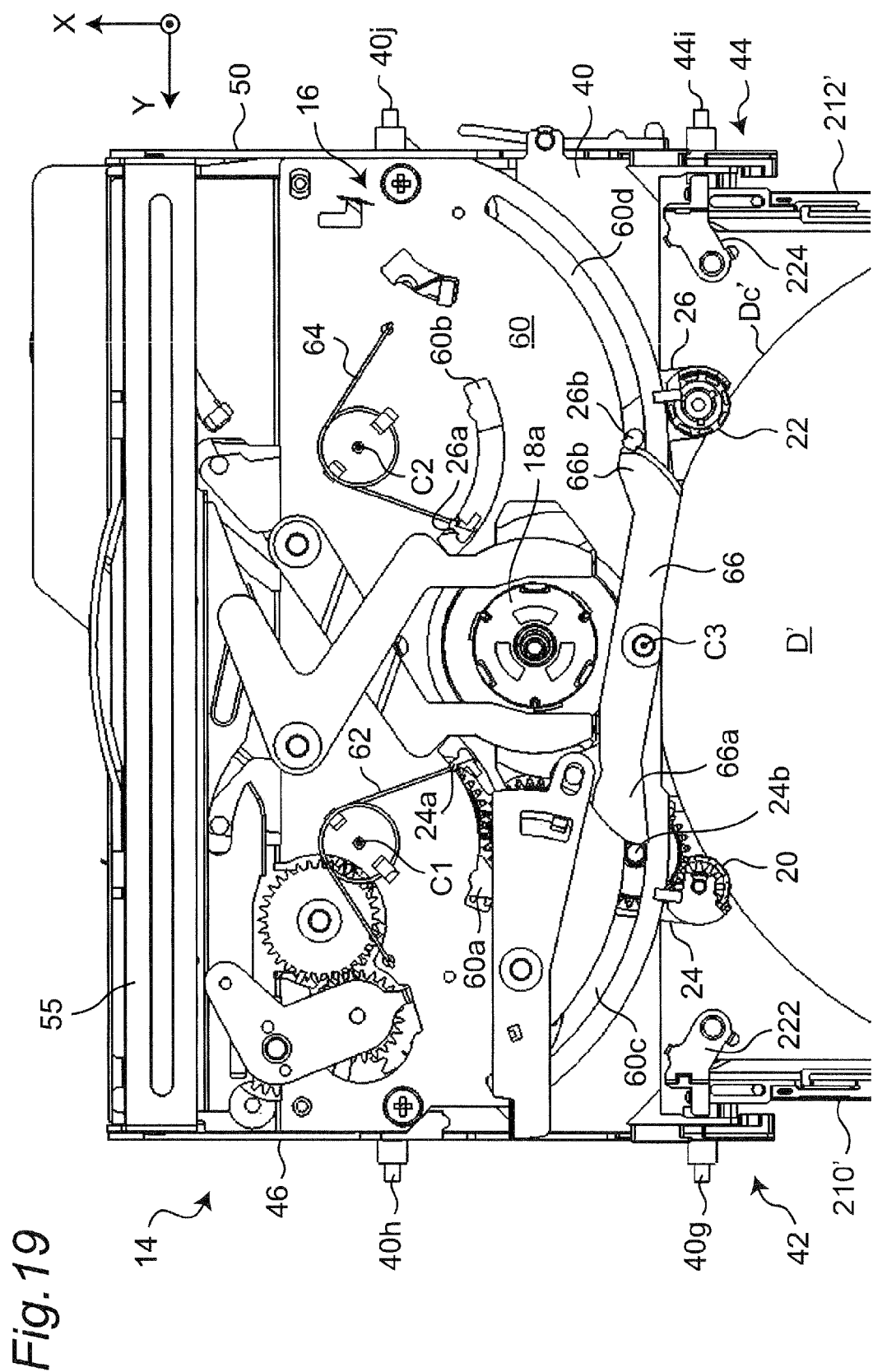
FIG. 19 is a top view of the disc record and reproduction unit.

FIG. 19 is a top view of the disc record and reproduction unit 14 that mounts the disc conveying mechanism 16. FIG. 19 corresponds to FIG. 2A, and shows the state where the rollers 20 and 22 of the disc conveying mechanism 16 contact the disc D' to be recorded or reproduced disposed at the disc pass position, that is, the rollers 20 and 22 are disposed at the initial position.

The disc conveying mechanism 16 has a base plate 60 disposed on the Z-axis positive direction side of the base unit 40. Components of the disc conveying mechanism 16, such as gears for rotating the swing arms 24 and 26 and the rollers 20 and 22 are mounted on the base plate 60.

Figure 20A:
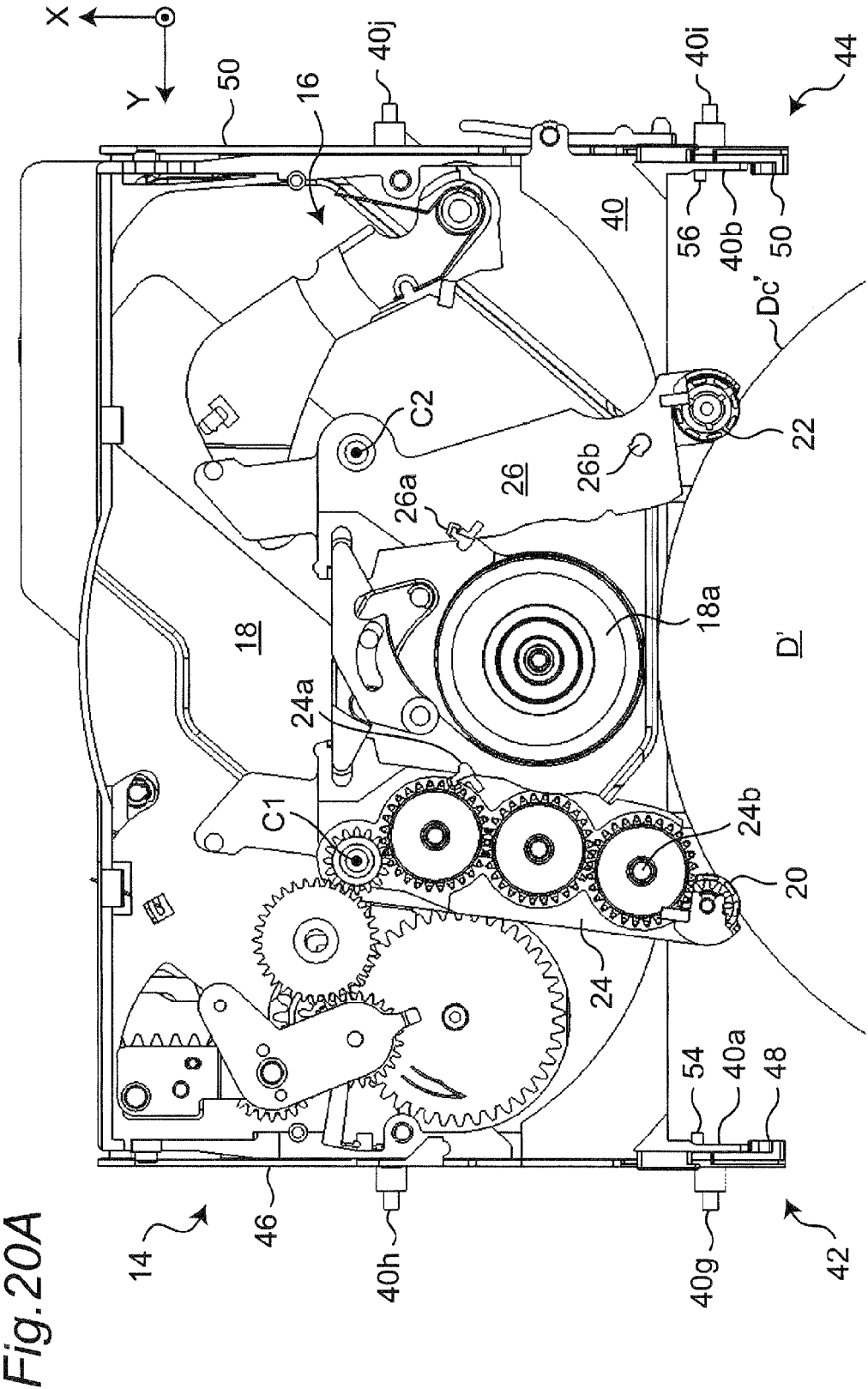
FIG. 20A is a top view of the disc record and reproduction unit in the state where the disc located at the disc pass position contact rollers, and some components of the disc conveying mechanism are omitted.

FIG. 20A is a top view of the disc record and reproduction unit 14, and does not show some components of the disc conveying mechanism 16, including the base plate 60. FIG. 20A corresponds to FIG. 2A, and shows the state where the disc D' to be recorded or reproduced located at the disc pass position contacts the rollers 20 and 22 of the disc conveying mechanism 16, that is, the rollers 20 and 22 are located at the initial position.

As apparent from comparison of FIG. 19 and FIG. 20A, the swing arms 24 and 26 of the disc conveying mechanism 16 is disposed between the base plate 60 and the base unit 40. The swing arms 24 and 26 are provided on the base plate 60 so as to freely swing about swing center lines C1 and C2 extending in the Z-axis direction, respectively. The swing center line C1 of the swing arm 24 and the swing center line C2 of the swing arm 26 are opposed to each other in the Y-axis direction, and are located closer to the X-axis positive direction side than the rollers 20 and 22. The swing arms 24 and 26 each swing while keeping the rollers 20 and 22 opposed to each other in the Y-axis direction. Consequently, when the swing arms 24 and 26 swing, the rollers 20 and 22 move in the X-axis positive direction while being gradually separated from each other in the Y-axis direction, or move in the X-axis negative direction while coming closer to each other in the Y-axis direction.

As shown in FIG. 19, the swing arms 24 and 26 are biased with torsion springs 62 and 64, respectively. The torsion springs 62 and 64 are fixed to the surface of the base plate 60 on the Z-axis positive direction side. One ends of the torsion springs 62 and 64 are fixed to base plate 60, and the other ends engage protrusions 24a and 26a formed on the swing arms 24 and 26, respectively. For engagement with the other ends of the torsion springs 62 and 64, the protrusions 24a and 26a of the swing arms 24 and 26 protrude from the base plate 60 in the Z-axis positive direction through arcuate slits 60a and 60b formed in the base plate 60.

The torsion springs 62 and 64 bias the swing arms 24 and 26 to cause the rollers 20 and 22 provided at the free ends of the arms to come closer to each other. This allows the rollers 20 and 24 to keep contact with the radial end face Dc of the disc D' to be recorded or reproduced.

As shown in FIG. 19 and FIG. 20A, to keep the rollers 20 and 22 at the initial position, that is, to keep the distance between the rollers 20 and 22 in the Y-axis direction to be a predetermined distance, an arm stopper 66 that restricts swinging of the swing arms 24 and 26 biased by the torsion springs 62 and 64 is provided on the surface of the base plate 60 on the Z-axis positive direction side.

As shown in FIG. 19, the arm stopper 66 rotates about a rotational center line C3 extending in the Z-axis direction, is disposed between the swing arms 24 and 26, contacts a protrusion 24b of the swing arm 24 at one free end 66a, and contacts a protrusion 26b of the swing arm 26 at the other free end 66b. The protrusions 26a and 26b of the swing arms 24 and 26 protrude from the base plate 60 in the Z-axis positive direction through arc-like slits 60c and 60d in the base plate 60 to contact the free ends 66a and 66b of the arm stopper 66, respectively.

The arm stopper 66 can restrict the swing arms 24 and 26 from swinging by biasing forces of the torsion springs 62 and 64 such that the rollers 20 and 22 come closer to each other, thereby keeping the distance between the rollers 20 and 22 in the Y-axis direction to a predetermined distance, that is, maintaining the rollers 20 and 22 at the initial position. As described later in detail, rotating the arm stopper 66 moves a contact point of the free end 66a and the protrusion 24b of the swing arm 24 as well as a contact point of the free end 66b and the protrusion 26b of the swing arm 26. Thereby, the swing arms 24 and 26 swing such that the rollers 20 and 22 come closer to each other. As a result, the rollers 20 and 22 move from the initial position to the direction in which they come closer to each other in the Y-axis direction, and in the X-axis negative direction (toward the magazine 200 side).

The rollers 20 and 22 provided at the free ends of the swing arms 24 and 26 each have an elastic layer made of rubber of the like on the outer circumferential face, which contacts the radial end face Dc' of the disc D'. Both or one of the rollers 20 and 22 rotate about their rotational center lines extending in the Z-axis direction. In this embodiment, one roller 20 is a driving roller rotated with a driving source connected thereto, such as a motor, and the other roller 22 is fastened to the swing arm 26. Examples of a driving mechanism for rotating the roller 20 provided at the free end of the freely-swinging swing arm 24 includes a motor and a gear. Any driving mechanism that can rotate the roller 20 provided at the free end of the freely-swinging swing arm 24 may be used. As described above, the roller 20 and the cam disc 59 shown in FIG. 15 can work in cooperation by using a common driving motor for rotating the roller 20 and the cam disc 59.

As shown in FIG. 20A, in the state where the rollers 20 and 22 contact the radial end face Dc' of the disc D' to be recorded or reproduced located at the disc pass position, the rollers 20 and 22 positively rotate. In other words, when the driven pin 57b of the slider driving lever 57 shown in FIG. 14 reaches the connecting point P of the cam disc 59 shown in FIG. 15, the roller 20 cooperating with the cam disc 59 rotates. Thus, the rollers 20 and 22 roll on the radial end face Dc' of the disc D' so as to separate from each other in the Y-axis direction. Since the rollers 20 and 22 are provided at the free ends of the freely-swinging swing arms 24 and 26, the rollers 20 and 22 move in the X-axis positive direction. The disc D' moves relative to the rollers 20 and 22 in the X-axis positive direction.

Figure 20B:
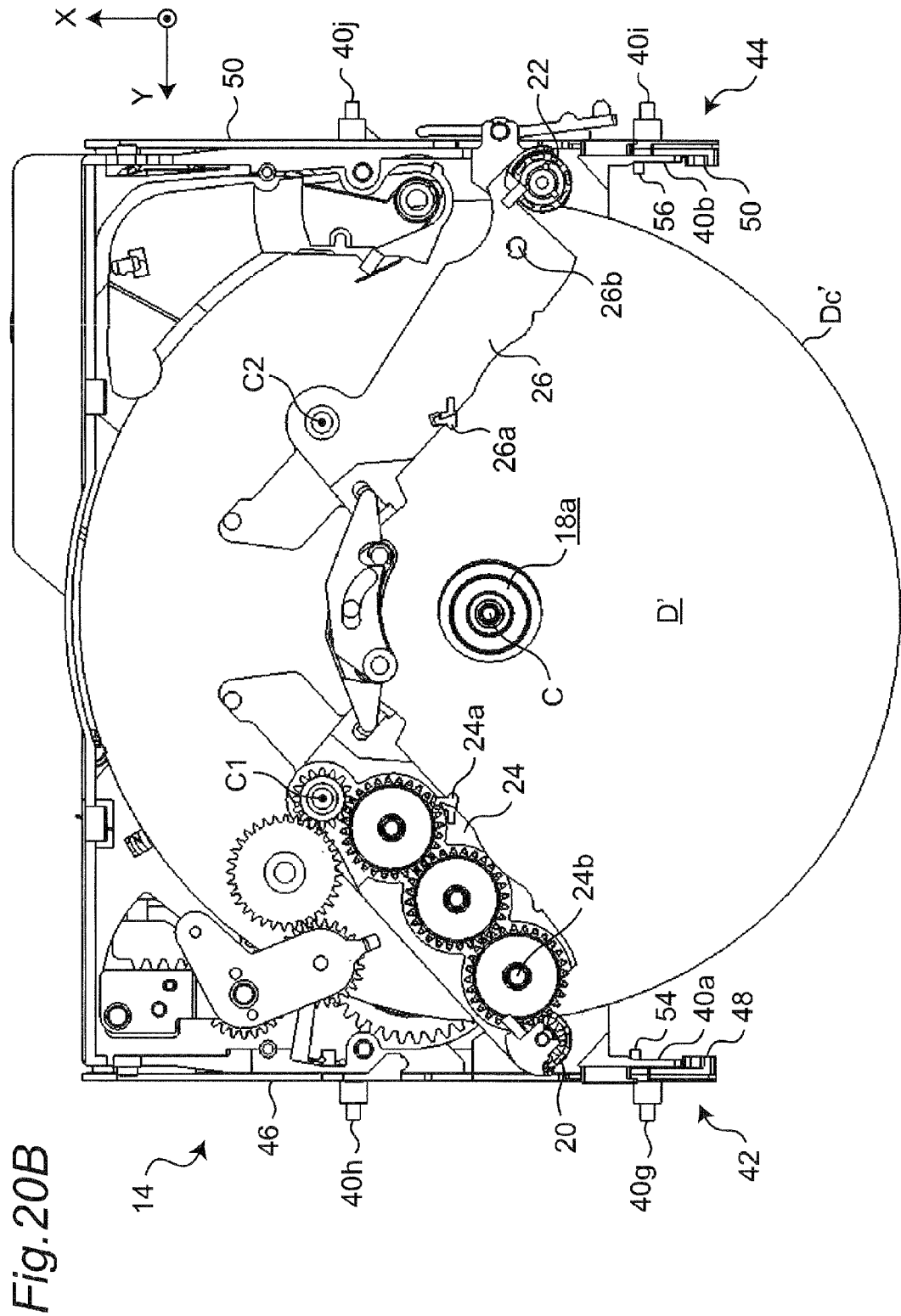
FIG. 20B is a top view of the disc record and reproduction unit in the state where the disc located at the disc record/reproduction position contacts the rollers, and some components of the disc conveying mechanism are omitted.

The disc D' to be recorded or reproduced is conveyed in the X-axis positive direction with the positively-rotating rollers 20 and 22 and the swing arms 24 and 26 that support the rollers 20 and 22 at their free ends and freely swing, and thus is disposed at the disc record/reproduction position as shown in FIG. 20B (and FIG. 2B).

While the rollers 20 and 22 moves the disc D' to be recorded or reproduced from the disc pass position to the disc record/reproduction position, the cam disc 59 cooperating with the roller 20 and the swing arms 24 and 26 shown in FIG. 15 causes the driven pin 57b of the slider driving lever 57 shown in FIG. 14 to move along the second groove 59f from the connecting point P to the outer circumferential end 59d. When the disc D' is disposed at the disc pass position, the driven pin 57b of the slider driving lever 57 is located at the outer circumferential end 59d. Moving the driven pin 57b along the second groove 59f restricts swinging of the slider driving lever 57, in turn, movement of the sliders 46 and 50 in the X-axis direction. Consequently, until the disc D' moves from the disc pass position to the disc record/reproduction position, the sliders 46 and 50 are maintained to be stopped. That is, the disc holding plates 210' and 212' of the disc D' are maintained to be stopped, and the guide portions 210b' and 212b' guide the disc D'. Therefore, the rollers 20 and 22 holding the disc D' on the radial end face Dc' can stably convey the disc D' to the disc record/reproduction position.

In this embodiment, as shown in FIG. 2B, the disc D' to be recorded or reproduced disposed at the disc record/reproduction position partially overlaps the other discs D at the disc waiting position when viewed from the Z-axis direction (disc thickness direction). However, as described above, since the disc holder 208' holding the disc D' to be recorded or reproduced (the disc holding plates 210' and 212') is separated from the adjacent disc holders 208" (the disc holding plates 210" and 212") in the Z-axis direction, the disc D' to be recorded or reproduced is also separated from the adjacent discs D" in the Z-axis direction. Consequently, for example, even when disc D' being recorded or reproduced (that is, rotated) is oscillated at the disc record/reproduction position due to an external force to the disc conveying device 10, the disc D' does not contact the adjacent discs D". Moreover, the disc conveying device is configured such that the disc D' to be recorded or reproduced overlaps the adjacent discs D" in the Z-axis direction, reducing the size of the disc conveying device 10 in the disc conveying direction (X-axis direction).

When the rollers 20 and 22 that contacts the disc D' located at the disc record/reproduction positions start to negatively rotate as shown in FIG. 20B, the rollers 20 and 22 rotates on the radial end face Dc' of the disc D' so as to come closer to each other in the Y-axis direction. The rollers 20 and 22 are provided at the free ends of the freely-swinging swing arms 24 and 26 and thus, move in the X-axis negative direction (toward the magazine 200 side). The disc D' moves relative to the rollers 20 and 22 in the X-axis negative direction. The rollers 20 and 22 stop at the initial position (the protrusions 24b and 26b of the swing arms 24 and 26 contact the arm stopper 66), disposing the disc D' at the disc pass position. That is, the disc D' is returned to the disc holding plates 210' and 212' waiting at the disc pass position.

The disc conveying mechanism 16 in this embodiment has following advantages over the conveying mechanism that holds the disc D in the thickness direction and conveys the disc D.

In conveying the disc D with the pair of rollers holding the disc in the thickness direction, a large space for disposing the pair of rollers needs to be provided between the disc pass position and the spindle 18a of the pick-up unit 18, increasing the depth (size in the X-axis direction) of the disc conveying device 10. On the contrary, in this embodiment, because the rollers 20 and 22 move on the radial end face Dc of the disc D while being rotated using the swing arms 24 and 26, the depth of the disc conveying device 10 can be reduced as much as possible.

As described above, when disc holder moving mechanisms 42 and 44 move the disc holding plates 210' and 212' in the X-axis negative direction, the disc D' returned from the disc conveying mechanism 16 is conveyed from the disc pass position to the disc waiting position. At this time, although the disc holding plates 210' and 212' return to the disc waiting position and thus overlap the other disc holding plates 210 and 212 in the Z-axis direction, the returned disc D' may fail to return to the disc waiting position. That is, the returned disc D' may fail to overlap the other discs D in the Z-axis direction. This is due to the fact that the disc holding plates 210 and 212 hold the discs D to be slidable in the X-axis positive direction (toward the disc record and reproduction unit 14 side). That is, during movement of the disc holding plates 210' and 212' in the X-axis negative direction, the returned disc D' slides from the holding portions 210a' and 212a' onto the guide portions 210b' and 212b' in the X-axis positive direction relative to the disc holding plates 210' and 212'.

Figure 21A:
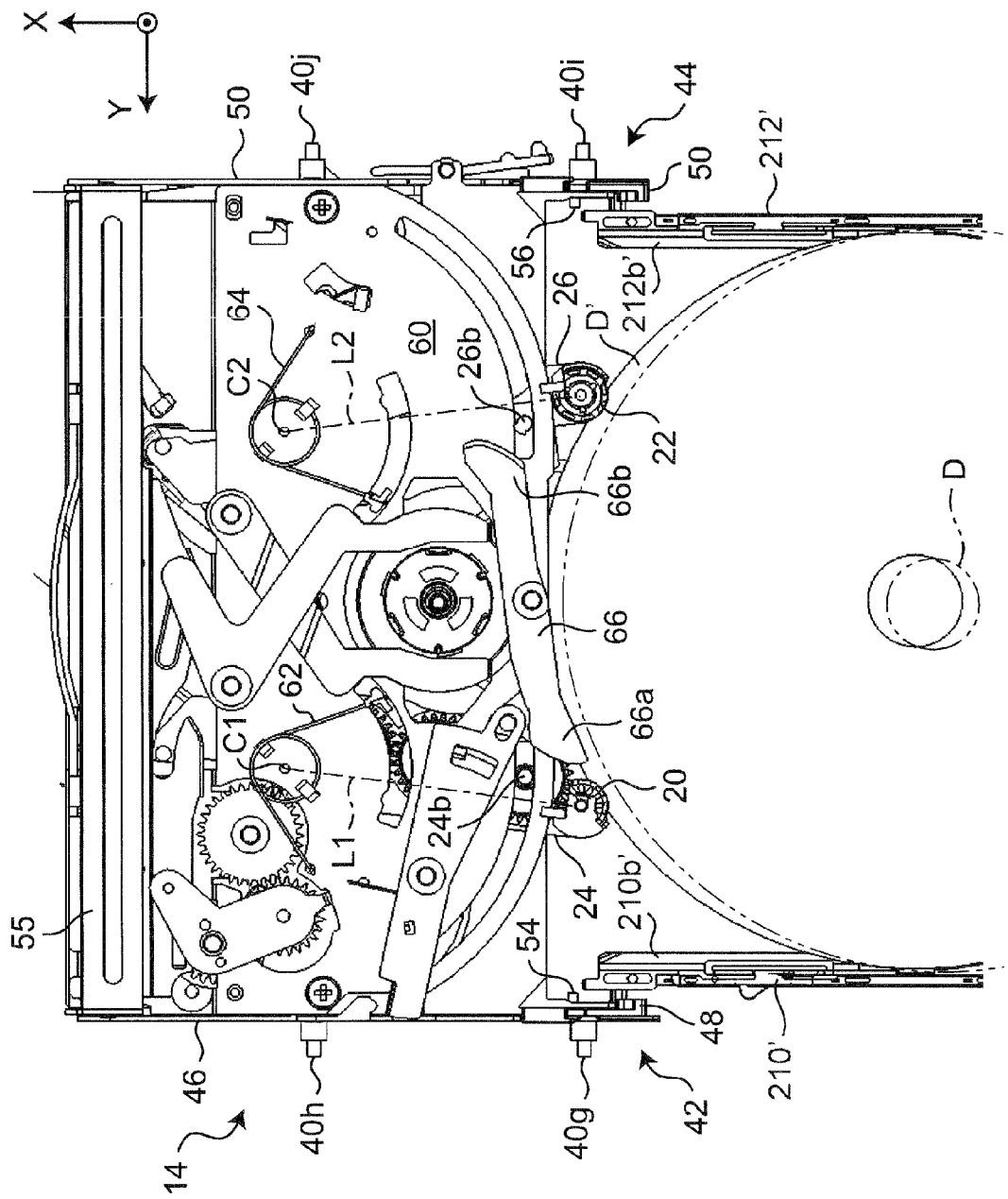
FIG. 21A is a top view of the disc record and reproduction unit in the state where an arm stopper releases restriction of swinging of arms.

The arm stopper 66 rotates to return the disc D' returned from the disc conveying mechanism 16 to the disc waiting position. Consequently, from the state where one free end 66a is separated from the protrusion 24b of the swing arm 24 and the other free end 66b is separated from the protrusion 26b of the swing arm 26 as shown in FIG. 21A, that is, from the state where the restriction of swinging of swing arms 22 and 24 in the direction such that the rollers 20 and 22 move closer to each other is released, the rollers 20 and 22 moves from the initial position in the X-axis negative direction (toward the magazine 200 side) while coming closer to each other in the Y-axis direction as shown in FIG. 21B.

Figure 21B:
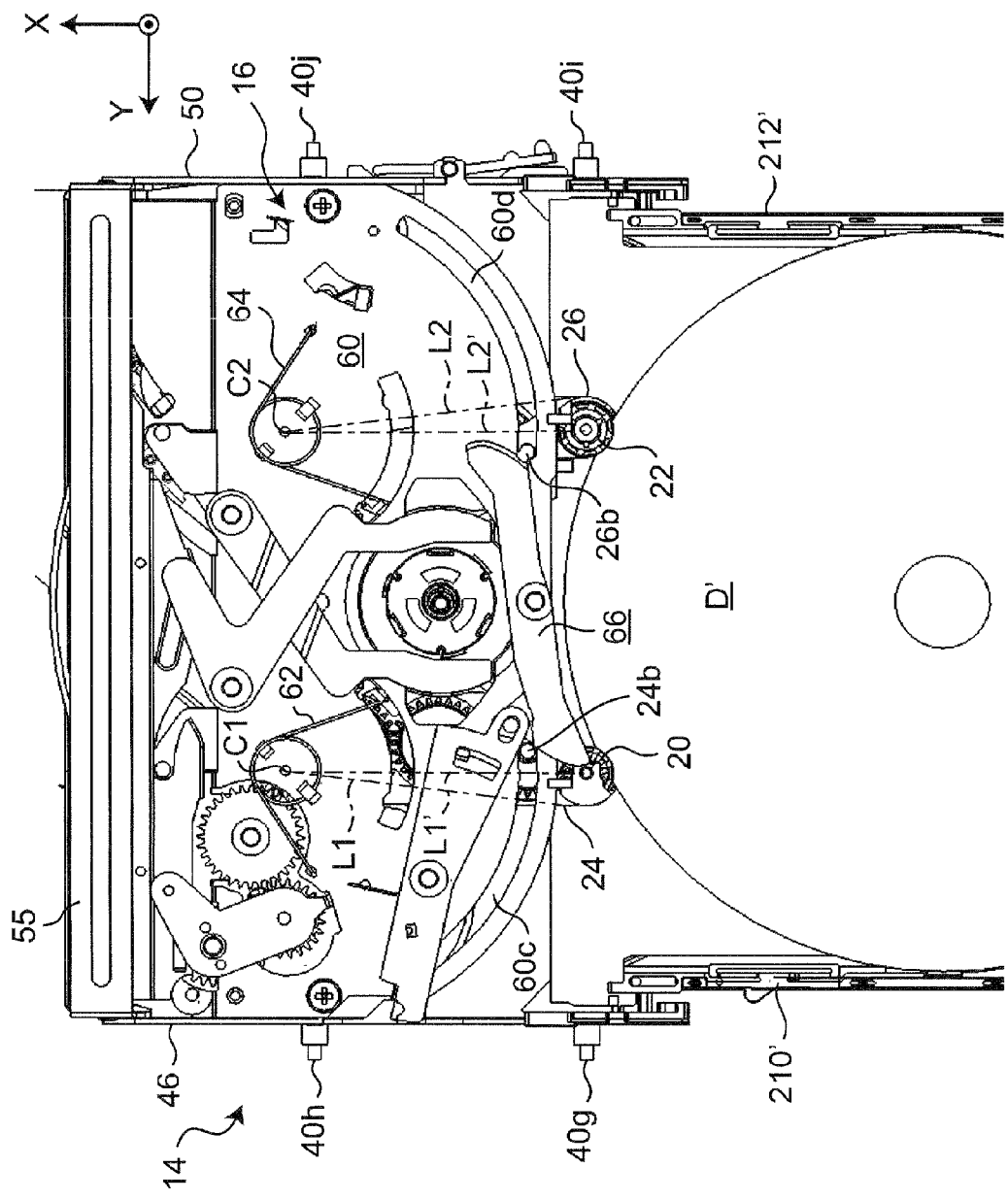
FIG. 21B is a top view of the disc record and reproduction unit in the state where the rollers move from the initial position toward the magazine.

Dot-and-dash lines L1 and L2 shown in FIG. 21B are lines connecting the swing center lines C1 and 02 of the swing arms 24 and 26 to the rotational center lines of the rollers 20 and 22, respectively, in the state where the arm stopper 66 restricts swinging of the swing arms 24 and 26, that is, the rollers 20 and 22 are located at the initial position. Dot-and-dash lines L1' and L2' are lines connecting the swing center lines C1 and C2 of the swing arms 24 and 26 to the rotational center lines of the rollers 20 and 22, respectively, with the different degree of the restriction with the arm stopper 66.

Figure 21C:
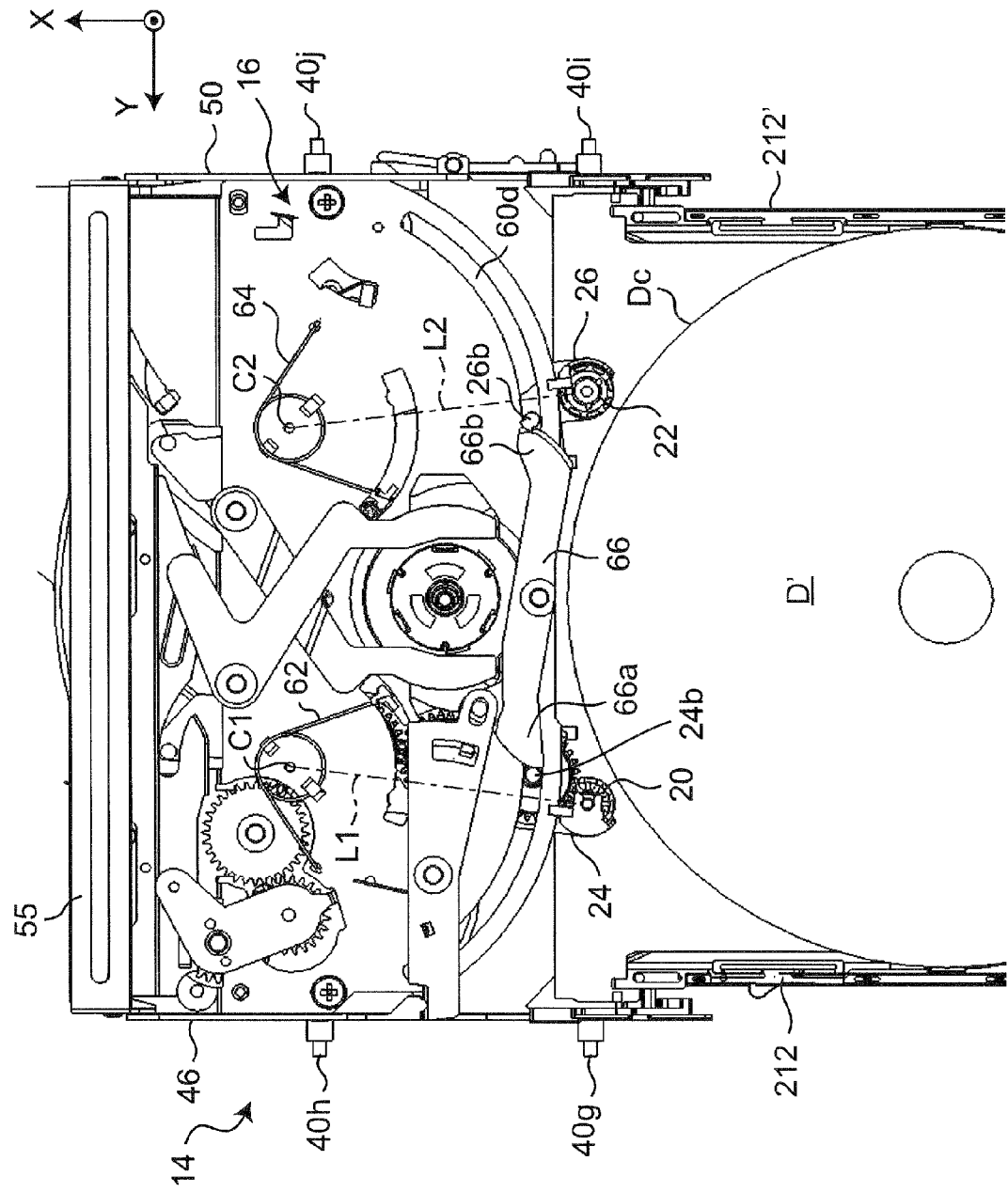
FIG. 21C is a top view of the disc record and reproduction unit in the state where the arm stopper disposes the rollers at the initial position.

As shown in FIG. 21B, when the rollers 20 and 22 moves from the initial position in the X-axis negative direction (toward the magazine 200 side), the disc D' returned from the disc conveying mechanism 16 is moved to the furthest position of the disc holding plates 210' and 212' disposed at the disc waiting position (on the holding portion 210a', 212a' of the disc holding plates 210' and 212'), that is, the disc D' is pressed by the rollers 20 and 22 to return to the disc waiting position. After the disc D' returns to the disc waiting position, as shown in FIG. 21C, the arm stopper 66 rotates to the original position, one free end 66a drives the protrusion 24b of the swing arm 24, and the other free end 66b drives the protrusion 26b of the swing arm 24. When the arm stopper 66 further rotates, the swing arms 24 and 26 swing and thus the rollers 20 and 22 return to the initial position.

Strictly speaking, in this embodiment, before the disc conveying mechanism 16 returns the disc D' to be recorded or reproduced from the disc record/reproduction position to the disc pass position, the corresponding disc holding plates 210' and 212' start to move from the disc pass position to the disc waiting position. That is, the disc conveying device 10 is configured that, after the disc holding plates 210' and 212' corresponding to the disc D' returns to the disc waiting position, the rollers 20 and 22 moves from the initial position in the X-axis negative direction (toward the magazine 200 side), to push the disc D' toward the disc waiting position.

The reason for this will be described below. In conveying the disc D' to be recorded or reproduced from the disc record/reproduction position to the disc pass position, the disc D' is moved in the X-axis negative direction with the rollers 20 and 22 and returns to the disc pass position, and the rollers 20 and 22 also returns to the initial position. However, as shown in FIG. 21A, the rollers 20 and 22 keep contact with the radial end face Dc' of the disc D'. If the corresponding disc holding plates 210' and 212' are fixed at the disc pass position at this time, the disc D' contacts with the furthest part of the disc holding plates 210' and 212' (on the holding portion 210a', 212a' of the disc holding plates 210' and 212'), failing to further move in the X-axis negative direction. Although the rollers 20 and 22 attempt to continue rotating, the disc D' fails to move in the X-axis negative direction, locking the rollers 20 and 22. To avoid this state, before the disc D' to be recorded or reproduced returns from the disc record/reproduction position to the disc pass position, the corresponding disc holding plates 210' and 212' should start to move from the disc pass position to the disc waiting position.

As described above and as shown in FIG. 18C, the disc holding plates 210' and 212' disposed at the disc pass position are separated from the adjacent disc holding plates 210" and 212". While the disc holding plates 210' and 212' in this state move in the X-axis negative direction and reaches the disc waiting position, as shown in FIG. 10B, the disc holding plates 210' and the adjacent disc holding plate 210" are stacked, and in turn the disc holding plates 212' and the adjacent disc holding plate 212" are stacked, and subsequently, as shown in FIG. 10A, the locking members 222 and 224 engage with the plurality of stacked disc holding plates 210 and 212, respectively.

Thus, if the rollers 20 and 22 press the disc D' in the X-axis negative direction toward the furthest position of the disc holding plates 210' and 212' before the disc holding plates 210' and 212' return to the disc waiting position, that is, before the locking members 222 and 224 lock the stacked disc holding plates 210 and 212, the disc D' could enter into the gap between the disc holding plate 210' and the adjacent disc holding plate 210" or the gap between the disc holding plate 212' and the adjacent disc holding plate 212". As a result, in the state where the disc D' is sandwiched between the disc holding plate 210' and the adjacent disc holding plate 210" or between the disc holding plate 212' and the adjacent disc holding plate 212", the locking members 222 and 224 could engage with the disc holding plates 210 and 212, respectively.

As a countermeasure, the disc conveying device 10 is configured such that the disc holding plates 210' and 212' start to move from the disc pass position to the disc waiting position before the disc D' to be recorded or reproduced returns from the disc record/reproduction position to the disc pass position, that is, the rollers 20 and 22 press the disc D' toward the furthest position of the disc holding plates 210' and 212' after the locking members 222 and 224 engage with the stacked disc holding plates 210 and 212.

The cam disc 59 shown in FIG. 15 causes the corresponding disc holding plates 210' and 212' to move from the disc pass position to the disc waiting position before the disc D' to be recorded or reproduced returns from the disc record/reproduction position to the disc pass position.

This will be described below. As described above, the sliders 46 and 50 that move the disc holding plates 210 and 212 in the X-axis direction are moved in the X-axis direction by swinging of the slider driving lever 57 shown in FIG. 14. The driven pin 57b moves along the groove 59b of the cam disc 59, thereby swinging the slider driving lever 57.

Additionally, as described above, when the disc D' to be recorded or reproduced located at the disc waiting position is conveyed to the disc record/reproduction position through the disc pass position, as shown in FIG. 15, the driven pin 57b of the slider driving lever 57 moves from the inner circumferential end 59c of the cam disc 59 to the outer circumferential end 59d through the first groove 59e and the second groove 59f. When the driven pin 57b is located at the connecting point P of the first groove 59e and the second groove 59f, the disc D' at the disc pass position contacts the rollers 20 and 22 of the initial position (the disc D' is passed to the disc conveying mechanism 16).

When the disc D' to be recorded or reproduced is conveyed from the disc record/reproduction position to the disc waiting position through the disc pass position, the driven pin 57b of the slider driving lever 57 moves from the outer circumferential end 59d of the cam disc 59 to the inner circumferential end 59c through the third groove 59g and the first groove 59e. When the driven pin 57b is located at a point P' of the third groove 59g, the disc D' is located at the disc pass position, and the rollers 20 and 22 are located at the initial position.

The point P' on the third groove 59g is present on a line connecting the connecting point P of the first groove 59e and the second groove 59f to the rotational center of the cam disc 59. The distance between point P' on the third groove 59g and the rotational center of the cam disc 59 are substantially same as the distance between the inner circumferential end 59c and the rotational center of the disc 59.

That is, when the driven pin 57b of the slider driving lever 57 is located at the connecting point P or the point P' on the groove 59b of the cam disc 59, the rollers 20 and 22 cooperating with the cam disc 59 are located at the initial position and contact the disc D' at the disc pass position.

When the driven pin 57b of the slider driving lever 57 is located at the connecting point P on the groove 59b of the cam disc 59, the sliders 46 and 50 are located on the X-axis positive direction side and dispose the disc holding plates 210' and 212' at the disc pass position. When the driven pin 57b is located at the point P' on the third groove 59g, the sliders 46 and 50 are located on the X-axis negative direction side and dispose the disc holding plates 210' and 212' at the disc waiting position.

Using the cam disc 59 enables the corresponding disc holding plates 210' and 212' to return from the disc pass position to the disc waiting position before the disc D' to be recorded or reproduced returns from the disc record/reproduction position to the disc pass position. Thus, even when the disc D' to be recorded or reproduced returns from the disc record/reproduction position to the disc pass position, and the rollers 20 and 22 also return to the initial position and subsequently start to rotate, the corresponding disc holding plates 210' and 212' have already moved to the disc waiting position. For this reason, the disc D' can further move in the X-axis negative direction without contacting with the furthest part of the disc holding plates 210' and 212' (the holding portion 210a', 212a' of the disc holding plates 210' and 212'), and thus does not lock the rollers 20 and 22. Moreover, after engagement the locking members 222 and 224 with the stacked disc holding plates 210 and 212, the rollers 20 and 22 press the disc D' toward the disc waiting position. This prevents the disc D' from being sandwiched between the disc holding plate 210' and the adjacent disc holding plate 210" or between the disc holding plate 212' and the adjacent disc holding plate 212".

(Disc Record and Reproduction Unit Moving Mechanism)

Figure 22:
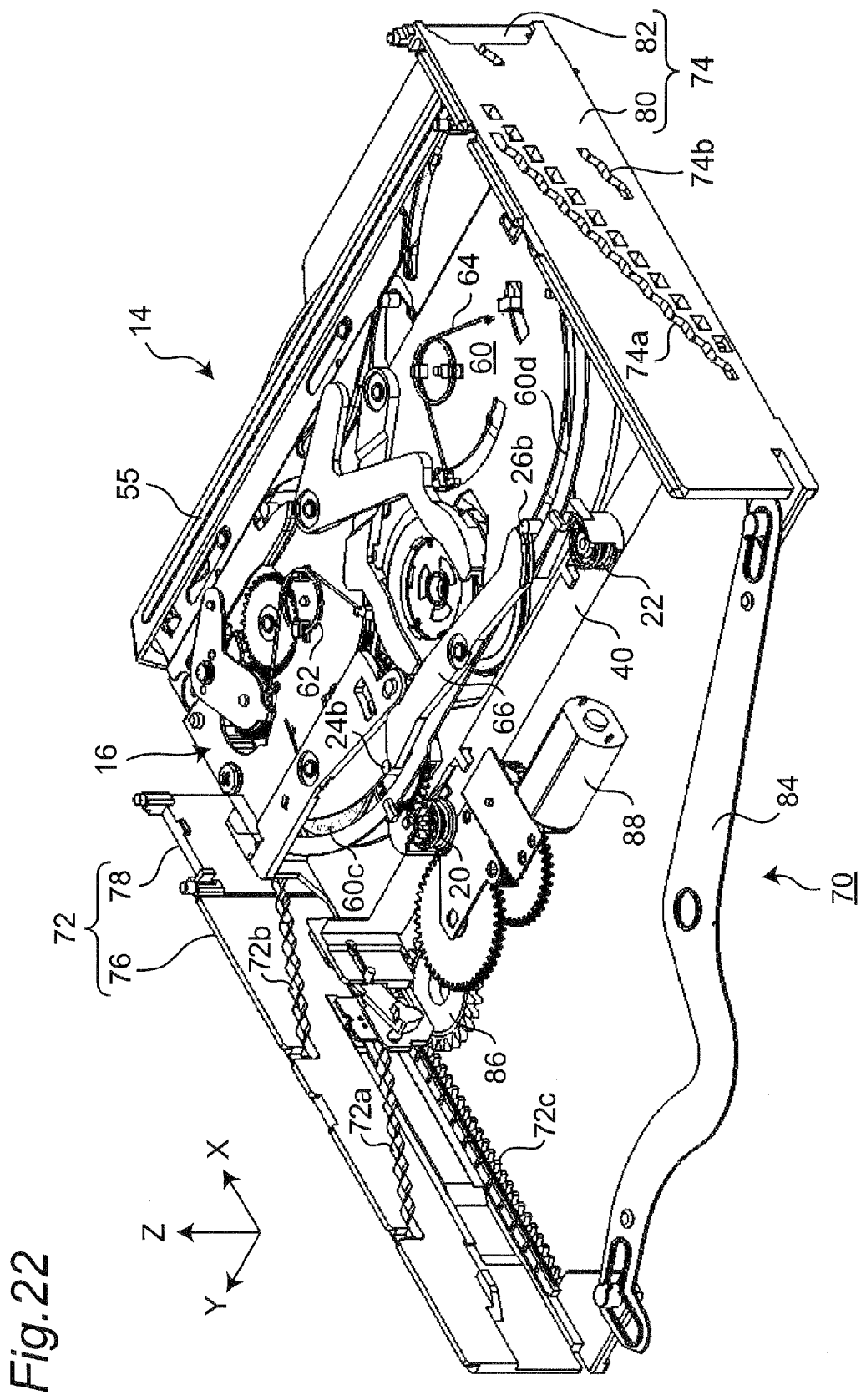
FIG. 22 is a perspective view of a disc record and reproduction unit moving mechanism.

FIG. 22 shows a disc record and reproduction unit moving mechanism 70 that moves the disc record and reproduction unit 14 in the Z-axis direction.

The disc record and reproduction unit moving mechanism 70 has plate-like cams 72 and 74 that are disposed at both sides of the disc record and reproduction unit 14 in the Y-axis direction and slide in the X-axis direction.

As shown in FIG. 22, the cam 72 disposed on the Y-axis positive direction side of the disc record and reproduction unit 14 has two stepped grooves 72a and 72b extending from the Z-axis positive direction side and the X-axis negative direction side to the Z-axis negative direction side and the X-axis positive direction side.

Figure 23:
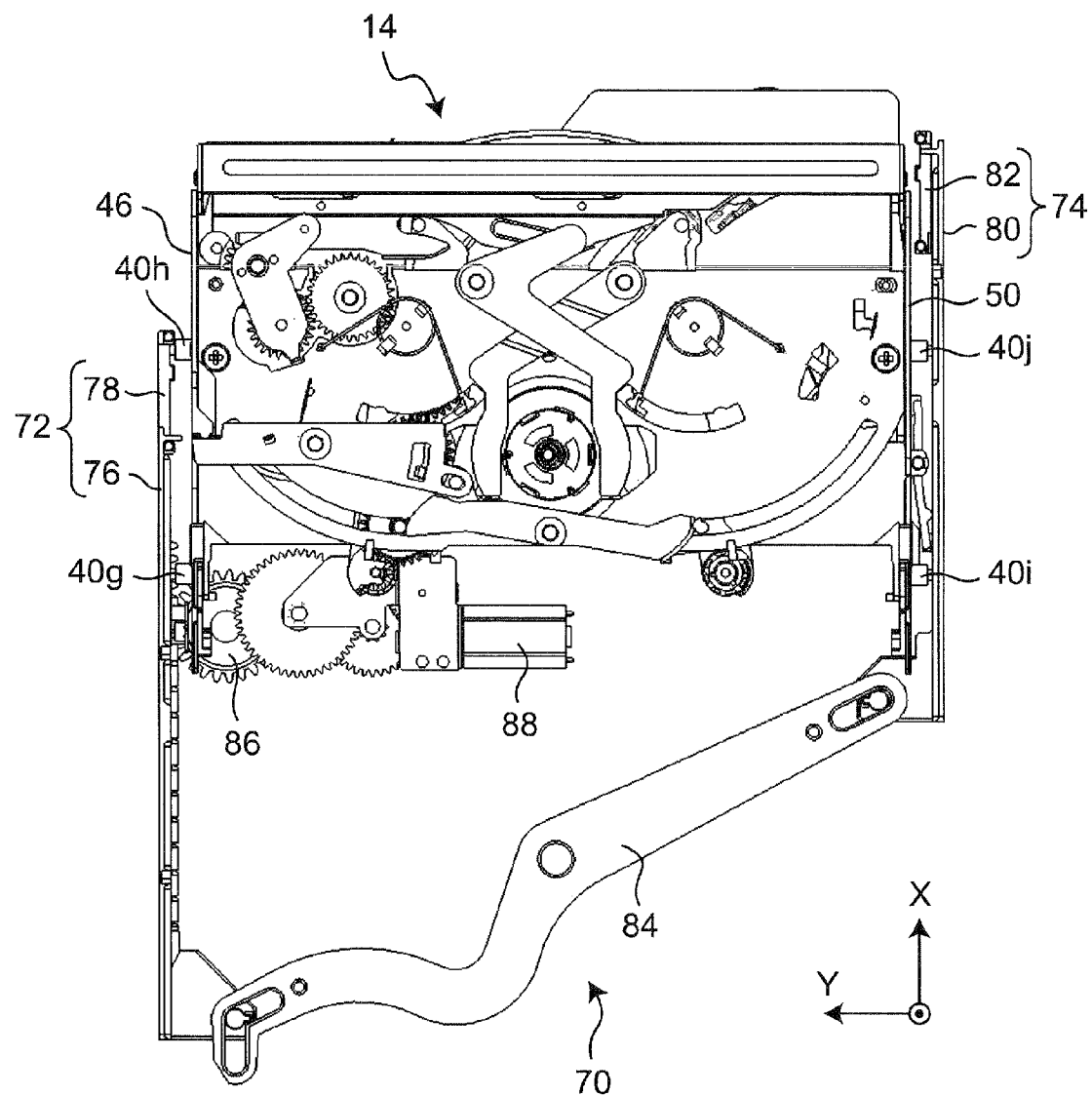
FIG. 23 is a top view of the disc record and reproduction unit moving mechanism.

As shown in FIG. 21C and FIG. 23, the driven pins 40g and 40h engaged with the two grooves 72a and 72b of the cam 72, respectively, protrude from the face of the base unit 40 opposed to the cam 72 in the Y-axis positive direction. The driven pin 40g engages with the groove 72a, and the driven pin 40h engages with the groove 72b.

As shown in FIG. 22, the cam 74 disposed on the Y-axis negative direction side of the disc record and reproduction unit 14 has two stepped grooves 74a and 74b extending from the Z-axis negative direction side and the X-axis negative direction side to the Z-axis positive direction side and the X-axis positive direction side.

As shown in FIG. 21C and FIG. 23, the driven pins 40i and 40j engaged with the two grooves 74a and 74b of the cam 74 protrude from the face of the base unit 40 opposed to the cam 74 in the Y-axis negative direction. The driven pin 40i engages with the groove 74a, and the driven pin 40j engages with the groove 74b.

By using the grooves 72a, 72b, 74a, and 74b of the cams 72 and 74 and the driven pins 40g to 40j, when the cam 72 moves in the X-axis positive direction and the cam 74 moves in the X-axis negative direction, the disc record and reproduction unit 14 moves in the Z-axis positive direction. When the cam 73 moves in the X-axis negative direction and the cam 74 moves in the X-axis positive direction, the disc record and reproduction unit 14 moves in the Z-axis negative direction.

To parallelly move the disc record and reproduction unit 14 in the Z-axis direction, the disc record and reproduction unit moving mechanism 70 is configured such that the cams 72 and 74 cooperate with each other.

In particular, the cam 72 is connected to one free end of a link lever 84 that pivots about a pivot center line extending in the Z-axis direction. The cam 74 is connected to the other free end of the link lever 84. Due to the link lever 84, when the cam 72 moves to one side in the X-axis direction, the cam 74 moves to the other side in the X-axis direction. In this manner, the cams 72 and 74 operate together such that the disc record and reproduction unit 14 parallelly moves in the Z-axis direction.

To move the cam 72 in the X-axis direction, a rack gear 72c extending in the X-axis direction is formed on the cam 72. The disc record and reproduction unit moving mechanism 70 has a pinion gear 86 engaged with the rack gear 72c of the cam 72 and a motor 88 that rotates the pinion gear 86. Rotating the pinion gear 86 moves the cam 72 to one side in the X-axis direction, and thus moves the cam 74 to the other side in the X-axis direction via the link lever 84.

To make the disc record and reproduction unit moving mechanism 70 compact, in particular, to reduce the size of the disc record and reproduction unit moving mechanism 70 in the X-axis direction, the cams 72 and 74 each can be divided in the X-axis direction.

For example, the cam 72 can be divided into a first divided portion 76 and a second divided portion 78 in the X-axis direction. One cam 74 can be divided into divided portions 80 and 82 in the X-axis direction.

Accordingly, the groove 72b formed in the cam 72 is also divided. That is, a part of the groove 72b is present in the first divided portion 76 of the cam 72, and a remainder of the groove 72b is present in the second divided portion 78.

The reason why the cams 72 and 74 each are divided in the X-axis direction will be described using the cam 72 as an example, and referring to FIG. 24A and FIG. 24B.

Figure 24A:
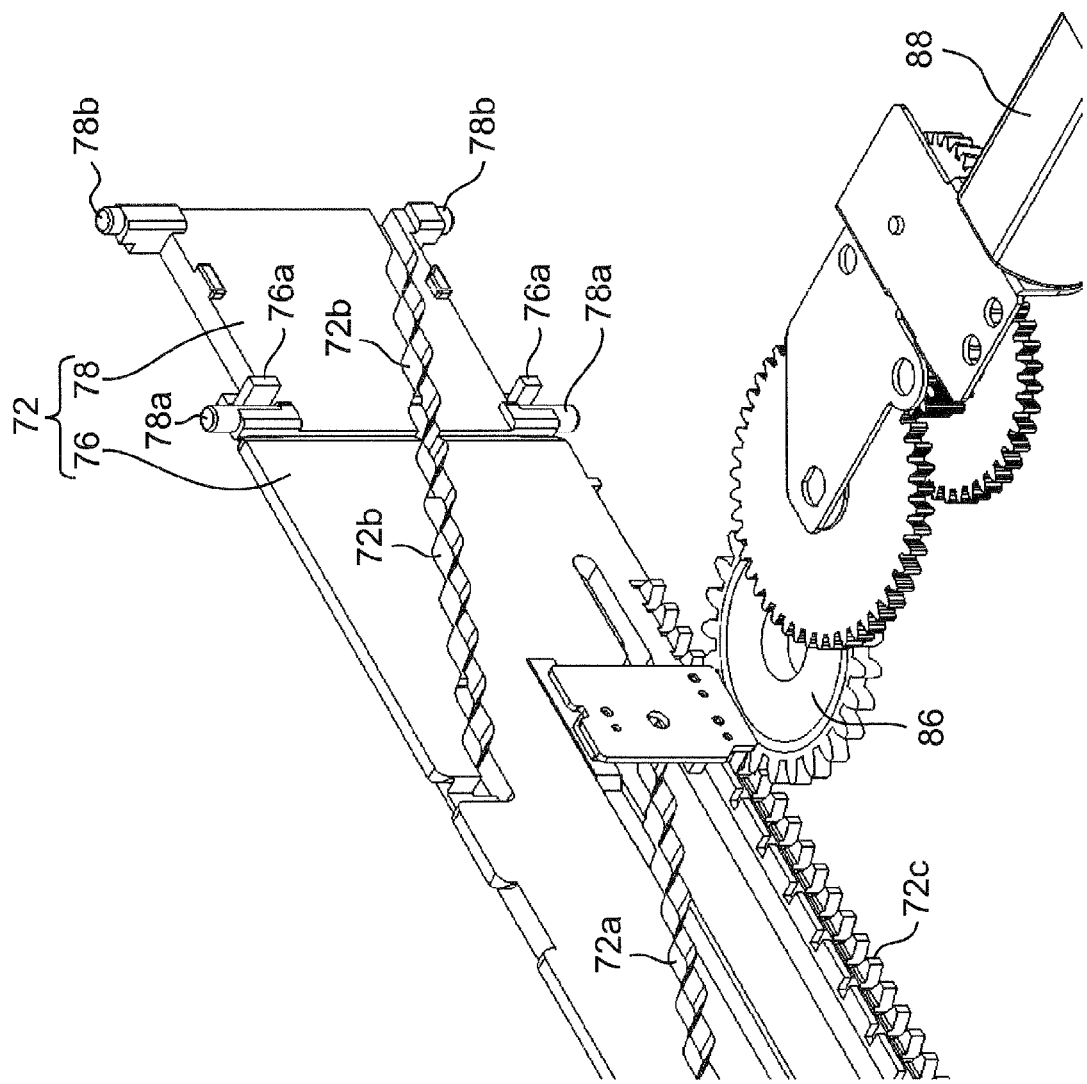
FIG. 24A is a perspective view of one undivided cam of the disc record and reproduction unit moving mechanism.
Figure 24B:
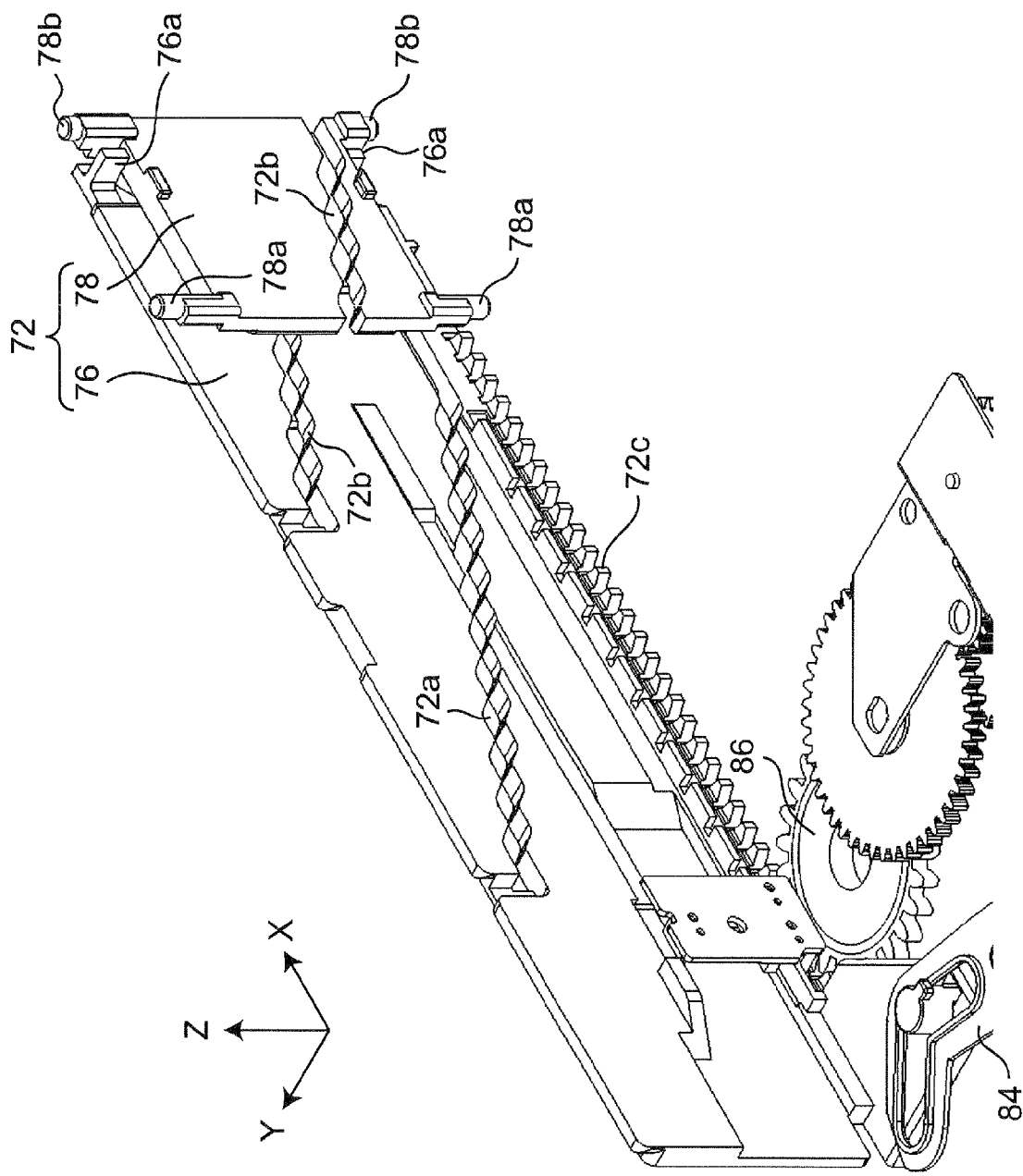
FIG. 24B is a perspective view of one divided cam of the disc record and reproduction unit moving mechanism.

FIG. 24A is a perspective view of the undivided cam 72, and FIG. 24B is a perspective view of the divided cam 72.

While the driven pin 40h of the base unit 40 of the disc record and reproduction unit 14 engages with the groove 72b of the second divided portion 78 of the cam 72 as shown in FIG. 23, the first divided portion 76 and the second divided portion 78 of the cam 72 are connected to each other in the X-axis direction as shown in FIG. 24A. Thus, the grooves 72b of the cam 72 are also connected to each other.

When the cam 72 moves in the X-axis positive direction from the state shown in FIG. 24A, and the driven pin 40h enters into the groove 72b of the first divided portion 76 of the cam 72, the second divided portion 78 of the cam 72 does not affect the movement of the disc record and reproduction unit 14 in the Z-axis direction. Thus, the second divided portion 78 of the cam 72, which includes the groove 72b unengaged with the driven pin 40h, parallelly moves in the Y-axis negative direction (toward the disc record and reproduction unit 14 side) as shown in FIG. 24B. The first divided portion 76 of the cam 72, which includes the groove 72b engaged with the driven pin 40h moves in the X-axis positive direction, and overlaps the second divided portion 78 in the Y-axis direction.

Because the second divided portion 78 of the cam 72, which includes the groove 72b unengaged with the driven pin 40h, overlaps the first divided portion 76 in the Y-axis direction as shown in FIG. 24B, during movement of the cam 72 in the X-axis positive direction, the length of the cam 72 in the X-axis direction substantially decreases. Thus, a range of the movement of the cam 72 in the X-axis direction is smaller than that of the undivided cam 72.

Specifically, for the undivided cam 72, the range of the movement of the cam 72 in the X-axis direction needs to be equal to a sum of the length of the cam 72 in the X-axis direction and the length of the groove 72b in the X-axis direction. In contrast, for the cam 72 divided into the first divided portion 76 and the second divided portion 78, the range of the movement of the cam 72 in the X-axis direction only needs to be equal to a length obtained by subtracting the length of the second divided portion 78 in the X-axis direction from the sum of the length of the cam 72 in the X-axis direction and the length of the groove 72b in the X-axis direction.

Therefore, the disc record and reproduction unit moving mechanism 70 can be made compact without decreasing the range of movement of the disc record and reproduction unit 14 in the Z-axis direction. Thus, the disc conveying device 10 can store many discs D while keeping compact in size. The stepped flat portions (portions extending in the X-axis direction) of the grooves 72b and 74b are divided. This prevents oscillation during operation, which is caused by variation in the size in the Z-axis direction.

A method of moving the second divided portion 78 of the cam 72 in the Y-axis negative direction as shown in FIG. 24B will be described below.

Figure 25:
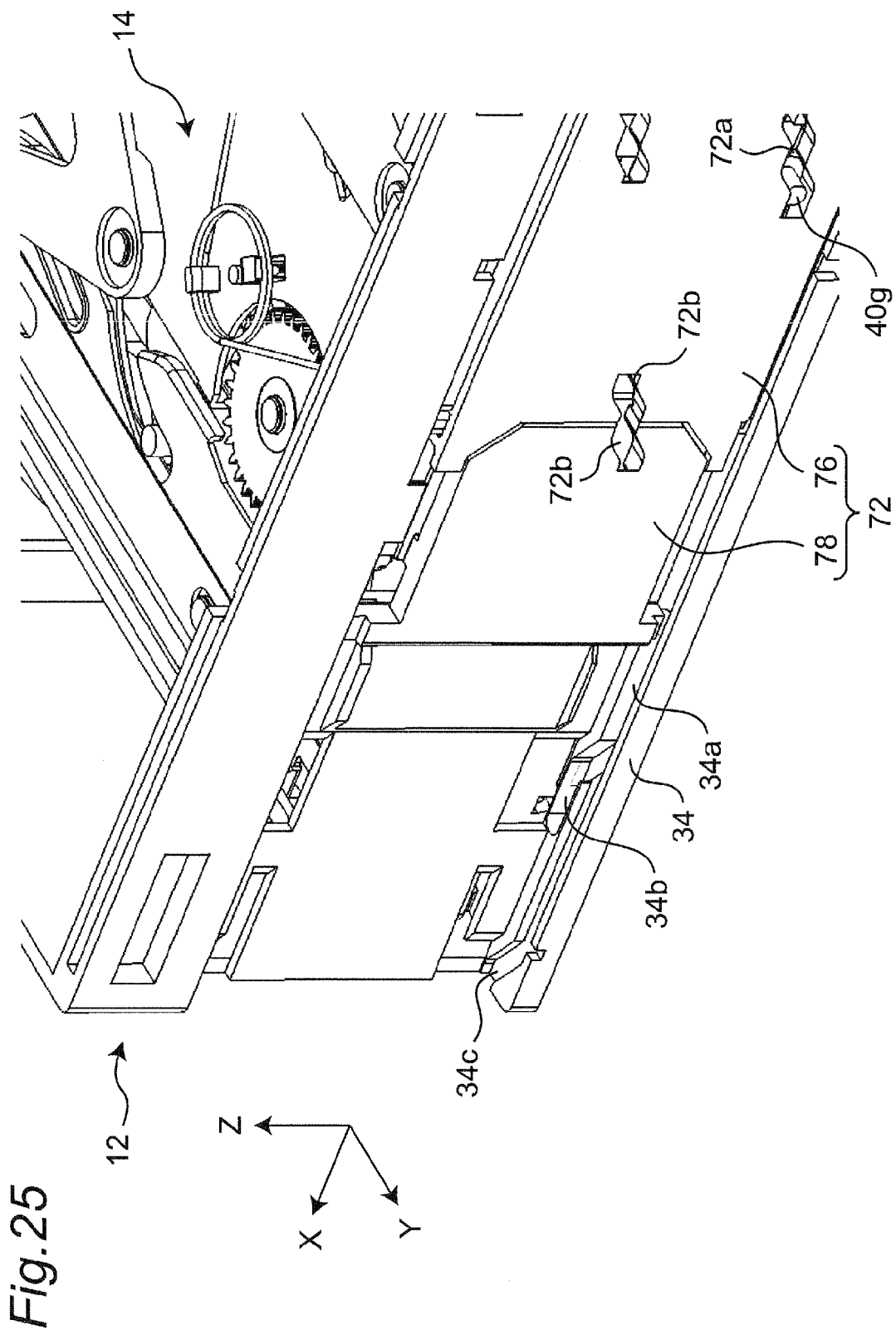
FIG. 25 is a perspective view of a guide mechanism that guides one cam of the disc record and reproduction unit moving mechanism.
Figure 26:
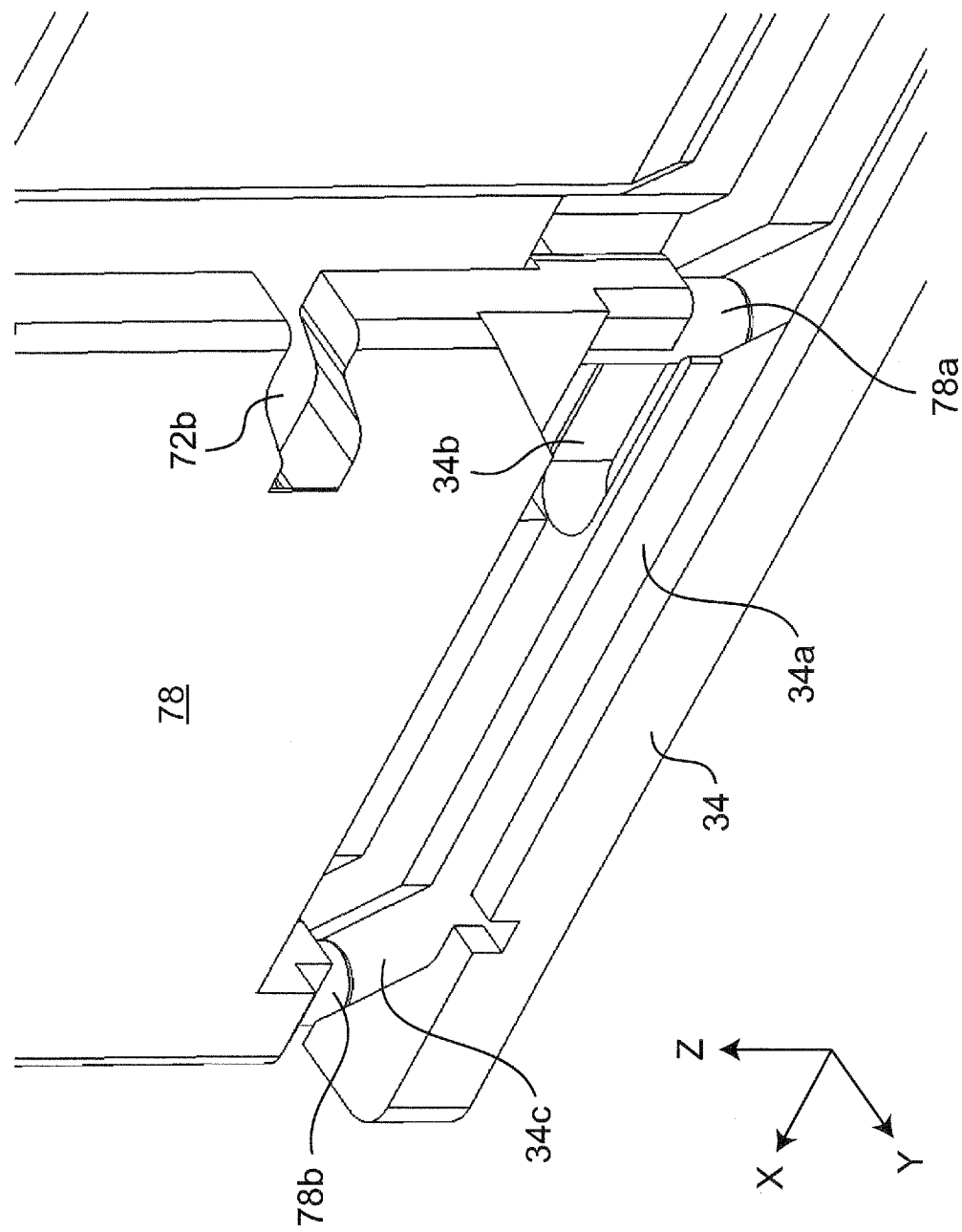
FIG. 26 is a perspective view of the guide mechanism that guides a divided portion of one cam of the disc record and reproduction unit moving mechanism.

FIG. 25 shows a guide mechanism that guides the cam 72 in the X-axis direction. For example, as shown in FIG. 25, the guide mechanism is formed of a guide groove 34a that is formed in the base casing 34 of the main unit 12 of the disc conveying device 10 and extends in the X-axis direction. The cam 72 engages with the guide groove 34a and is guided with the guide groove 34a to move in the X-axis direction.

Guide grooves 34b and 34c that parallelly moves the second divided portion 78 of the cam 72 in the Y-axis negative direction side (toward the disc record and reproduction unit 14 side) are provided on the X-axis positive direction side of the guide groove 34a.

The guide grooves 34b and 34c guide pins 78a and 78b that are provided on the second divided portion 78 of the cam 72 and extend in the Z-axis direction as shown in FIG. 24B, moving the second divided portion 78 in the Y-axis negative direction side (toward the disc record and reproduction unit 14 side).

Along the guide groove 34a to 34c, during movement of the cam 72 in the X-axis positive direction, the leading second divided portion 78 parallelly moves in the Y-axis negative direction (toward the disc record and reproduction unit 14 side), and the following first divided portion 76 proceeds straight in the X-axis positive direction and moves in the Y-axis positive direction side of the second divided portion 78. As a result, the first divided portion 76 overlaps the second divided portion 78 of the cam 72 in the Y-axis direction.

When the first divided portion 76 of the cam 72 moves in the X-axis negative direction from the state where the first divided portion 76 of the cam 72 overlaps the second divided portion 78 in the Y-axis direction as shown in FIG. 24B, the first divided portion 76 is connected to the second divided portion 78 again. In particular, the guide pins 78a of the second divided portion 78 engage with respective claw portions 76a of the first divided portion 76 to unite the first divided portion 76 and the second divided portion 78.

Similarly, when the cam 74 moves in the X-axis positive direction, as shown in FIG. 23, the leading second divided portion 82 parallelly moves in the Y-axis positive direction (toward the disc record and reproduction unit 14 side), and the following first divided portion 80 proceeds straight in the X-axis positive direction and moves in the Y-axis positive direction side of the second divided portion 82. As a result, the first divided portion 80 and the second divided portion 82 of the cam 74 overlap each other in the Y-axis positive direction.

As compared to a tray conveyance-type device storing and conveying trays each storing a disc, the device in this embodiment can store more discs while keeping compact in size than a tray conveyance-type device.

Additionally, in the tray conveyance-type device that conveys the disc with the tray, the tray must have a rigidity for conveyance, and thus have a certain level of thickness. The tray conveyance-type device, in which such trays are stacked in the disc thickness direction, is more difficult to store many discs while keeping compact in size than the device in this embodiment.

In contrast, in this embodiment, the disc holder (a pair of disc holding plates) is not conveyed together with the disc to the disc record/reproduction position as a destination of the disc, and thus requires no rigidity (thickness) suitable for conveyance. Since the plurality of discs each held in such disc holder are arranged in the thickness direction, the device in this embodiment can store many discs while keeping compact in size.

When the disc holder (a pair of disc holding plates) holding the disc to be conveyed (to be recorded or reproduced) moves, the adjacent disc holder is separated from the disc holder holding the disc to be conveyed. This prevents a friction between the disc holder and the adjacent disc holder from occurring during movement of the disc holder holding the disc to be conveyed. As a result, the disc holder holding the disc to be conveyed can be moved with a small force, reducing the size of a driving source (for example, motor or drive gear) for moving the disc holder. This can, in turn, ensure a space for storing many discs in the main unit of the disc conveying device.

The disc holder adjacent to the disc holder (a pair of disc holding plates) holding the disc to be conveyed is inclined to be separated from the disc holder holding the disc to be conveyed. Consequently, the configuration for separation becomes simpler as compared to the configuration in which the adjacent disc holder moves in parallel and is separated from the disc holder holding the disc to be conveyed. This enables an increase in the number of discs that can be stored in the disc conveying device.

Since the disc holder (disc holding plates) holding the disc to be recorded or reproduced can be moved and separated from the adjacent disc holder by using one cam, as compared to the case where the disc holder holding the disc to be recorded or reproduced is moved and separated by separate members, the number of components of the disc conveying device can be reduced. This enables an increase in the number of discs that can be stored in the disc conveying device.

The plurality of disc holders are stored in the magazine and therefore, the plurality of discs can be set in the disc conveying device via the magazine at one time.

Further, the locking member can lock the disc holder (a pair of disc holding plates) in the disc thickness direction (Z-axis direction), and prevent the disc holder from pivoting during conveyance of the magazine.

Still further, since the disc conveying mechanism returns the disc to the disc holder (a pair of disc holding plates) with the disc holders overlapped by the locking member, the disc cannot be sandwiched between the disc holders.

The embodiment has been described as an example of the art disclosed in this application. However, the art in this disclosure is not limited to the embodiment, and may be applied to embodiments with appropriate change, replacement, addition, or omission.

For example, in the above-described embodiment, the disc holder holding the discs is formed of the two disc holding plates and however, the disc holder may be formed of one member. It is only required that the plurality of disc holders each can hold the disc so as to enable the disc to slide toward the disc record and reproduction unit side, can be stacked in the disc thickness direction, and can move in the disc thickness direction and toward the disc record and reproduction unit side.

For example, the plurality of disc holders may be stored in the main unit of the disc conveying device in place of the magazine.

For example, in the above-described embodiment, as shown in FIG. 2B, the disc to be recorded or reproduced overlaps the other discs during recording or reproduction when viewed from the disc thickness direction (Z-axis direction) and however, the present disclosure is not limited to this. The disc can be recorded or reproduced without overlapping the other discs.

For example, in the above-described embodiment, the cam of the disc record and reproduction unit moving mechanism may has a slit that engages with the driven pin of the disc record and reproduction unit, in place of the groove.

Further, one cam of the disc record and reproduction unit moving mechanism may be used. For example, in the case where the disc conveying device is used in a horizontal orientation and the disc record and reproduction unit horizontally moves, one cam can move the disc record and reproduction unit.

Further, in the above-described embodiment, the two cams of the disc record and reproduction unit moving mechanism move in opposite directions and however, may move in the same direction. In this case, grooves of the two cams extend in the same direction.

Still further, in the above-described embodiment, the cam of the disc record and reproduction unit moving mechanism can be divided into two, and the cam may be divided into three or more.

Various embodiments have been described as examples of the art in this disclosure. To this end, appended drawings and the detailed description are given.

Thus, the constituents in appended drawings and detailed description may include constituents necessary for solving problems as well as constituents that serve to illustrate the above-mentioned technique and are not essential to solving the problems. Therefore, all constituents in the appended drawings and detailed description should not be regarded as essential constituents.

The embodiments are examples of the art in this disclosure and thus, may be variously changed, replaced, added, omitted in the scope of Claims and their equivalents.

Although the present disclosure has been fully described in connection with the preferred embodiments thereof with reference to the accompanying drawings, it is to be noted that various changes and modifications are apparent to those skilled in the art. Such changes and modifications are to be understood as included within the scope of the present disclosure as defined by the appended claims unless they depart therefrom.

Finally, it is noted that the disc conveying device in the above-described embodiment includes the disc record and reproduction unit and its constituents necessary for recording and reproduction of the disc, such as the disc record and reproduction unit moving mechanism and however, these constituents are not essential to convey the disc. The disc conveying device of this disclosure is a disc conveying device conveying any one disc among a plurality of discs arranged in a first direction which is a disc thickness direction in a second direction orthogonal to the first direction, the device including:

a plurality of disc holding members stacked in the first direction, the disc holding members each holding the disc such that the disc can slide to one side in the second direction, and being capable of moving in the first and second directions;

a disc holding member moving mechanism separating the disc holding member holding the disc to be conveyed from the adjacent disc holding member in the first direction, and moving the disc holding member holding the disc to be conveyed to the one side in the second direction, partially protruding the disc to be conveyed from the other discs to the one side in the second direction; and a disc conveying mechanism holding the protruded part of the disc to be conveyed which is protruded from the other discs to the one side in the second direction, and conveying the disc to be conveyed to the one side in the second direction.

The disc conveying device of this disclosure is available in a data archive apparatus, a disc player having a disc changing function, and other similar apparatuses.

What is claimed is:

1. A disc conveying device conveying any one of a plurality of discs arranged in a first direction, which is a disc thickness direction, in a second direction orthogonal to the first direction, the disc conveying device comprising:
   a plurality of disc holding members stacked in the first direction, one of the plurality of disc holding members holding the one of the plurality of discs such that the one of the plurality of discs can slide to one side in the second direction, the one of the plurality of disc holding members being capable of moving in the first direction and the second direction;
   a disc holding member moving mechanism separating the one of the plurality of disc holding members from an adjacent one of the plurality of disc holding members in the first direction, and moving the one of the plurality disc holding members to the one side in the second direction, partially protruding the one of the plurality of discs from other ones of the plurality of discs to the one side in the second direction; and
   a disc conveying mechanism holding a protruded part of the one of the plurality of discs to the one side in the second direction, and conveying the one of the plurality of discs to the one side in the second direction.

2. The disc conveying device according to claim 1, wherein:
   the disc holding member moving mechanism inclines the adjacent one of the plurality of disc holding members such that a portion of the adjacent one of the plurality of disc holding members on the one side in the second direction is separated from the one of the plurality of disc holding members in the first direction.

3. The disc conveying device according to claim 2, wherein:
   each of the plurality of disc holding members has a protrusion on the one side in the second direction, the protrusion protruding in a third direction orthogonal to the first direction and the second direction,
   the disc holding member moving mechanism has a cam capable of moving to the one side in the second direction, and
   the cam has a front end contacting with the protrusion of the one of the plurality of disc holding members to move the one of the plurality of disc holding members to the one side in the second direction, and an inclined portion contacting with the protrusion of the adjacent one of the plurality of disc holding members to move a part of the adjacent one of the plurality of disc holding members on the one side in the second direction in the first direction.

4. The disc conveying device according to claim 1, further comprising:
   a magazine storing the plurality of disc holding members stacked in the first direction such that each of the plurality of disc holding members can move in the first direction and the second direction, the magazine being detachably attached to a main unit of the disc conveying device.

5. The disc conveying device according to claim 4, wherein:
   the magazine has a locking member that engages with the plurality of disc holding members stacked in the first direction in the second direction to restrict movement of each of the plurality of disc holding members in the first direction, and
   a cam of the disc holding member moving mechanism causes a protrusion of the one of the plurality of disc holding members to press the locking member to release engagement of the locking member and the plurality of disc holding members.

6. The disc conveying device according to claim 4, wherein:
   the magazine has a locking member that engages with the plurality of disc holding members stacked in the first direction in the second direction to restrict movement of each of the plurality of disc holding members in the first direction,
   the disc holding member moving mechanism has a pin capable of moving to another side in the second direction, and
   the locking member is pressed by the pin of the disc holding member moving mechanism to engage with the plurality of disc holding members.

7. The disc conveying device according to claim 4, wherein:
   the disc conveying mechanism returns the plurality of discs to respective ones of the plurality of disc holding members stacked in the first direction, a stacked state being kept with a locking member.

8. A disc conveying method of conveying any one of a plurality of discs arranged in a first direction, which is a disc thickness direction, in a second direction orthogonal to the first direction, the disc conveying method comprising:
   holding the one of the plurality of discs with one of a plurality of disc holding members stacked in the first direction such that the one of the plurality of discs can slide to one side in the second direction;
   separating the one of the plurality of disc holding members from an adjacent one of the plurality of disc holding members in the first direction, and moving the one of the plurality of disc holding members to the one side in the second direction, partially protruding the one of the plurality of discs from other ones of the plurality of discs to the one side in the second direction; and
   holding a protruded part of the one of the plurality of discs to the one side in the second direction, and conveying the one of the plurality of discs to the one side in the second direction.

* * * * *